US012119874B2

(12) United States Patent
Murakami

(10) Patent No.: US 12,119,874 B2
(45) Date of Patent: *Oct. 15, 2024

(54) COMMUNICATION APPARATUS AND COMMUNICATION METHOD

(71) Applicant: Panasonic Intellectual Property Corporation of America, Torrance, CA (US)

(72) Inventor: Yutaka Murakami, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,289

(22) Filed: Jun. 12, 2023

(65) Prior Publication Data

US 2023/0327760 A1 Oct. 12, 2023

Related U.S. Application Data

(63) Continuation of application No. 17/834,738, filed on Jun. 7, 2022, now Pat. No. 11,716,143, which is a (Continued)

(30) Foreign Application Priority Data

Jun. 30, 2017 (JP) .................. 2017-129124

(51) Int. Cl.
*H04B 10/116* (2013.01)
*H04B 10/114* (2013.01)
(Continued)

(52) U.S. Cl.
CPC ....... *H04B 10/116* (2013.01); *H04B 10/1149* (2013.01); *H04W 4/40* (2018.02); *H04W 64/003* (2013.01)

(58) Field of Classification Search
CPC ......... G06F 13/00; G08G 1/123; G09F 21/00; H04B 10/1141; H04B 10/1149;
(Continued)

(56) References Cited

U.S. PATENT DOCUMENTS

2002/0060747 A1 5/2002 Nonomura
2006/0277312 A1* 12/2006 Hirsch ................ H04L 63/0492
709/229
(Continued)

FOREIGN PATENT DOCUMENTS

CN 104217608 A 12/2014
CN 106533560 A 3/2017
(Continued)

OTHER PUBLICATIONS

English Translation of Chinese Search Report dated Aug. 19, 2022 for the related Chinese Patent Application No. 2018800327490. (2 pages).
(Continued)

*Primary Examiner* — Rina C Pancholi
(74) *Attorney, Agent, or Firm* — Seed IP Law Group LLP

(57) ABSTRACT

Useful data is transmitted to a terminal existing in a transportation vehicle. A communication apparatus installed in the transportation vehicle and configured to transmit the data to the terminal existing in the transportation vehicle includes a data selection unit and an illumination unit. The data selection unit acquires location information indicating a location of the transportation vehicle in which the terminal exists and which is traveling. Based on the acquired location information, the data selection unit selects approaching-location data related to a location ahead of a current location of the transportation vehicle in a traveling direction from a plurality of pieces of data related to the location. The
(Continued)

illumination unit transmits, as a modulated light signal, a signal comprising the approaching-location data.

10 Claims, 54 Drawing Sheets

Related U.S. Application Data continuation of application No. 16/608,903, filed as application No. PCT/JP2018/021979 on Jun. 28, 2018, now Pat. No. 11,387,901.

(51) Int. Cl.
*H04W 4/40* (2018.01)
*H04W 64/00* (2009.01)

(58) Field of Classification Search
CPC ....... H04B 10/116; H04M 11/00; H04W 4/02; H04W 4/029; H04W 4/06; H04W 4/40; H04W 64/003
See application file for complete search history.

(56) References Cited

U.S. PATENT DOCUMENTS

| | | |
|---|---|---|
| 2007/0198442 A1 | 8/2007 | Horn |
| 2007/0297395 A1 | 12/2007 | Chiu |
| 2008/0228394 A1* | 9/2008 | Fukuda .................. G01C 21/26 705/14.1 |
| 2011/0071906 A1* | 3/2011 | Kamiyama ............ G06Q 30/02 705/14.66 |
| 2014/0357261 A1* | 12/2014 | Chiu ..................... H04W 4/021 455/552.1 |
| 2017/0032421 A1* | 2/2017 | Semple .................. G06Q 30/02 |
| 2017/0078019 A1* | 3/2017 | Moriwaki .............. G08G 1/133 |

FOREIGN PATENT DOCUMENTS

| | | |
|---|---|---|
| JP | 2002158940 A | 5/2002 |
| JP | 2005-010965 A | 1/2005 |
| JP | 2006106742 A | 4/2006 |
| JP | 2015-530648 A | 10/2015 |
| WO | 2014026273 A1 | 2/2014 |

OTHER PUBLICATIONS

Extended European Search Report, dated Jun. 9, 2020, for European Patent Application No. 18825422.1-1220. (8 pages).

Indian Examination Report, dated Feb. 14, 2022, for Indian Patent Application No. 201947045697. (6 pages).

International Search Report, mailed Jul. 17, 2018, for International Application No. PCT/JP2018/021979. (4 pages with English translation).

Kingoff, "Comparing Internet Search Engines," *Computer* 30(4):117-118, Apr. 1997.

* cited by examiner

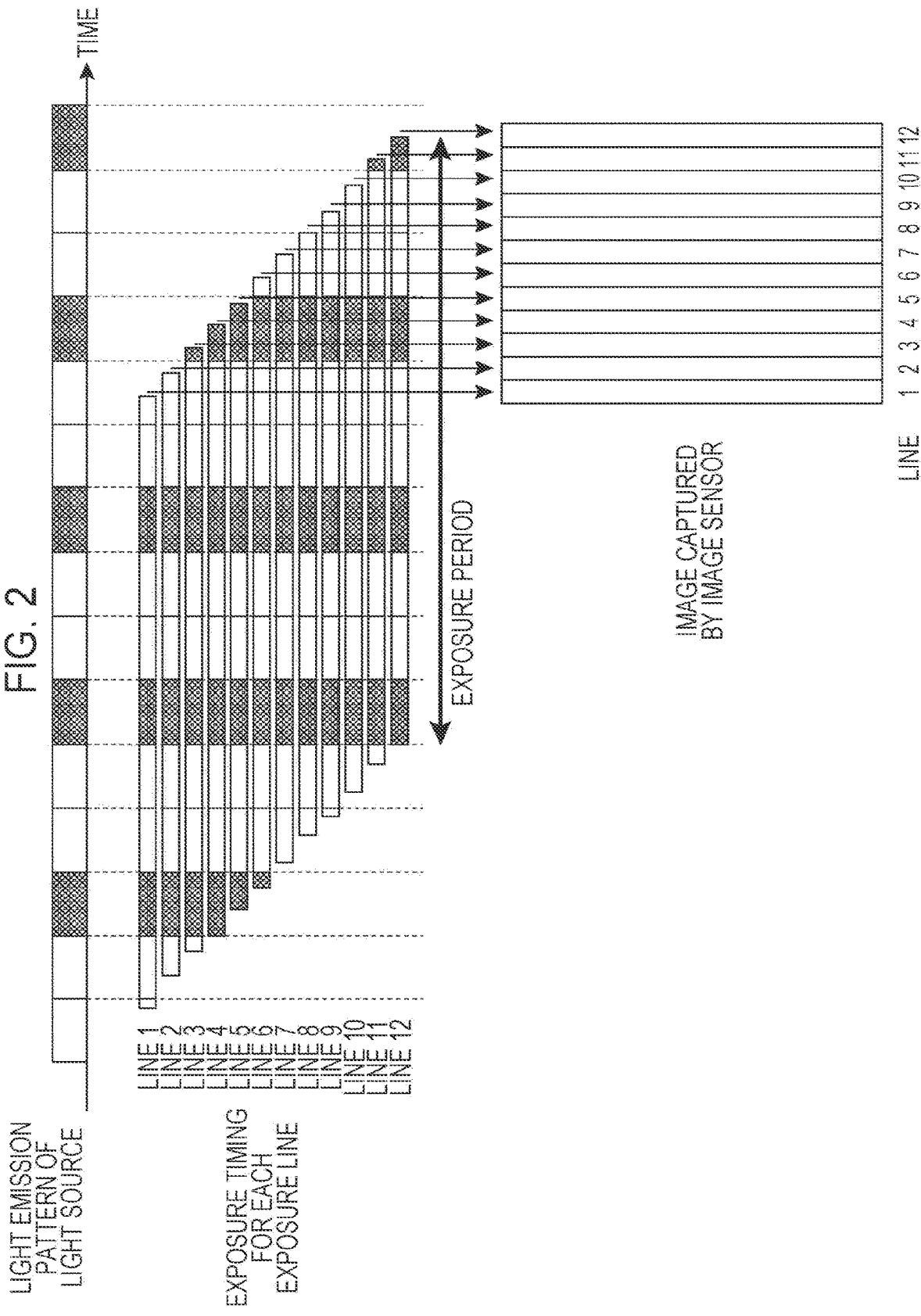

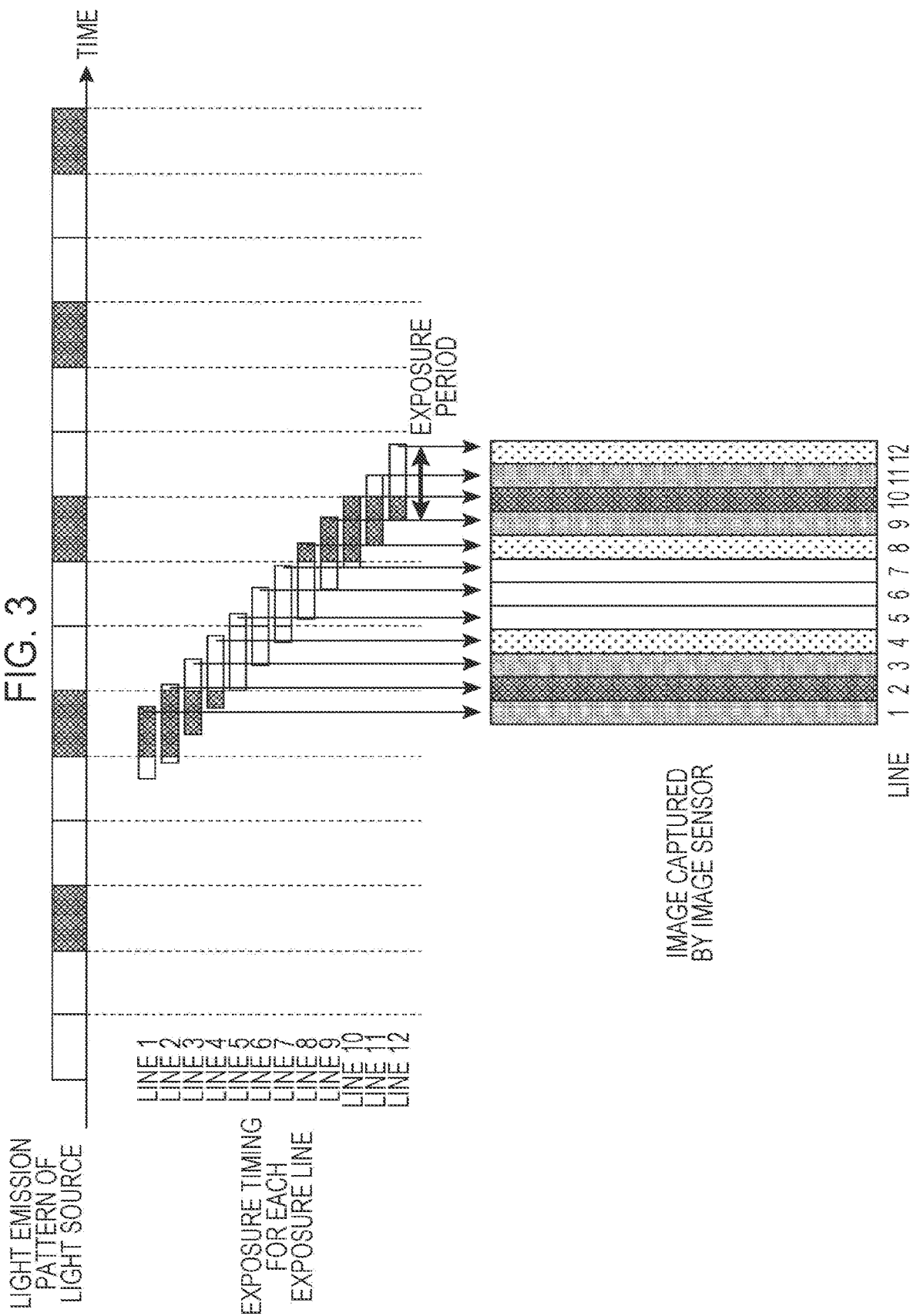

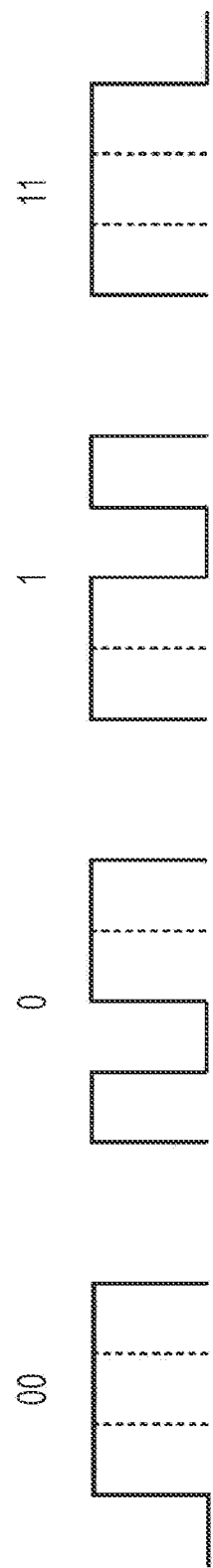

FIG. 45

| | | | |
|---|---|---|---|
| BID CURRENTLY EXISTS FOR: ADVERTISEMENT #A FURTHER BIDDING IS ALLOWED REGION 5200 | BID CURRENTLY EXISTS FOR: ADVERTISEMENT #B FURTHER BIDDING IS ALLOWED REGION 5201 | ADVERTISEMENT #D NO FURTHER BIDDING IS ALLOWED | |
| | | | BIDDING IS ALLOWED REGION 5203 |
| REGION 5202 | BIDDING IS ALLOWED | | |
| ADVERTISEMENT #C NO FURTHER BIDDING IS ALLOWED REGION 5204 | REGION 5205 | | |
| REGION 5206 | BIDDING IS ALLOWED | | |
| REGION 5207 | BIDDING IS ALLOWED | | |

SHIN-YOKOHAMA STATION — POINT #1 — POINT #2 — POINT #3 — SHINAGAWA STATION → PLACE

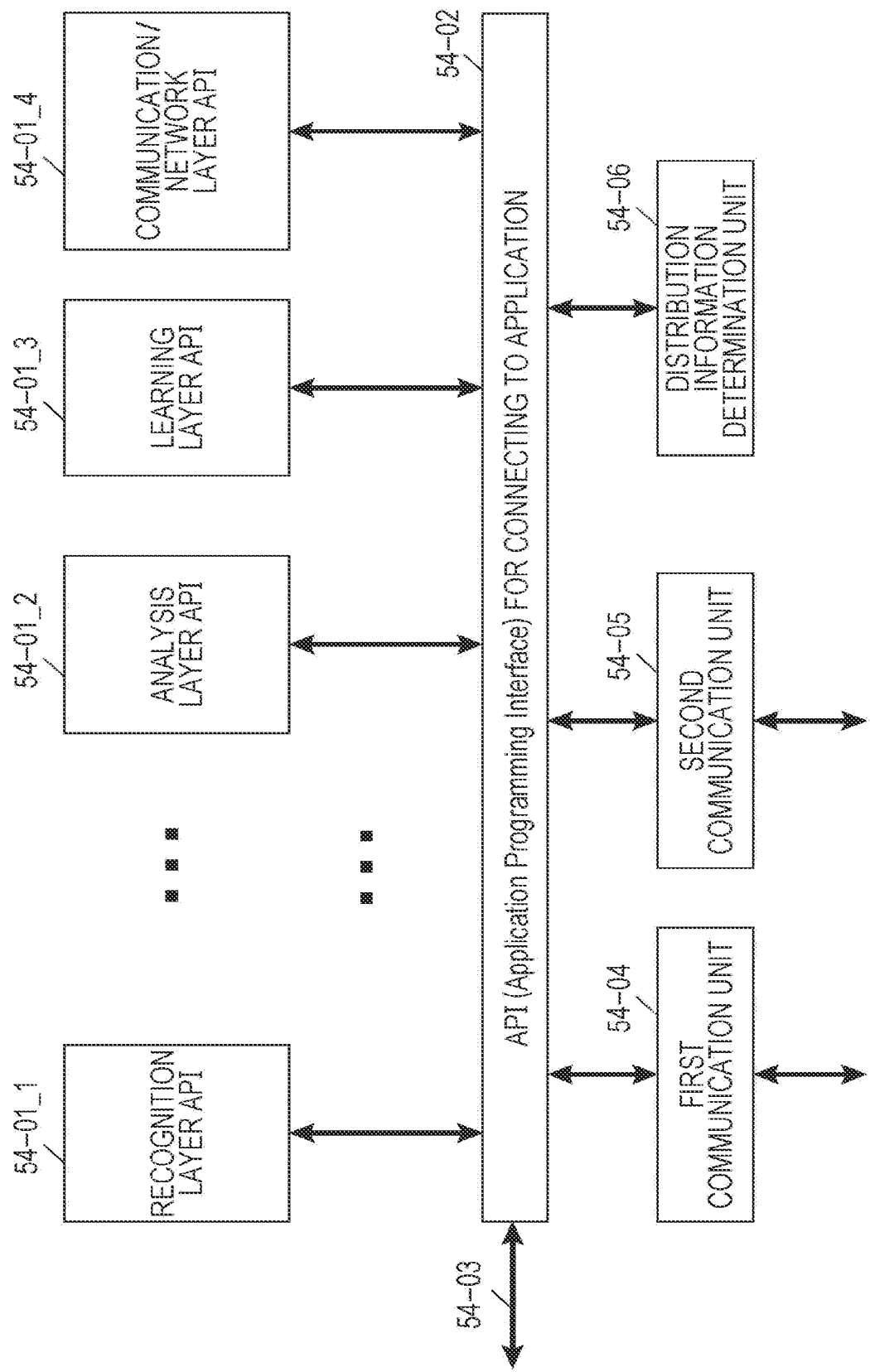

COMMUNICATION APPARATUS AND COMMUNICATION METHOD

CROSS-REFERENCE TO RELATED APPLICATIONS

This application is a continuation of U.S. application Ser. No. 17/834,738 filed on Jun. 7, 2022 (now U.S. Pat. No. 11,716,143), which is a continuation of U.S. application Ser. No. 16/608,903 filed on Oct. 28, 2019 (now U.S. Pat. No. 11,387,901), which is a U.S. national stage application of the PCT International Application No. PCT/JP2018/021979 filed on Jun. 8, 2018, which claims the benefit of foreign priority of Japanese patent application 2017-129124 filed on Jun. 30, 2017, the contents all of which are incorporated herein by reference.

TECHNICAL FIELD

The present disclosure relates to a communication apparatus and a communication method.

BACKGROUND ART

For example, as a method for a user to obtain information such as advertisements in places such as railways, commercial facilities, or the like, it is known to obtain the information from information displayed on a previously installed display.

As a method for a user to obtain better information, as disclosed in NPL 1, a method using a search on the Internet is known.

CITATION LIST

Non Patent Literature

NPL 1: "Comparing Internet search engines," Computer, volume 30, Issue 4, April 1997.

SUMMARY OF INVENTION

However, in order to obtain more appropriate information, a user needs to input, for example, a search keyword to a terminal, which causes a problem that it is difficult to easily obtain the information. On the other hand, when information is obtained from an image displayed on a display, the information displayed on the display may not be appropriate information the user wants to obtain.

An aspect of the present disclosure provides a communication apparatus and a communication method, which allow a user to more easily obtain more appropriate information.

In an aspect, the present disclosure provides a communication apparatus installed in a transportation vehicle and configured to transmit data to a terminal existing in the transportation vehicle, including a data selection unit configured to acquire location information associated with the transportation vehicle being traveling in which the terminal exists, and, based on the location information, select approaching-location data related to a location ahead of a current location of the transportation vehicle in a traveling direction from a plurality of pieces of data related to locations, and an illumination unit configured to transmit, as a modulated light signal, a signal including the approaching-location data.

In an aspect, the present disclosure provides a communication method for transmitting data from an illumination unit installed in a transportation vehicle to a terminal existing in the transportation vehicle, the method including acquiring location information associated with the transportation vehicle being traveling in which the terminal exists, and, based on the location information, selecting approaching-location data related to a location ahead of a current location of the transportation vehicle in a traveling direction from a plurality of pieces of data related to locations, and transmitting, as a modulated light signal, a signal including the approaching-location data.

It should be noted that general or specific embodiments may be implemented as a system, a method, an integrated circuit, a computer program, a storage medium, or any selective combination of a system, an apparatus, a method, an integrated circuit, a computer program, and a storage medium.

According to an aspect of the present disclosure, a user can obtain more appropriate information by a simple means.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 2 is a diagram illustrating an example of an image captured via a long exposure time.

FIG. 3 is a diagram illustrating an example of an image captured via a short exposure time.

FIG. 4A is a diagram for illustrating 4 PPM.

FIG. 45 is a diagram illustrating an example of an advertisement bid situation according to Embodiment 11.

FIG. 54 is a diagram illustrating an example of a configuration of a data generation apparatus according to Embodiment 14.

DESCRIPTION OF EMBODIMENTS

Embodiments of the present disclosure are described in detail below with reference to drawings.

[Modulation/Demodulation Method in Visible Light Communication]

In a visible light communication method according to an embodiment described below, a modulated signal is transmitted/received, for example, as a visible light signal.

First, an outline of the visible light communication method is described specifically.

<Line Scan Sampling>

A smartphone, a digital camera, or the like, includes an image sensor such as a CMOS (Complementary Metal Oxide Semiconductor) sensor. An image is captured by a CMOS sensor not such that the whole area of the image of scenery is captured at the exactly same time but such that an amount of light sensed by the sensor is output on a line-by-line base. Therefore, starting and ending of receiving of light is controlled taking into account a time necessary for reading such that starting and ending of light reception vary in time from line to line. That is, the image captured by the CMOS sensor has a feature in which many lines having a small time lag from each other are superimposed.

Figure 1:
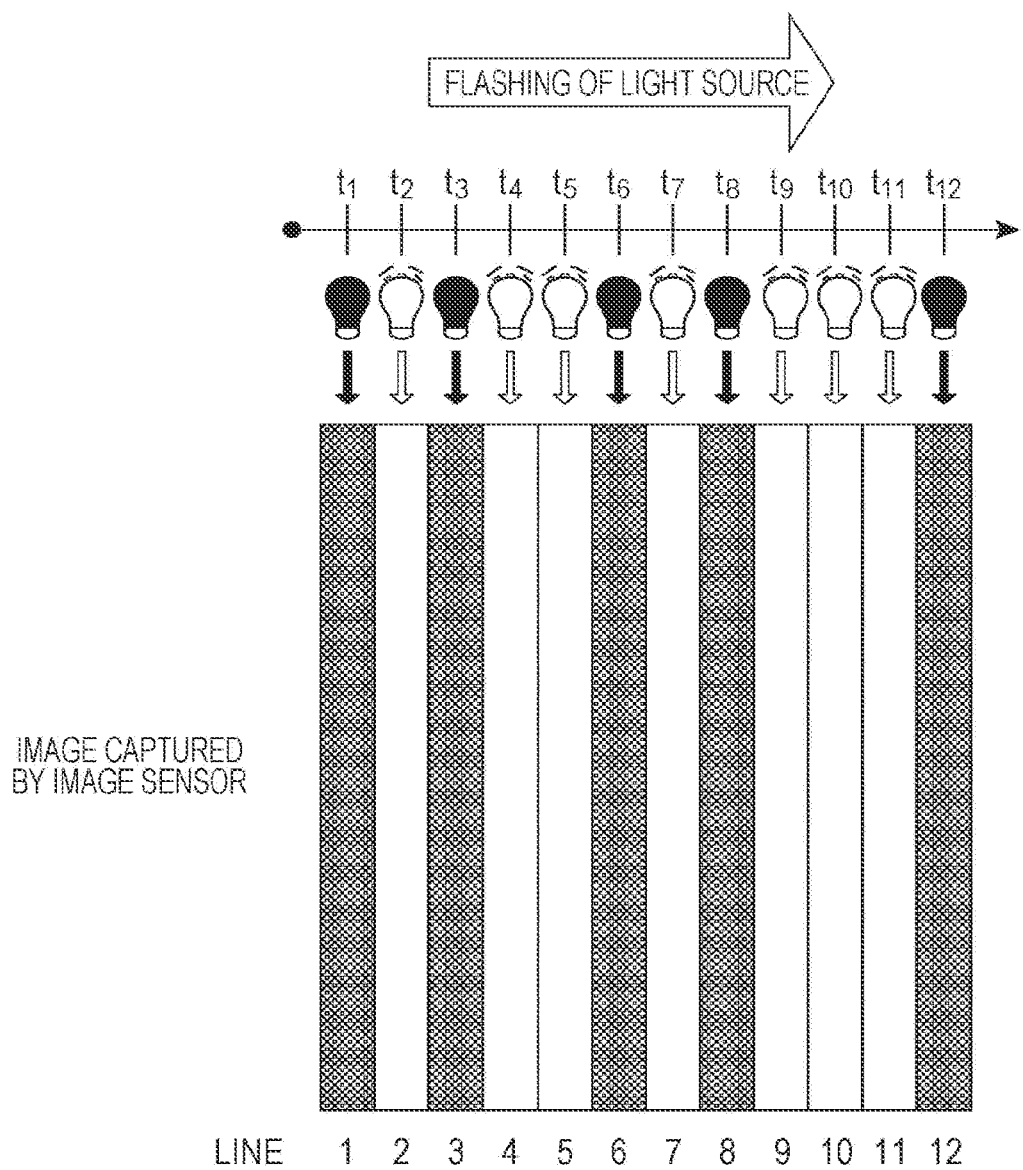
FIG. 1 is a diagram illustrating a principle of line scan sampling.

The present embodiment provides a visible light communication method using the above-described feature of the CMOS sensor, thereby achieving a high-speed visible light signal reception. That is, in the visible light communication method, by utilizing the fact that the exposure time varies slightly from line to line, it is possible to measure the luminance and color of a light source at a plurality of points of time on a line-by-line basis from one image (captured by the image sensor) as shown in FIG. 1, and thus it is possible to detect a signal modulated at a higher rate than a frame rate.

Hereinafter, this sampling method is referred to as "line scan sampling", and a row of pixels exposed at the same timing is referred to as an "exposure line".

However, when an image of a light source which flashes at a high rate (pulse lighting) is captured using imaging setting made for a camera function (a function of taking a moving image or a still image), flashing of the light source does not cause a stripe pattern to appear along the exposure lines. Because, in this setting, the exposure time is much longer than the flash cycle (pulse width) of the light source, the change in luminance due to the flashing (a light emission pattern) of the light source is averaged, and a change in pixel value between exposure lines becomes extremely small and a resultant image has substantially uniform luminance as shown in FIG. 2.

On the other hand, as shown in FIG. 3, when the exposure time is set to a value close to the flash cycle of the light source, it is possible to observe flashing of the light source (the light emission pattern) as a change in luminance of the exposure line.

For example, the exposure line is designed to be parallel to the direction of the long side of the image sensor. In this case, when the frame rate is set to, by way of example, 30 fps (frames per second), 32400 or more samples per second can be obtained for a resolution or a size of 1920×1080, and 64800 or more samples per second can be obtained for a resolution or a size of 3840×2160.

<Light Source and Modulation Scheme>

In visible light communication, for example, an LED (Light Emitting Diode) can be used as a transmitter. LEDs are becoming popular as lighting or backlight sources of displays, and can be flashed at high rates.

However, a light source used as a transmitter for visible light communication can not be controlled so as to flash freely for visible light communication. If flashing in visible light communication is visible to human beings, the original function of the light source as lighting is impaired. Therefore, it is required that the transmission signal be as bright as possible without flicker being felt by human eyes.

As a modulation scheme that meets this requirement, for example, there is a modulation scheme called 4-PPM (4-Pulse Position Modulation). In the 4 PPM scheme, 2 bits are represented by four combinations of bight/dark states of a light source as shown in FIG. 4A. In the 4 PPM, as shown in FIG. 4A, 3 of 4 pulses are in the bright state and 1 of 4 pules is in the dark state. Therefore, the average of the brightness (the average luminance) is ¾=75% regardless of signals.

Figure 4B:
FIG. 4B is a diagram used to illustrate a Manchester coding scheme.

For comparison, a similar scheme called a Manchester coding scheme is shown in FIG. 4B. In the Manchester coding scheme, 1 bit is represented by 2 states, and the modulation efficiency is 50% which is the same as that of the 4 PPM. However, because 1 of 2 pulses is in a bright state and the other 1 of 2 is in a dark state, the average luminance is ½=50%. That is, it can be concluded that 4 PPM is more suitable than the Manchester coding scheme as a modulation scheme for visible light communication.

<Example of Overall Configuration of Communication System>

Figure 5:
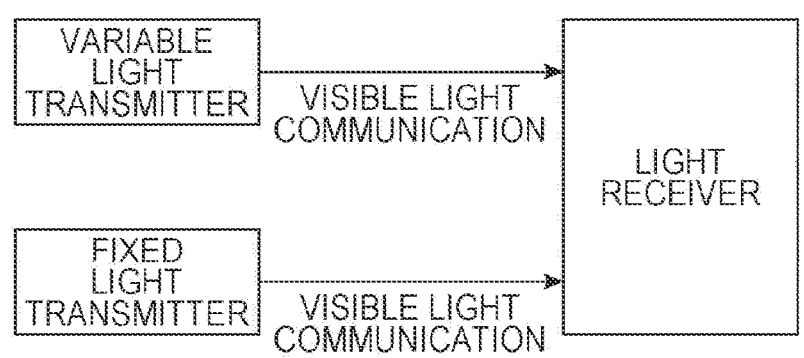
FIG. 5 is a diagram illustrating an example of a configuration of a visible light communication system.

As shown in FIG. 5, the communication system that performs visible light communication includes at least a transmitter configured to transmit (emit) a light signal and a receiver configured to receive (sense) a light signal. For example, there are two types of transmitters: variable light transmitters that change transmission content according to an image or content to be displayed; and fixed light transmitters that continue to transmit fixed transmission content.

The receiver may receive a light signal from the transmitter and, for example, may obtain related information associated with the light signal and provide it to a user.

The outline of the visible light communication method has been described above. The communication method applicable to the light communication according to embodiments described below is not limited to the method described above. For example, a light emitting unit of the transmitter may transmit data using a plurality of light sources. Furthermore, another communication method may be employed in which a receiver of the reception apparatus may not be an image sensor such as a CMOS but may be realized using a device, such as a photodiode, capable of converting an optical signal to an electrical signal. In this case, since it is not necessary to perform sampling using the above-described line scan sampling, it is applicable even to a system in which sampling at a rate of more than 32400 per second is required. Furthermore, depending on the application, for example, a communication method may be realized using radio frequency transmission instead of using visible light such as infrared light, ultraviolet light, or the like.

Embodiment 1

Figure 6:
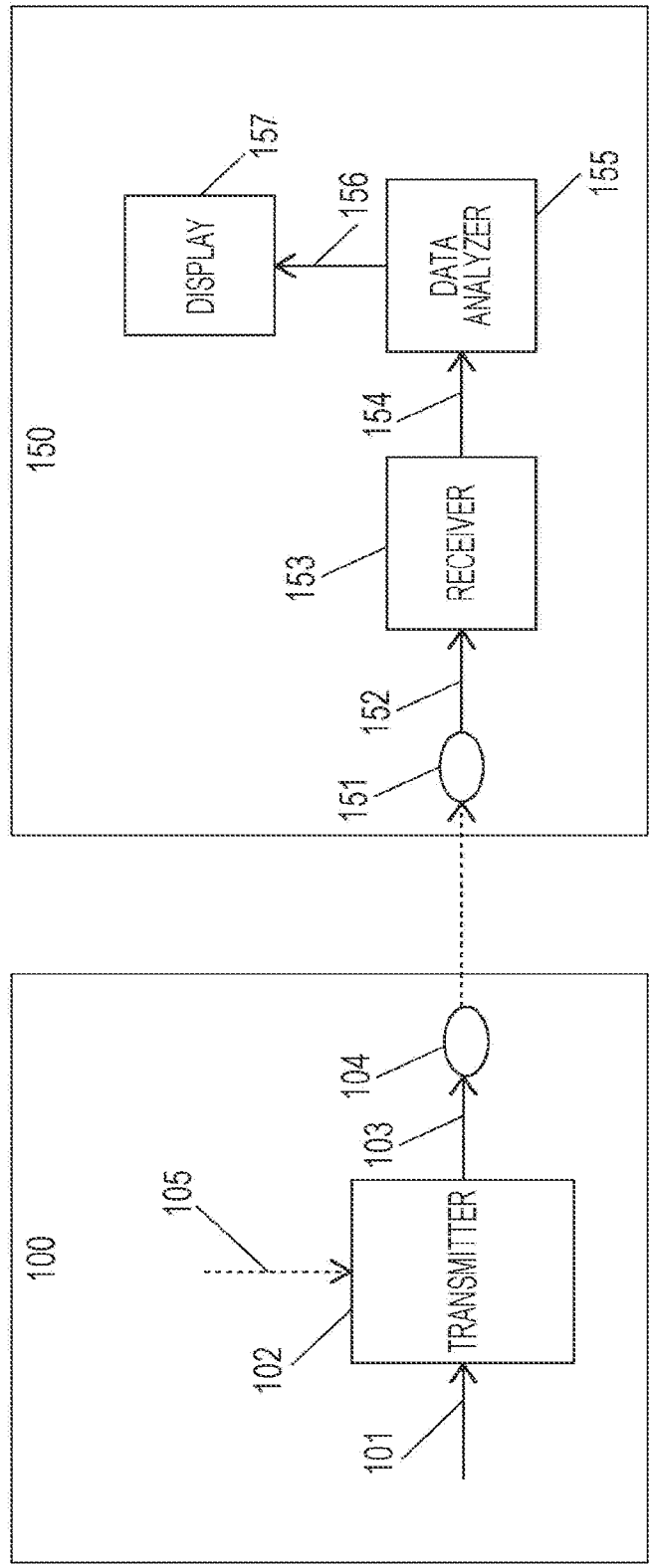
FIG. 6 is a diagram illustrating an example of a configuration of a communication system according to Embodiment 1.

FIG. 6 illustrates an example of a configuration of a device 100 and that of a terminal 150 according to Embodiment 1.

[Configuration of Device 100]

The device 100 (corresponding to a transmitter for visible light communication) includes a visible light source such as an LED (Light Emitting Diode), lighting, or a light (also referred collectively to as a light source). Hereinafter, the device 100 may also be referred to as the "first device".

In the first device 100 in FIG. 6, a transmitter 102 gets, as an input thereto, information 101 related to a place or a location. Alternatively, information 105 related to time may be input to the transmitter 102. Information input to the transmitting unit 102 may include both the information 101 related to the place or the location and the information 105 related to the time.

The transmitter 102 gets, as inputs thereto, the information 101 related to the place or the location and/or the information 105 related to the time and generates a (light) modulated signal 103 based on these input signals and outputs the resultant modulated signal 103. The modulated signal 103 is transmitted, for example, from a light source 104.

An example of information 101 related to the place or the location is described below.

Example 1

The information 101 related to the place or the location may be information on a latitude of a place/location and/or information on a longitude of the place/location. For example, the information 101 related to the place or the location may be information indicating "latitude of 45° north and longitude of 135° east".

Example 2

The information 101 related to the place or the location may be information indicating an address. For example, the information 101 related to the place or the location may be information indicating "1-1-1 XX-cyo, Chiyoda-ku, Tokyo".

Example 3

The information 101 related to the place or the location may be information related to a building, a facility, or the like. For example, the information 101 related to the place or the location may be information indicating "Tokyo Tower".

Example 4

The information 101 related to the place or the location may be information related to a unique place/location of something installed in a building, a facility or the like.

For example, let it be assumed that there are spaces in a parking lot where it is allowed to park five cars. In this situation, let A-1 denote a first parking space, let A-2 denote a second parking space, let A-3 denote a third parking space, let A-4 denote a fourth parking space, and let A-5 denote a fifth parking space. In this case, for example, information indicating "A-3" may be employed as the information 101 related to the place or the location.

Note that such an example is not limited to the case of parking lots. For example, information related to "an area, a seat, a shop, a facility", or the like located in a concert facility, a stadium such as a baseball stadium, a soccer stadium, a tennis stadium or the like, on an airplane, in an airport lounge, in a railway facility, in a station, or the like may be employed as the information 101 related to the place or the location.

Examples of the information 101 related to the place or the location have been described above. Note that the method of configuring the information 101 related to the place or the location is not limited to the above example.
[Configuration of Terminal 150]

The terminal 150 (corresponding to the receiver for visible light communication) in FIG. 6 receives the modulated signal 103 transmitted from the first device 100.

A light receiver (light receiver) 151 is, for example, an image sensor such as a CMOS (Complementary Metal Oxide Semiconductor) sensor, an organic CMOS sensor, or the like. The light receiver 151 receives light including the modulated signal transmitted from the first device 100, and outputs a reception signal 152.

The reception signal 152 output from the light receiver 151 may be a signal including information of an image or a moving image acquired by the image sensor, or may be an output signal output from an element that performs photo-electric conversion (conversion from light to an electric signal). In the following description, when it is simply described that an apparatus at a receiving end receives a modulated signal without describing a process performed by the light receiver 151, it is assumed that the light receiver 151 in the apparatus at the receiving end performs photo-electric conversion (conversion from light to an electric signal) on the light including the modulated signal thereby obtaining a "signal of an image and/or a moving image" and a "modulated signal for transmitting information". However, the method described above is an example of a method in which the apparatus at the receiving end receives a modulated signal, and the method of receiving the modulated signal is not limited to this example.

A receiver 153 receives, as an input thereto, the reception signal 152, and performs processing such as demodulation, error correction decoding, and/or the like on the modulated signal included in the reception signal 152 and outputs a result as reception data 154.

A data analysis unit 155 receives, as an input thereto, the reception data 154 and analyzes the reception data 154 to estimate, for example, the place/location of the terminal 150, and outputs information 156 including at least place information and/or location information associated with the terminal 150.

A display 157 receives, as an input thereto, the information 156, and displays a place/location of the terminal 150 based on the place/location information associated with the terminal 150 included in the information 156.
[Frame Configuration]

Figure 7:
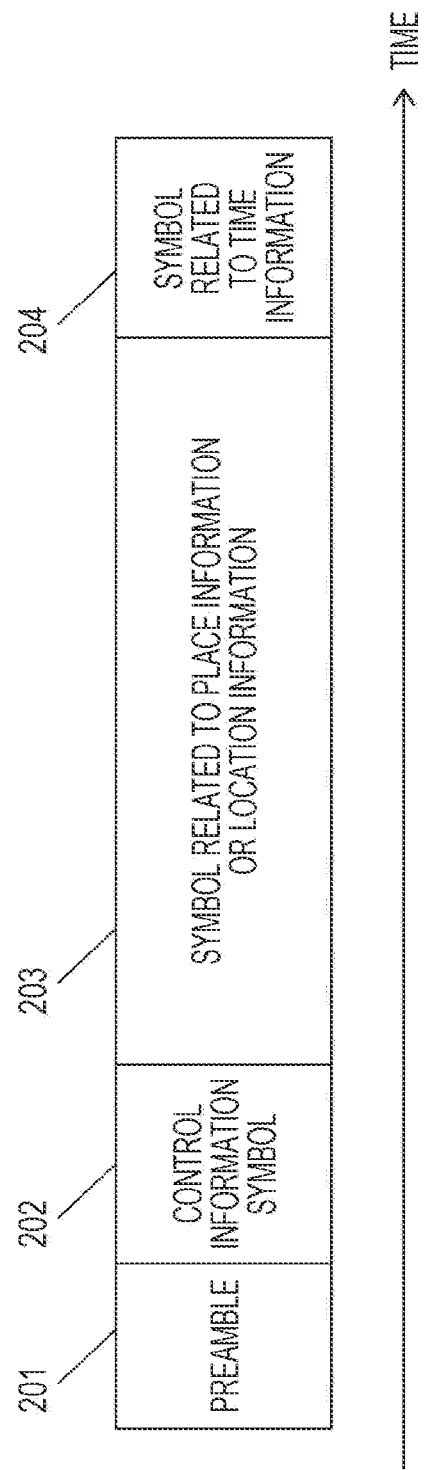
FIG. 7 is a diagram illustrating an example of a frame configuration according to Embodiment 1.

FIG. 7 illustrates an example of a frame configuration of a modulated signal transmitted by the first device 100.

In FIG. 7, a horizontal axis represents time. The first device 100 transmits, for example, a preamble 201, and then transmits a control information symbol 202, a symbol 203 related to place information or location information, and a symbol 204 related to time information.

The preamble 201 is a symbol for use by the terminal 150 in, when receiving a modulated signal transmitted from the first device 100, performing, for example, signal detection, time synchronization, frame synchronization, and/or the like.

The control information symbol 202 is a symbol including, for example, data indicating a configuration of a modulated signal, an error correction coding scheme being used, a frame configuration and/or the like.

The symbol 203 related to place information or location information is a symbol including information 101 related to the place or the location shown in FIG. 6.

Note that a frame may include a symbol other than the symbols 201, 202, and 203. For example, a frame may include a symbol 204 related to time information as shown in FIG. 7. The symbol 204 related to time information includes, for example, information 105 related to the time at which the first device 100 transmits a modulated signal. The frame configuration of the modulated signal transmitted by the first device 100 is not limited to that shown in FIG. 7, and the symbols included in the modulated signal are not limited to those shown in FIG. 7. The frame may include a symbol containing other data/information.

Effects

When the first device 100 transmits a modulated signal and the terminal 150 receives this modulated signal as described above with reference FIG. 6 and FIG. 7, effects are obtained as described below.

Visible light is used in transmitting the modulated signal from the first device 100, and thus this modulated signal can be received by the terminal 150 only when the location of the terminal 150 is not far from the location of the first device 100. Therefore, by obtaining the place/location information transmitted by the first device 100, the terminal 150 can easily obtain high-accuracy location information (without performing complicated signal processing).

Furthermore, when the first device 100 is installed in a place where it is difficult to receive GPS satellite radio waves, the terminal 150 can securely obtain high-accuracy location information by receiving the modulated signal transmitted from the first device 100 even in a situation in which it is difficult to receive radio waves from GPS satellites.

Embodiment 2

In Embodiment 2, an explanation is given for a case where a plurality of first devices 100 described in Embodiment 1 exist.

Figure 8:
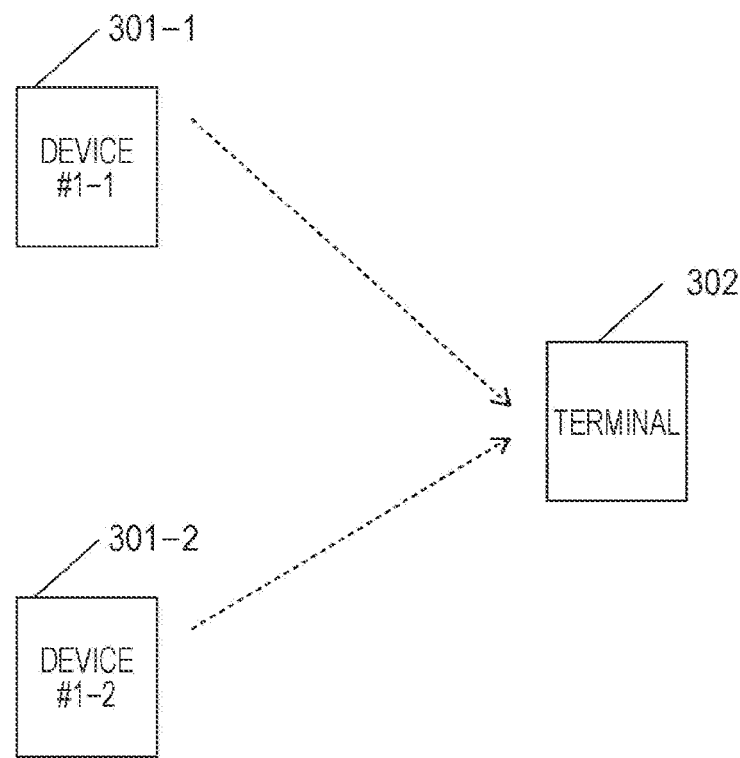
FIG. 8 is a diagram illustrating a positional relationship between a device and a terminal according to Embodiment 2.

In the present embodiment, for example, as shown in FIG. 8, a device #1-1 301-1 having a configuration similar to that of the first device 100 shown in FIG. 6 transmits a modulated signal. A terminal 302 having a configuration similar to that of the terminal 150 shown in FIG. 6 receives the modulated signal transmitted by the device #1-1 301-1, and obtains information related to, for example, a place/location #1-1 and information related to time #1-1.

Similarly, a device #1-2 301-2, having the same configuration as that of the first device 100 shown in FIG. 6, transmits a modulated signal. The terminal 302 receives the modulated signal transmitted from the device #1-2 301-2, and obtains, for example, information related to a place/location #1-2 and the information related to time #1-2.

The terminal 302 can calculate the distance between the device #1-1 301-1 and the device #1-2 301-2 shown in FIG. 8 from the information related to the place/location #1-1 and the information related to the place/location #1-2. The terminal 302 can also calculate the distance between the terminal 302 and the device #1-1 301-1 based on the information related to the time #1-1 and, for example, the information related to the time at which the terminal 302 receives the modulated signal transmitted from the device #1-1 301-1. Similarly, the terminal 302 can calculate the distance between the terminal 302 and the device #1-2 301-2 based on the information related to the time #1-2 and, for example, the information related to the time at which the terminal 302 receives the modulated signal transmitted from the device #1-2 301-2.

The terminal 302 can get to know the location of the device #1-1 301-1 from the information related to the place/location #1-1. The terminal 302 can get to know the location of the device #1-2 301-2 from the information related to the place/location #1-2.

Furthermore, the terminal 302 can obtain information indicating a "triangle formed by the device #1-1 301-1, the device #1-2 301-2, and the terminal 302" from the "distance between the device #1-1 301-1 and the device #1-2 301-2", the "distance between the device #1-1 301-1 and the terminal 302", and the "distance between the device #1-2 301-2 and the terminal 302".

Thus, the terminal 302 can calculate and obtain the high-accuracy location of the terminal 302 from the "location of the device #1-1 301-1", the "location of the device #1-2 301-2", and the "triangle formed by the device #1-1 301-1, the device #1-2 301-2, and the terminal 302".

The geodetic survey method used by the terminal 302 to obtain place/location information is not limited to that described above, but any geodetic survey method may be employed. Examples of geodetic survey methods include triangulation, traversing, trilateration, leveling, and the like.

As described above, in the present embodiment, the terminal 302 estimates the location of the terminal 302 with high accuracy by obtaining the above-described information from the plurality of devices 301 each including a light source that transmits place information.

In the present embodiment, as in the Embodiment 1, when the device 301 having the light source that transmits place information is installed in a place where it is difficult to receive GPS satellite radio waves, the terminal 302 can securely obtain high-accuracy location information by receiving the modulated signal transmitted from the device 301 even in a situation in which it is difficult to receive radio waves from GPS satellites.

In the above examples, the terminal 302 receives the modulated signal transmitted from the two devices 301. However, the terminal 302 may receive modulated signals transmitted from more than two devices 301 in a similar manner. As the number of devices 301 increases, the accuracy of the location information calculated by the terminal 302 increases.

Embodiment 3

Figure 9:
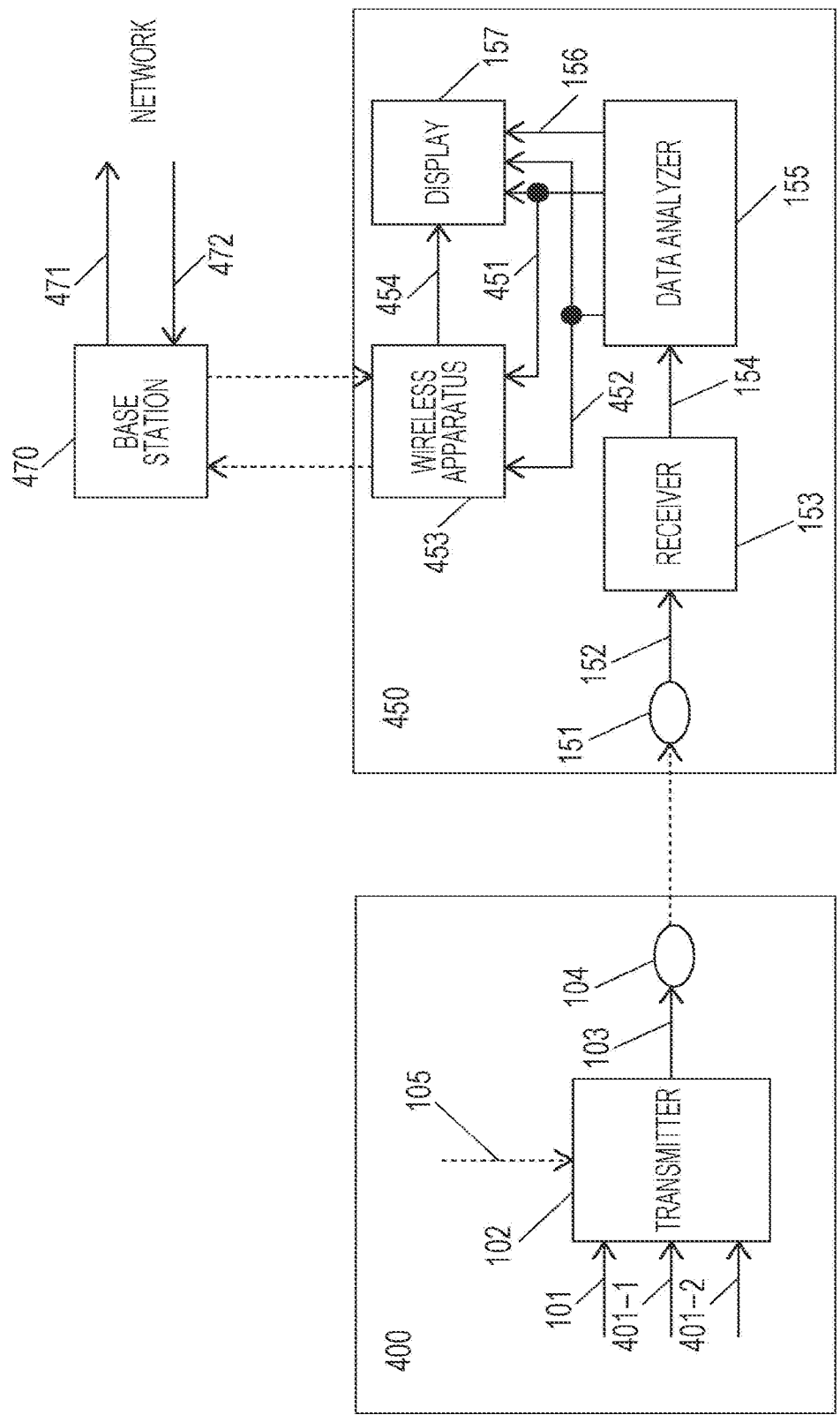
FIG. 9 is a diagram illustrating an example of a configuration of a communication system according to Embodiment 3.

FIG. 9 illustrates an example of a configuration of a device 400, a terminal 450, and a base station 470 (or an AP (access point)) that communicates with the terminal 450 according to Embodiment 3.

The device 400 includes, for example, a visible light source such as an LED, lighting, a light source, or a light. Hereinafter, the device 400 may also be referred to as a "first device".

In the first device 400 shown in FIG. 9, elements similar in operation to those in the first device 100 shown in FIG. 6 are denoted by similar reference numerals. In the terminal 450 shown in FIG. 9, elements similar in operation to those in the terminal 150 shown in FIG. 6 are denoted by similar reference numerals.

In the first device 400 in FIG. 9, a transmitter 102 gets, as inputs thereto, for example, information 101 related to the place or the location, information 401-1 related to an SSID (service set identifier) functioning as an identifier identifying the base station 470, and information 401-2 related to an access destination. Alternatively, information 105 related to time may be input to the transmitter 102.

The transmitter 102 gets, as inputs thereto, information 101 related to the place or the location, the information 401-1 related to the SSID, and the information 401-2 related to the access destination, and/or information 105 related to the time, and the transmitter 102 generates a (light) modulated signal 103 based on these input signals and outputs the resultant modulated signal 103. The modulated signal 103 is transmitted, for example, from a light source 104.

Examples of the information 101 related to the place or the location have been described above in Embodiment 1, and thus a further description thereof is omitted.

Next, information 401-1 related to the SSID and information 401-2 related to the access destination are described below.

First, the information 401-1 related to the SSID is described.

The information 401-1 related to the SSID is information indicating the SSID of the base station 470 in FIG. 9. In a case where it is determined in advance that the SSID notified via a light signal is the SSID of a secure base station, the first device 400 can provide, to the terminal 450, access to the base station 470 which is a secure access destination. This enables the terminal 450 in FIG. 9 to obtain information securely from base station 470.

On the other hand, the first device 400 can limit terminals that are allowed to access the base station 470 to those terminals that are located within a space in which it is possible to receive a light signal transmitted (emitted) by the first device 400.

When the terminal 450 receives a light signal transmitted in a predetermined scheme, the terminal 450 may determine that the notified SSID is an SSID of a secure base station. The terminal 450 may perform a separate process of determining whether the notified SSID is secure or not. For example, the first device 400 may transmit a light signal including a predetermined identifier, and the terminal 450 may determine whether the notified SSID is an SSID of a secure base station or not based on the received identifier. Alternatively, the terminal 450 may not perform the process of determining whether the base station is secure or not, but a user may select a high-security first device 400 based on the nature of visible light. The terminal 450 then may receive a light signal from this first device 400 and may obtain the SSID of the high-security base station.

Although only the base station 470 is shown as a base station in FIG. 9, there may be one or more other base stations (or APs) in addition to the base station 470. Also, in such a case, the terminal 450 may access the base station 470 using the SSID obtained from the first device 400 to acquire information.

Next, information 401-2 related to the access destination is described.

The access destination information 401-2 is information related to an access destination to which the terminal 450 is to access to acquire information after the terminal 450 accesses the base station 470. A specific example of an operation according to the present embodiment will be described later.

The SSID information 401-1 and the access destination information 401-2 have been described above.

The terminal 450 receives the modulated signal 103 transmitted from the first device 400.

The light receiver 151 is, for example, an image sensor such as a CMOS sensor or an organic CMOS sensor. The light receiver 151 receives light including the modulated signal transmitted from the first device 400, and outputs a reception signal 152.

The receiver 153 receives, as an input thereto, the reception signal 152 received by the light receiver 151, and performs processing such as demodulation/error correction decoding on the modulated signal included in the reception signal 152 and outputs a result as reception data 154.

The reception data 154 is input to the data analysis unit 155. The data analysis unit 155 estimates, for example, the place/location of the terminal 450 from the reception data 154. The data analysis unit 155 outputs information 156 including at least place/location information associated with the terminal 450, information 451 related to the SSID, and information 452 related to the access destination.

The display 157 receives, as inputs thereto, the information 156 including the place/location information related to the terminal 450, the information 451 related to the SSID, and the information 452 related to the access destination, and the display 157 displays, for example, the place/location of the terminal 450, the SSID of the communication destination to be accessed by the wireless apparatus 453 disposed in the terminal 450, and/or the access destination (hereinafter, this displaying will be referred to as "first displaying").

After performing the first displaying, the wireless apparatus 453 receives, as inputs thereto, the information 451 related to the SSID and the information 452 related to the access destination. Based on the information 451 related to the SSID, the wireless apparatus 453 connects to a communication destination by using, for example, a radio wave. In the case shown in FIG. 9, the wireless apparatus 453 is connected to the base station 470.

The wireless apparatus 453 generates a modulated signal from the data including the information related to the access destination based on the information 452 related to the access destination, and transmits the resultant modulated signal to the base station 470 using, for example, a radio wave.

In FIG. 9, the base station 470 which is a communication counterpart of the terminal 450 receives the modulated signal transmitted from the wireless apparatus 453 of the terminal 450.

Then, the base station 470 performs processing such as demodulation, error correction decoding on the received modulated signal and outputs reception data 471 including the information on the access destination transmitted from the terminal 450. The base station 470 accesses a desired access destination via a network based on the access destination information, and obtains, for example, desired information 472 from the accessed destination. The base station 470 receives the desired information 472 as an input thereto, generates a modulated signal from the desired information 472, and transmits the resultant modulated signal to the terminal 450 (the wireless apparatus 453) using, for example, a radio wave.

The wireless apparatus 453 of the terminal 450 receives the modulated signal transmitted from the base station 470, and performs processing such as demodulation/error correction decoding, and/or the like thereby obtaining desired information 472.

Let it be assumed by way example that the desired information 472 includes information about a map, a map of a building/floor guide, a map of a facility/floor guide, a map of a parking lot/floor guide, "area/seat/store/facility" located in a concert facility/stadium/airplane/airport lounge/railway/station etc.

The display 157 receives, as inputs thereto, information 454 including the desired information 472, information 156 including at least the place/location information related to the terminal 450, and information 451 related to the SSID, and the display 157 performs the first displaying and further displaying such that the location of the terminal 450 is mapped on the displayed information such as the map, the floor guide, facility information, seat information, or shop information based on the desired information 472 and the information 156 including at least information on the place/location of the terminal 450.

Figure 10:
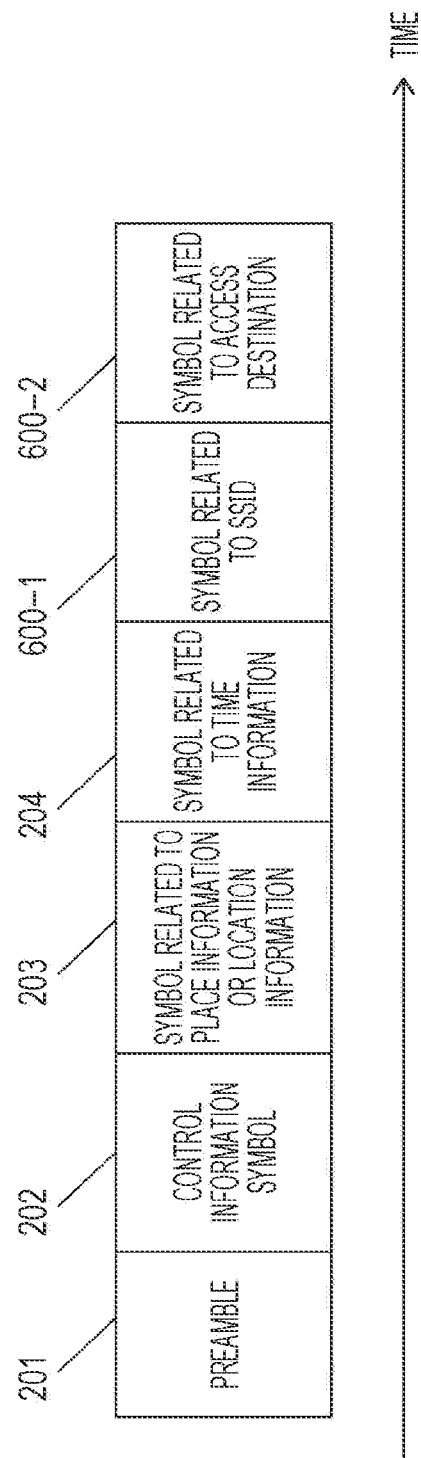
FIG. 10 is a diagram illustrating an example of a frame configuration of a modulated signal transmitted by a first device according to Embodiment 3.

FIG. 10 illustrates an example of a frame configuration of a modulated signal transmitted by the first device 400 shown in FIG. 9. In FIG. 10, a horizontal axis represents time. In FIG. 10, symbols similar, in information conveyed thereby, to symbols shown in FIG. 7 are denoted by similar reference numerals, and a further description thereof is omitted.

The first device 400 transmits, for example, a preamble 201, and then transmits a control information symbol 202, a symbol 203 related to place information or location information, and a symbol 204 related to time information, and, in addition, a symbol 600-1 related to the SSID and a symbol 600-2 related to the access destination.

The symbol 600-1 related to the SSID is a symbol for transmitting the information 401-1 related to the SSID in FIG. 9, and the symbol 600-2 related to the access destination is a symbol for transmitting the information 401-2 related to the access destination in FIG. 9. The frame shown in FIG. 10 may include a symbol other than the symbols described in FIG. 10. Note that the frame configuration, including the order of transmitting symbols, is not limited to the configuration shown in FIG. 10.

Figure 11:
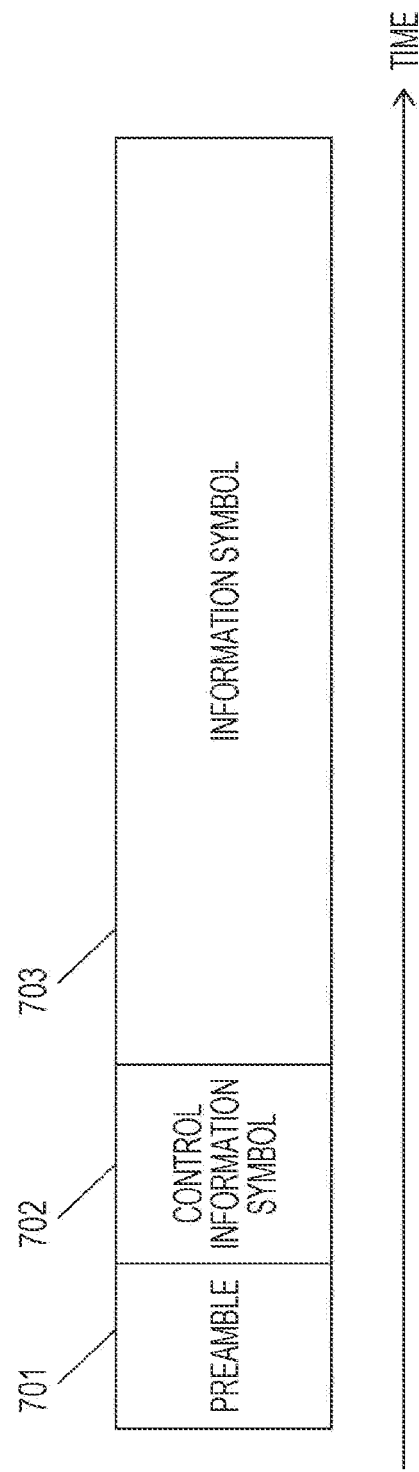
FIG. 11 is a diagram illustrating an example of a frame configuration of a modulated signal transmitted by a base station according to Embodiment 3.

FIG. 11 illustrates an example of a frame configuration of a modulated signal transmitted by the base station 470 shown in FIG. 9. In FIG. 11, a horizontal axis represents time.

As shown in FIG. 11, the base station 470 transmits, for example, a preamble 701, and then transmits a control information symbol 702 and an information symbol 703.

The preamble 701 is a symbol used by the terminal 450 in, when receiving a modulated signal transmitted by the base station 470, performing, for example, signal detection, time synchronization, frame synchronization, frequency synchronization, frequency offset estimation, and the/or like.

The control information symbol 702 is, for example, a symbol including data such as information related to an error correction coding scheme and modulation scheme used in generating the modulated signal, information related to a frame configuration, and/or the like. The wireless apparatus 453 of the terminal 450 performs processing such as demodulation or the like on the modulated signal based on the information represented by the control information symbol 702.

The information symbol 703 is a symbol for transmitting information. In the present embodiment, the information symbol 703 is a symbol for transmitting the desired information 472 described above.

The base station 470 shown in FIG. 9 may transmit a frame including a symbol other than the symbols shown in FIG. 11. For example, the base station 470 may transmit a frame including a pilot symbol (a reference symbol) in the middle of the information symbol 703, or the like. The frame configuration, including the order of transmitting symbols, is not limited to the configuration shown in FIG. 11. In FIG. 11, a plurality of symbols may exist in a direction along the frequency axis. That is, in FIG. 11, symbols may exist at a plurality of frequencies (a plurality of carriers).

For example, in a method, the modulated signal in the frame configuration shown in FIG. 10 may be transmitted by the first device 400, for example, repeatedly at regular intervals. This makes it possible for a plurality of terminals 400 to perform the operation as described above.

Figure 12:
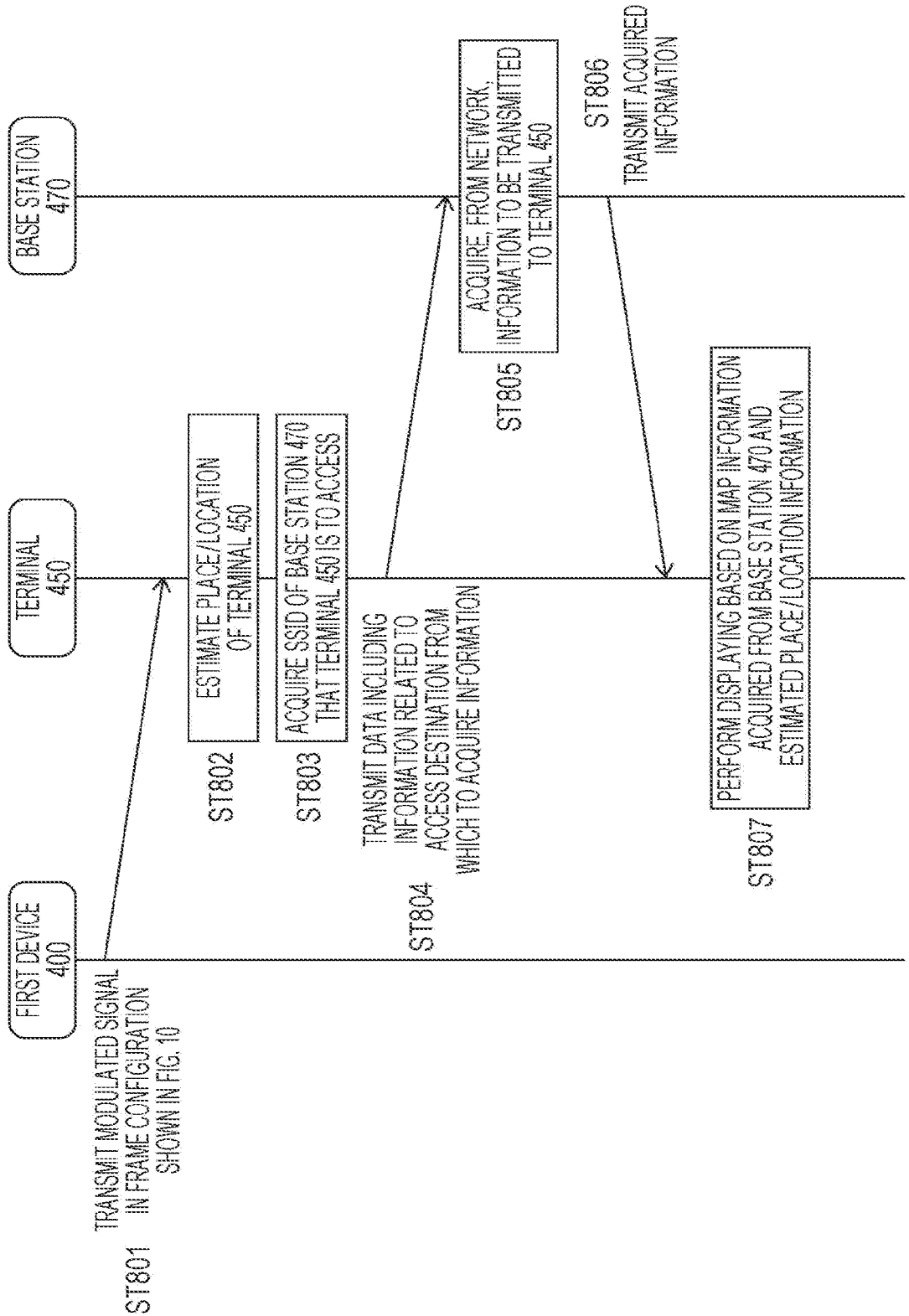
FIG. 12 is a flow chart illustrating an example of a process performed in a communication system according to Embodiment 3.

FIG. 12 is a flow chart illustrating an example of a process performed by the "first device 400", the "terminal 450", and the "base station 470" describe above with reference to FIG. 9.

First, the first device 400 transmits a modulated signal in the frame configuration shown in FIG. 10 (ST801).

The terminal 450 receives the modulated signal transmitted from the first device 400, and estimates the place/location of the terminal 450 (ST802).

The terminal 450 receives the modulated signal transmitted from the first device 400, and also detects the SSID of the base station 470 that the terminal 450 is to access (ST803).

The terminal 450 transmits, to the base station 470 using a radio wave, a modulated signal including data including information 452 related to an access destination therefrom to obtain information such as a map (ST804).

The base station 470 receives the modulated signal transmitted from the terminal 450 and obtains access destination information. The base station 470 accesses a desired access destination via a network, and obtains desired information such as a map (information to be transmitted to the terminal 450) (ST805).

The base station 470 transmits a modulated signal including the desired information such as the acquired map to the terminal 450 using, for example, a radio wave (ST806).

The terminal 450 receives the modulated signal transmitted from the base station 470 and obtains information such as a map. The terminal 450 then performs displaying based on the information such as the map and the already obtained information related to the place/location of the terminal 450 (ST807).

Note that the terminal 450 may store the map (nearby information) and the location information in a storage unit (not shown) of the terminal 450 such that a user is allowed to access the information stored in the storage unit when the user of the terminal 450 wants to access. This makes it possible for the user to more conveniently use the map (nearby information) and the location information.

As described above, visible light is used in transmitting the modulated signal from the first device 400, and thus this modulated signal can be received by the terminal 450 only when the terminal 450 is located within a range from the location of the first device 400 in which it is possible to receive the light signal. Therefore, by obtaining the place/location information transmitted by the first device 400, the terminal 450 can easily obtain high-accuracy location information (without performing complicated signal processing).

Furthermore, when the first device 400 is installed in a place where it is difficult to receive GPS satellite radio waves, the terminal 450 can securely obtain high-accuracy location information by receiving the modulated signal transmitted from the first device 400 even in a situation in which it is difficult to receive radio waves from GPS satellites.

Furthermore, based on the SSID information transmitted from the first device 400, the terminal 450 may connect with the base station (or the AP) 470 to obtain information thereby making it possible for the terminal 450 to securely obtain information. This is because, when the terminal 450 obtains information from the modulated signal of visible light, use of the visual light makes it possible for the user to easily recognize, via a visual inspection or the like, the first device 400 that transmits the modulated signal and to easily determine whether the information source is secure or not. In contrast, for example, in a case where an SSID is acquired from a modulated signal of a radio wave transmitted via a wireless LAN, it is difficult for a user to determine a device from which the radio wave is received. Thus, from the point of view of ensuring the security of information, visible light communication is more suitable for acquiring an SSID than wireless LAN communication.

A plurality of signals may be further input to the wireless apparatus 453 of the terminal 450 in FIG. 9. For example, a control signal for controlling the wireless apparatus 453 and information to be transmitted to the base station 470 may be input to the wireless apparatus 453. In this case, by way of example, the wireless apparatus 453 may start communication based on the control signal. As described above, in the present embodiment, the configuration of the first device is not limited to the configuration of the first device 400 in FIG. 9, the configuration of the terminal is not limited to the configuration of the terminal 450 of FIG. 9, and the connection destination to be connected by the base station and the configuration of the destination device are not limited to the connection destination to be connected by the base station 470 and the configuration of the destination device shown in FIG. 9.

Furthermore, although in the example shown in FIG. 9, the base station 470 is the only base station existing there, there may be a plurality of (secure) base stations (or APs) which can be accessed by the terminal 450. In this case, the symbol related to the SSID transmitted by the first device 400 shown in FIG. 9 may include information indicating the respective SSIDs of the plurality of base stations (or APs). In this case, the display 157 of the terminal 450 in FIG. 9 displays information indicating access destinations (in the above-described "first displaying") including a list of SSIDs of the plurality of base stations and/or a list of a plurality of access destinations. The terminal 450 in FIG. 9 may select one or more base stations to which a wireless connection is actually made based on the information indicating the SSIDs of the plurality of base stations (or APs) (that is, the terminal 450 may connect to the plurality of base stations at the same time).

For example, let it be assumed that there are three base stations 470. Herein, let the three base stations 470 be respectively referred to as a base station #A, a base station #B, and a base station #C. Furthermore, let it be assumed that the SSID of the base station #A is "abcdef", the SSID of the base station #B is "ghijk", and the SSID of the base station #C is "pqrstu". In this case, the symbol 600-1 related to the SSID described in the modulated signal transmitted from the first device 400 in the frame configuration shown in FIG. 10 includes information indicating that the SSID of the base station #A is "abcdef", SSID of the base station #B is "ghijk" and the SSID of the base station #C is "pqrstu". The terminal 450 in FIG. 9 receives the symbol 600-1 related to the SSID, and selects one or more base stations 470 to be actually wirelessly connected based on the information indicating that the SSID of the base station #A is "abcdef", SSID of the base station #B is "ghijk" and the SSID of the base station #C is "pqrstu".

Embodiment 4

Figure 13:
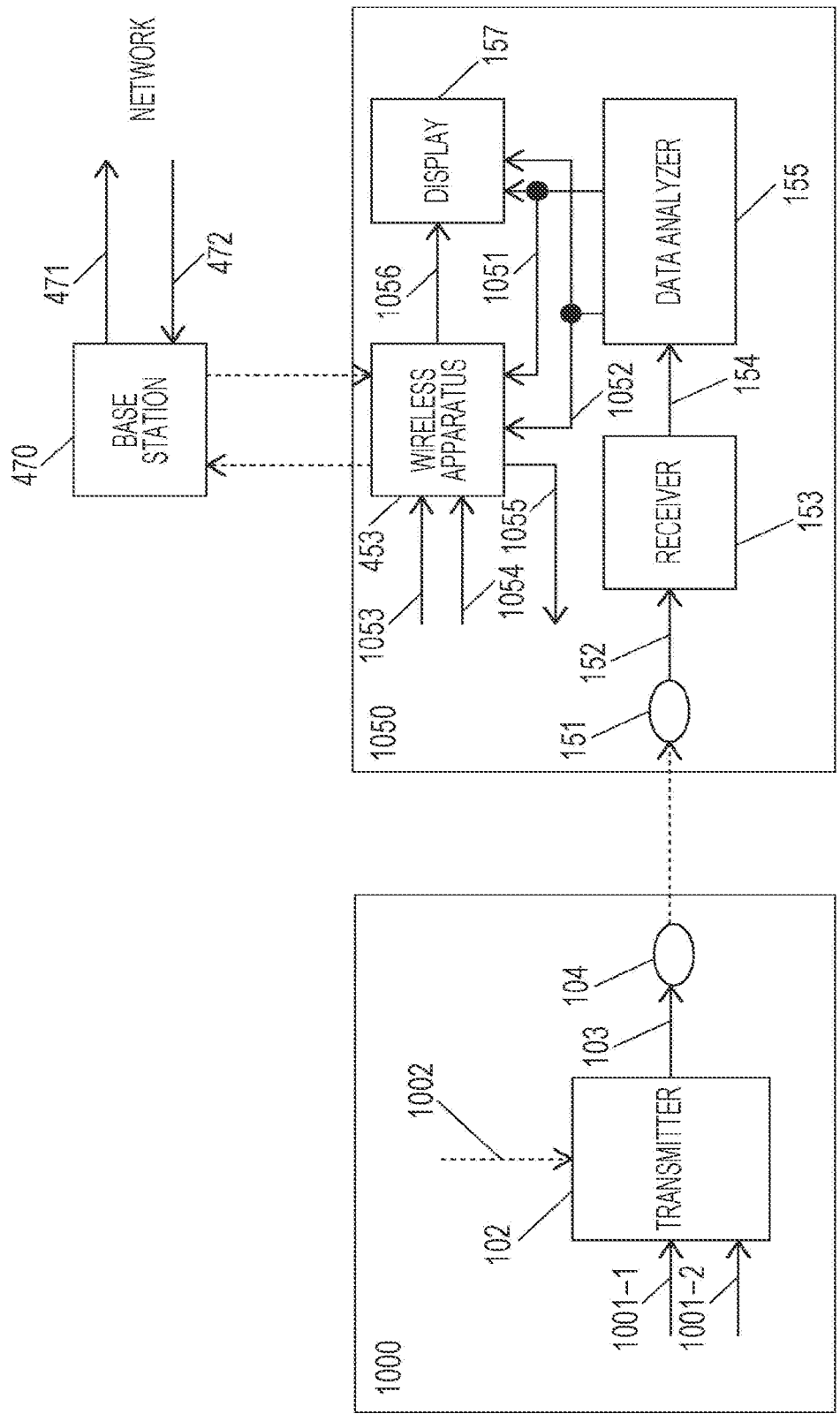
FIG. 13 is a diagram illustrating an example of a configuration of a communication system according to Embodiment 4.

FIG. 13 is a diagram illustrating an example of a configuration of a communication system according to Embodiment 4.

The communication system shown in FIG. 13 includes, for example, a device 1000, a terminal 1050, and a base station (or an AP) 470 that communicates with the terminal 1050.

The device 1000 includes, for example, a visible light source such as an LED, lighting, a light source, and a light (hereinafter, referred to as a light source 104). Hereinafter, the device 1000 may also be referred to as a "second device" according to the present embodiment.

In the second device 1000 shown in FIG. 13, elements similar in operation to those in the first device 100 shown in FIG. 6 are denoted by similar reference numerals. In the terminal 1050 shown in FIG. 13, elements similar in operation to those in the terminal 150 shown in FIG. 6 are denoted by similar reference numerals. Note that it is assumed that communication between the wireless apparatus 453 of the terminal 1050 and the base station 470 shown in FIG. 13 is performed using, for example, radio waves.

In the second device 1000 in FIG. 13, a transmitter 102 gets, as inputs thereto, information 1001-1 related to an SSID, information 1001-2 related to an encryption key, and data 1002, and the second device 1000 generates a (light) modulated signal 103 based on these input signals and outputs the resultant modulated signal 103. The modulated signal 103 is transmitted, for example, from a light source 104.

Next, information 1001-1 related to the SSID and information 1001-2 related to the encryption key are described below.

First, the information 1001-1 related to the SSID is described.

The information 1001-1 related to the SSID is information indicating the SSID of the base station 470 in FIG. 13. By way of example, the base station 470 transmits a modulated signal to the terminal 1050 via a radio wave, and receives a modulated signal from the terminal 105 via a radio wave. That is, the second device 1000 can provide, to the terminal 1050, access to the base station 470, which is a secure access destination. Thus, the terminal 1050 shown in FIG. 13 can securely obtain information from the base station 470.

On the other hand, the second device 1000 can limit terminals allowed to access the base station 470 to those terminals that are located within a space in which it is possible to receive a light signal transmitted (emitted) by the second device 1000.

When the terminal 1050 receives a light signal transmitted in a predetermined scheme, the terminal 1050 may determine that the notified SSID is an SSID of a secure base station. The terminal 1050 may perform a separate process of determining whether the notified SSID is secure or not. For example, the second device 1000 may transmit a light signal including a predetermined identifier, and the terminal 1050 may determine whether the notified SSID is an SSID of a secure base station or not based on the received identifier.

Although only the base station 470 is shown in FIG. 13, there may be one or more other base stations (or APs) in addition to the base station 470. Also, in such a case, the terminal 1050 may access the base station 470 using the SSID obtained from the second device 1000 to acquire information.

Next, the information 1001-2 related to the encryption key is described.

The information 1001-2 related to the encryption key is information related to an encryption key required for the terminal 1050 to communicate with the base station 470. By acquiring the information 1001-2 related to the encryption key from the second device 1000, it becomes possible for the terminal 1050 to perform encrypted communication with the base station 470.

The information 1001-1 related to the SSID and the information 1001-2 related to the encryption key have been described above.

The terminal 1050 in FIG. 13 receives a modulated signal transmitted from the second device 1000. In the terminal 1050 shown in FIG. 13, elements similar in operation to those in the terminal 150 shown in FIG. 6 or the terminal 450 shown in FIG. 9 are denoted by similar reference numerals.

The light receiver 151 of the terminal 1050 is, for example, an image sensor such as a CMOS sensor or an organic CMOS sensor. The light receiver 151 receives light including the modulated signal transmitted from the second device 1000, and outputs a reception signal 152.

The receiver 153 receives, as an input thereto, the reception signal 152 received by the light receiver 151, and performs processing such as demodulation/error correction decoding on the modulated signal included in the reception signal 152 and outputs a result as reception data 154.

The data analysis unit 155 receives, as an input thereto, the reception data 154, and outputs, based on the reception data 154, for example, information 1051 related to an SSID of a base station that is to be connected and information 1052 related to an encryption key for communicating with the base station that is to be connected. Encryption schemes for use in a wireless LAN (Local Area Network) include, for example, WEP (Wired Equivalent Privacy), WPA (Wi-Fi Protected Access), WPA2 (Wi-Fi Protected Access 2) (PSK (Pre-Shared Key) mode, EAP (Extended Authentication Protocol) mode). Note that the encryption schemes are not limited to the examples described above.

The display 157 receives, as inputs thereto, the information 1051 on the SSID and the information 1052 on the encryption key, and displays, for example, an SSID of a communication counterpart to be accessed by the wireless apparatus 453 of the terminal 1050 and an encryption key (this displaying is referred to as "first displaying" according to the present embodiment).

For example, after the first displaying, the wireless apparatus 453 receives, as inputs thereto, the SSID information 1051 and the encryption key information 1052, and establishes a connection with the base station 470 (for example, a radio wave is used in the connection). In this situation, in a case where the base station 470 also communicates with the wireless apparatus 453 of the terminal 1050, the base station 470 transmits a modulated signal using, for example, a radio wave.

Thereafter, the wireless apparatus 453 receives, as inputs thereto, the data 1053 and the control signal 1054, and modulates the data 1053 according to the control indicated by the control signal 1054 and transmits a result as the modulated signal using a radio wave.

Then, for example, the base station 470 performs data transmission (471) to a network and data reception (472) from the network. Thereafter, for example, the base station 470 transmits the modulated signal to the terminal 1050 using a radio wave.

The wireless apparatus 453 in the terminal 1050 performs processing such as demodulation, error correction decoding, and/or the like on the modulated signal received via the radio wave thereby acquiring reception data 1056. The display 157 performs displaying based on the reception data 1056.

Figure 14:
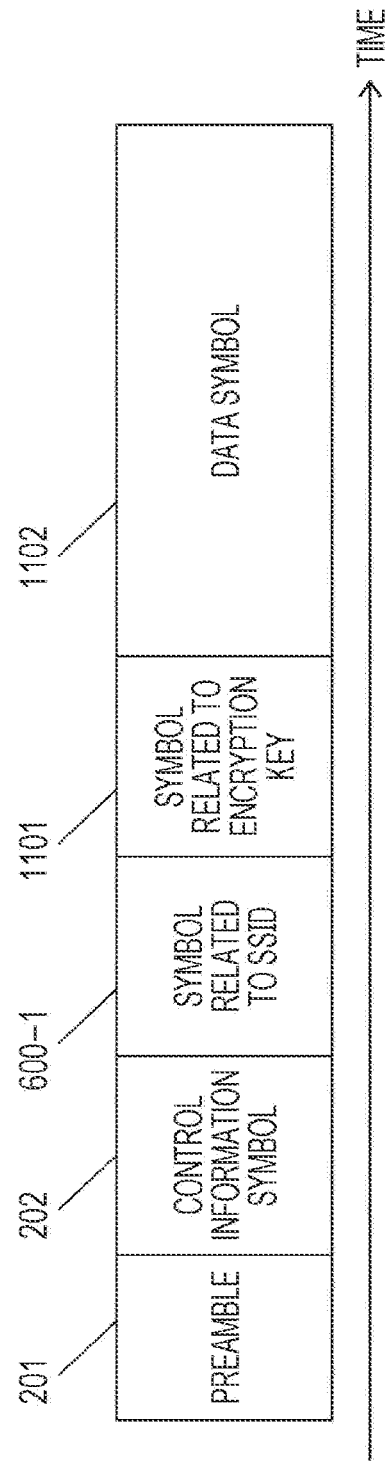
FIG. 14 is a diagram illustrating an example of a frame configuration of a modulated signal transmitted by a first device according to Embodiment 4.

FIG. 14 illustrates an example of a frame configuration of the modulated signal transmitted by the second device 1000 shown in FIG. 13. In FIG. 14, a horizontal axis represents time. In FIG. 14, symbols similar to those shown in FIG. 7 or FIG. 10 are denoted by similar reference numerals, and a description thereof is omitted.

A symbol 600-1 related to the SSD is a symbol for transmitting the information 1001-1 related to the SSID shown in FIG. 13, and a symbol 1101 related to the encryption key is a symbol for transmitting the information 1001-2 related to the encryption key shown in FIG. 13. A data symbol 1102 is a symbol for transmitting the data 1002 shown in FIG. 13.

The second device 1000 transmits a preamble 201, a control information symbol 202, a symbol 600-1 related to the SSID, a symbol 1101 related to the encryption key, and a data symbol 1102. The second device 1000 may transmit a frame including a symbol other than the symbols shown in FIG. 14. The frame configuration, including the order of transmitting symbols, is not limited to the configuration shown in FIG. 14.

Figure 15:
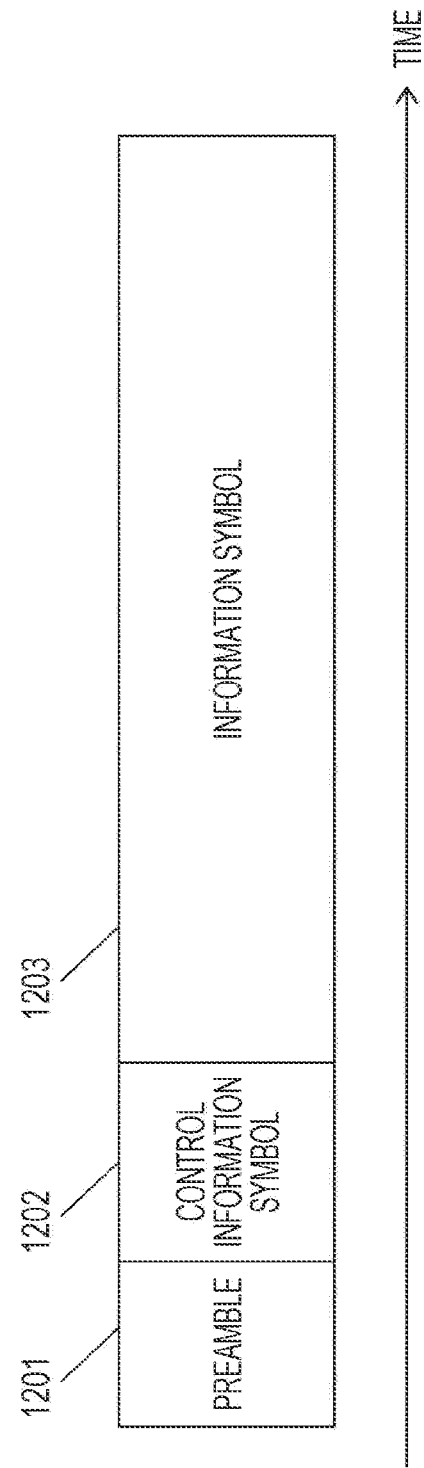
FIG. 15 is a diagram illustrating an example of a frame configuration of a modulated signal transmitted by a wireless apparatus of a terminal according to Embodiment 4.

FIG. 15 illustrates an example of a frame configuration of a modulated signal transmitted by the wireless apparatus 453 included in the terminal 1050 shown in FIG. 13. In FIG. 15, a horizontal axis represents time.

As shown in FIG. 15, the wireless apparatus 453 included in the terminal 1050 transmits, for example, a preamble 1201, and then transmits a control information symbol 1202 and an information symbol 1203.

The preamble 1201 is a symbol for use by the base station 470 in, when receiving the modulated signal transmitted from the wireless apparatus 453 of the terminal 1050, performing, for example, signal detection, time synchronization, frame synchronization, a frequency synchronization, frequency offset estimation and/or the like.

The control information symbol 1202 is, for example, a symbol including data such as information related to an error correction coding scheme and a modulation scheme used in generating a modulated signal, information related to a frame configuration, information related to a transmission scheme, and/or the like. The base station 470 performs processing such as demodulation on the modulated signal or the like based on the information included in the control information symbol 1202.

The information symbol 1203 is a symbol for the wireless apparatus 453 of the terminal 1050 to transmit data.

The wireless apparatus 453 of the terminal 1050 may transmit a frame including a symbol other than the symbols shown in FIG. 15. For example, the wireless apparatus 453 may transmit a frame including a pilot symbol (a reference symbol) in the middle of the information symbol 1203, or the like. The frame configuration, including the order of transmitting symbols, is not limited to the configuration shown in FIG. 15. In FIG. 15, a plurality of symbols may exist in a direction along the frequency axis. That is, in FIG. 15, symbols may exist at a plurality of frequencies (a plurality of carriers). In Embodiment 3, when the wireless apparatus 453 included in the terminal 450 shown in FIG. 9 transmits a modulated signal, the frame configuration shown in FIG. 15 may be used.

The frame configuration of the modulated signal transmitted by base station 470 according to the present embodiment is the same as the frame configuration according to Embodiment 3 described above with reference to FIG. 11. That is, as shown in FIG. 11, the base station 470 transmits, for example, a preamble 701, and then transmits a control information symbol 702 and an information symbol 703.

The preamble 701 is a symbol for use by the wireless apparatus 453 of the terminal 1050 in, when receiving a modulated signal transmitted by the base station 470, performing, for example, signal detection, time synchronization, frame synchronization, frequency synchronization, frequency offset estimation, and the/or like.

The control information symbol 702 is, for example, a symbol including data such as information related to an error correction coding scheme and a modulation scheme used in generating a modulated signal, information related to a frame configuration, information related to a transmission scheme, and/or the like. The wireless apparatus 453 of the terminal 1050 performs processing such as demodulation or the like on the modulated signal based on the information represented by the control information symbol 702.

The information symbol 703 is a symbol used by the base station 470 to transmit data.

The base station 470 shown in FIG. 13 may transmit a frame including a symbol other than the symbols shown in FIG. 11. For example, the base station 470 may transmit a frame including a pilot symbol (a reference symbol) in the middle of the information symbol 703, or the like. The frame configuration, including the order of transmitting symbols, is not limited to the configuration shown in FIG. 11. In FIG. 11, a plurality of symbols may exist in a direction along the frequency axis. That is, in FIG. 11, symbols may exist at a plurality of frequencies (a plurality of carriers).

For example, in a method, the modulated signal in the frame configuration shown in FIG. 14 may be transmitted, for example, by the second device 1000, for example, repeatedly at regular intervals. This makes it possible for a plurality of terminals 1050 to perform the operation as described above.

Figure 16:
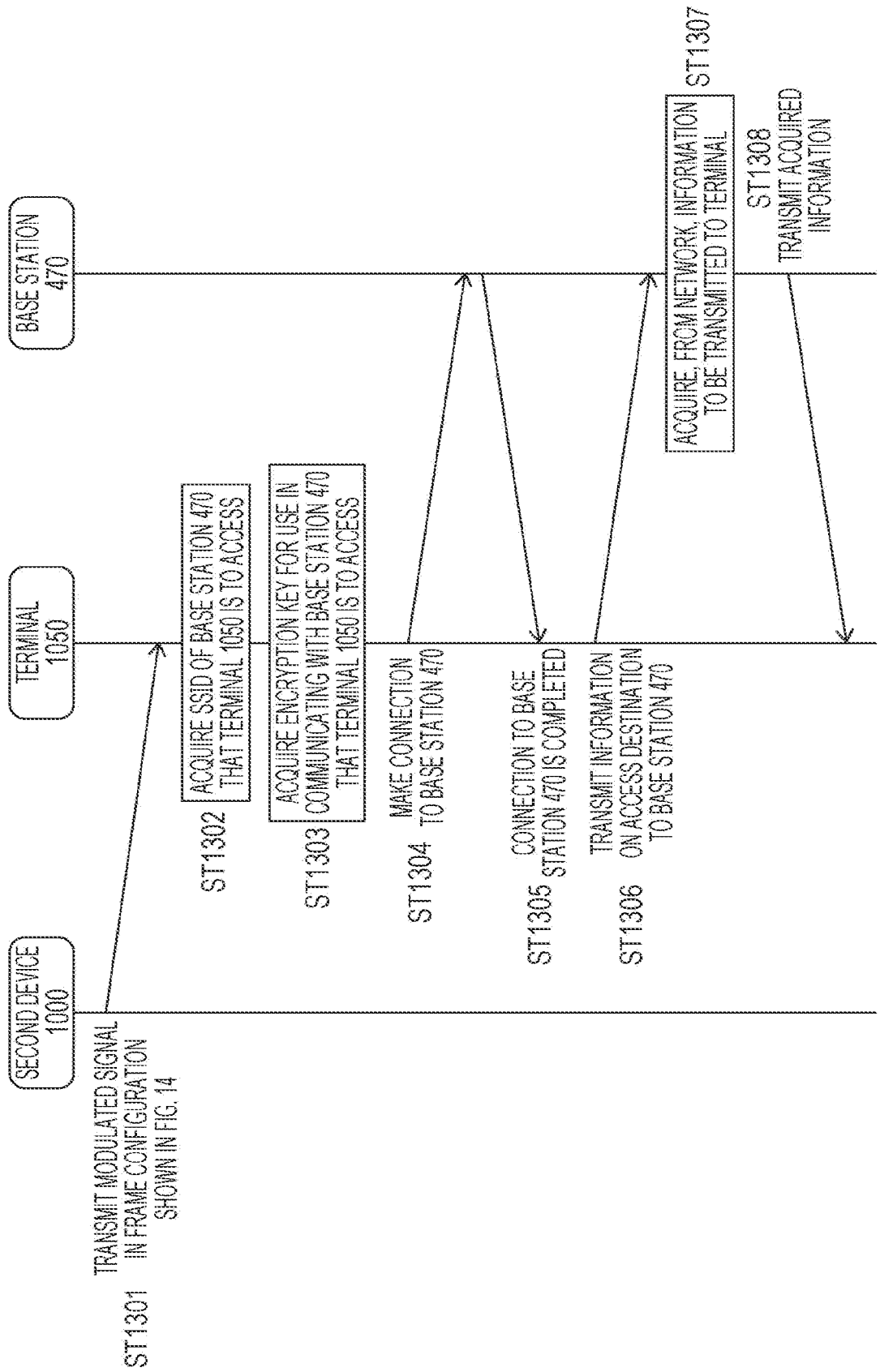
FIG. 16 is a flow chart illustrating an example of a process performed in a communication system according to Embodiment 4.

FIG. 16 is a flow chart illustrating an example of a process performed by the "second device 1000", the "terminal 1050", and the "base station 470" described above with reference to FIG. 13.

First, the second device 1000 transmits a modulated signal in the frame configuration shown in FIG. 14 (ST1301).

The terminal 1050 receives the modulated signal transmitted from the second device 1000, and detects the SSID of the base station 470 that the terminal 1050 is to access (ST1302).

The terminal 1050 also acquires an encryption key used for communication with the base station 470 to be accessed by the terminal 1050 (ST1303).

The terminal 1050 then connects to the base station 470 using a radio wave (ST1304). When the terminal 1050 receives a response from the base station 470, the connection with the base station 470 is completed (ST1305).

The terminal 1050 then transmits connection destination information to the base station 470 using a radio wave (ST1306).

The base station 470 obtains information to be transmitted to the terminal 1050 from a network (ST1307).

The base station 470 transmits the obtained information to the terminal 1050 using a radio wave. The terminal 1050 obtains this information (ST1308). The terminal 1050 may obtain necessary information from the network via the base station 470, for example, when necessary.

As described above, the terminal 1050 connects to the base station 470 based on the information on the SSID and the information on the encryption key transmitted from the second device 1000, and thus the terminal 1050 can securely acquire information via the base station 470 guaranteed to be secure. This is because when the terminal 1050 obtains information from a modulated signal of visible light, use of the visible light allows the user to easily determine whether the information source is secure or not. In contrast, for example, in a case where an SSID is acquired from a modulated signal of a radio wave transmitted via a wireless LAN, it is difficult for a user to determine a device from which the radio wave is received. Thus, from the point of view of ensuring the security of information, visible light communication is more suitable for acquiring an SSID than wireless LAN communication.

In the present embodiment described above, by way of example, the second device 1000 transmits the information on the encryption key. However, for example, when the base station 470 does not perform communication encrypted using an encryption key, the second device 1000 may transmit only the information on the SSID without transmitting the information on the encryption key. In this case, the operation may be performed in a similar manner as described above except that part of the operation related to the encryption key described above is not performed.

Note that the configuration of the second device is not limited to the specific configuration of the second device 1000 shown in FIG. 13. The configuration of the terminal is not limited to the specific configuration of the terminal 1050 shown in FIG. 13. The connection destination to which the base station is connected is not limited to the connection destination to which the base station 470 shown in FIG. 13 is connected, and the configuration of the connection destination device is not limited to the configuration of the connection destination device shown in FIG. 13.

Furthermore, although in the example shown in FIG. 13, the base station 470 is the only base station existing there, there may be a plurality of (secure) base stations (or APs) which can be accessed by the terminal 1050. Note that the plurality of base stations and the terminal 1050 transmit and receive modulated signals using radio waves. In this case, the symbol related to the SSID transmitted by the second device 1000 shown in FIG. 13 may include information indicating the respective SSIDs of the plurality of base stations (or APs). In this case, the display 157 of the terminal 1050 in FIG. 13 displays information indicating access destinations including a list of SSIDs of the plurality of base stations and/or a list of a plurality of access destinations. The symbol related to the encryption key transmitted by the second device 1000 shown in FIG. 13 may include information indicating the respective encryption keys for connecting to the respective base stations (or APs). The terminal 1050 in FIG. 13 may select one or more base stations to be actually connected wirelessly (for example, using radio waves) based on the information on the SSIDs of the plurality of base stations and the information on the encryption keys (that is, the terminal 1050 may be connected to a plurality of base stations at the same time).

For example, let it be assumed that there are three base stations 470. Herein, let the three base stations 470 be respectively referred to as a base station #A, a base station #B, and a base station #C. Furthermore, let it be assumed that the SSID of the base station #A is "abcdef", the SSID of the base station #B is "ghijk", and the SSID of the base station #C is "pqrstu". Let it be further assumed that an encryption key for connecting to the base station #A is "123", an encryption key for connecting to the base station #B is "456", and an encryption key for connecting to the base station #C is "789".

In this case, the symbol 600-1 related to the SSID described in the modulated signal transmitted from the second device 1000 in the frame configuration shown in FIG. 14 includes information indicating the SSID of the base station #A is "abcdef", SSID of the base station #B is "ghijk" and the SSID of the base station #C is "pqrstu". The symbol 1101 related to the encryption key in the frame configuration shown in FIG. 14 includes information indicating that the encryption key for connecting to the base station #A is "123", the encryption key for connecting to the base station #B is "456", and the encryption key for connecting to the base station #C is "789".

The terminal 1050 in FIG. 13 receives the symbol 600-1 related to the SSID thereby obtaining information indicating that the SSID of the base station #A is "abcdef", the SSID of the base station #B is "ghijk" and the SSID of the base station #C is "pqrstu". The terminal 1050 also receives the symbol 1101 related to the encryption key thereby obtaining information indicating that the encryption key for connecting to the base station #A is "123", the encryption key for connecting to the base station #B is "456" and the encryption key for connecting to the base station #C is "789". The terminal 1050 selects one or more base stations to be actually wirelessly connected (for example, via a radio wave) based on these pieces of information, and connects to the selected one or more base stations.

By performing setting of the base station 470 to be accessed by the terminal 1050 using a light source such as an LED according to the present embodiment, it becomes unnecessary for the modulated signal for wireless communication transmitted by the terminal 1050 to have a special setting mode for a procedure to establish a wireless communication connection between the terminal 1050 and the base station 470. It also becomes unnecessary to provide, in the modulated signal transmitted by the terminal 1050, a special setting mode for a procedure to make a wireless communication connection between the terminal 1050 and the base station 470. Thus, according to the present embodiment, it is possible to improve the data transmission efficiency of wireless communication.

As described above, the encryption key may be an encryption key for the SSID for the wireless LAN, or may be an encryption key for limiting the connection mode, the service mode, the connection range of the network, and/or the like. That is, an encryption key may be introduced for imposing some restriction.

Embodiment 5

Figure 17:
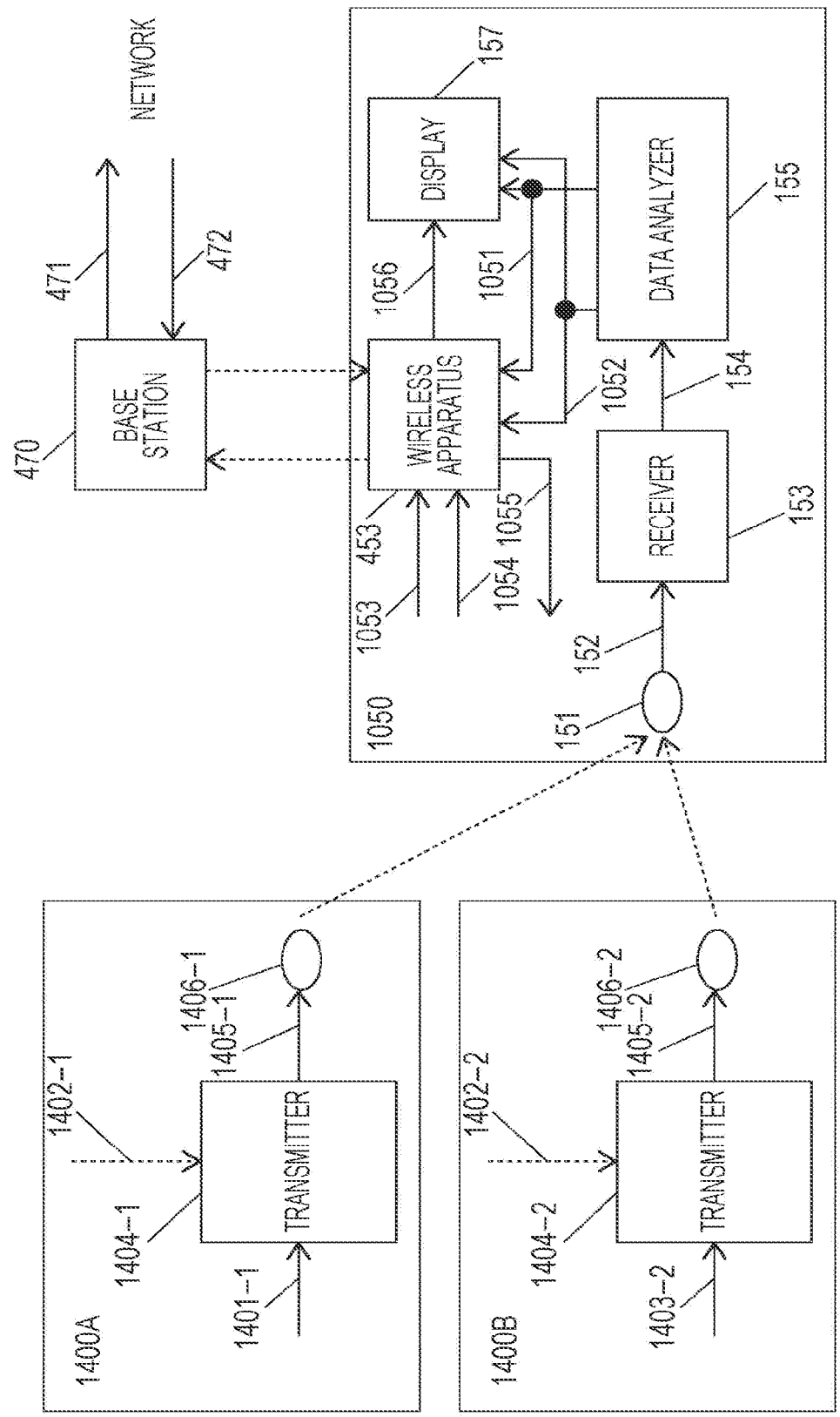
FIG. 17 is a diagram illustrating an example of a configuration of a communication system according to Embodiment 5.

FIG. 17 is a diagram illustrating an example of a configuration of a communication system according to Embodiment 5.

The communication system shown in FIG. 17 includes, for example, devices 1400A and 1400B, a terminal 1050, and a base station (or an AP) 470 that communicates with the terminal 1050.

The devices 1400A and 1400B each include, for example, a visible light source such as an LED, lighting, a light source, and a light (hereinafter referred to as light sources 1406-1 and 1406-2). Hereinafter, the device 1400A will be referred to as a "third device" according to the present embodiment, and the device 1400B will be referred to as a "fourth device" according to the present embodiment.

In the terminal 1050 shown in FIG. 17, elements that operate in similar manners to those in the terminal 150 shown in FIG. 6 or the terminal 1050 shown in FIG. 13 are denoted by similar reference numerals. In the base station (the AP) shown in FIG. 17, elements that operate in similar manners to those in the base station 470 shown in FIG. 9 are denoted by the same reference numerals as those used in FIG. 9. Note that it is assumed that communication between the wireless apparatus 453 of the terminal 1050 and the base station 470 shown in FIG. 17 is performed using, for example, radio waves.

In the third device 1400A in FIG. 17, a transmitter 1404-1 gets, as inputs thereto, information 1401-1 related to an SSID and data 1402-1, and generates a (light) modulated signal 1405-1 based on these input signals and outputs the resultant modulated signal 1405-1. The modulated signal 1405-1 is transmitted, for example, from the light source 1406-1.

In the fourth device 1400B in FIG. 17, a transmitter 1404-2 gets, as inputs thereto, information 1403-2 related to an encryption key and data 1402-2, and generates a (light) modulated signal 1405-2 based on these input signals and outputs the resultant modulated signal 1405-2. The modulated signal 1405-2 is transmitted, for example, from the light source 1406-2.

Next, information 1401-1 related to the SSID and information 1403-2 related to the encryption key are described below.

First, the information 1401-1 related to the SSID is described.

The information 1401-1 related to the SSID is information indicating the SSID of the base station 470 in FIG. 17. That is, the third device 1400A can provide, to the terminal 1050, access to the base station 470 which is a secure access destination via a radio wave. Thus, the terminal 1050 shown in FIG. 17 can securely obtain information from the base station 470.

When the terminal 1050 receives a light signal transmitted in a predetermined scheme, the terminal 1050 may determine that the notified SSID is an SSID of a secure base station. The terminal 1050 may perform a separate process of determining whether the notified SSID is secure or not. For example, the third device 1400A may transmit a light signal including a predetermined identifier, and the terminal 1050 may determine whether the notified SSID is an SSID of a secure base station or not based on the received identifier.

Although only the base station 470 is shown in FIG. 17, there may be one or more other base stations (or APs) in addition to the base station 470. Also, in such a case, the terminal 1050 may access the base station 470 using the SSID obtained from the third device 1400A and the encryption key acquired from the fourth device 1400B to acquire information.

Next, the information 1403-2 related to the encryption key is described.

The encryption key information 1403-2 is information related to an encryption key required for the terminal 1050 to communicate with the base station 470 via a radio wave. By acquiring the information 1403-2 related to the encryption key from the fourth device 1400B, it becomes possible for the terminal 1050 to perform encrypted communication with the base station 470.

The information 1401-1 related to the SSID and the information 1403-2 related to the encryption key have been described above.

The terminal 1050 in FIG. 17 receives a modulated signal transmitted from the third device 1400A.

The light receiver 151 of the terminal 1050 is, for example, an image sensor such as a CMOS sensor or an organic CMOS sensor. The light receiver 151 receives light including the modulated signal transmitted from the third device 1400A, and outputs a reception signal 152.

The receiver 153 receives, as an input thereto, the reception signal 152 received by the light receiver 151, and performs processing such as demodulation/error correction decoding on the modulated signal included in the reception signal 152 and outputs a result as reception data 154.

The data analysis unit 155 receives, as an input thereto, the reception data 154, and outputs, based on the reception data, for example, information 1051 related to the SSID of the base station that is to be a connection destination. Thus, the wireless apparatus 453 obtains, from the information 1051 relates to the SSID, the information on the SSID of the base station 470 that the wireless apparatus 453 is to connect to via a radio wave.

The terminal 1050 in FIG. 17 receives the modulated signal transmitted from the fourth device 1400B.

The light receiver 151 of the terminal 1050 is, for example, an image sensor such as a CMOS sensor or an organic CMOS sensor. The light receiver 151 receives light including the modulated signal transmitted from the fourth device 1400B, and outputs a reception signal 152.

The receiver 153 receives, as an input thereto, the reception signal 152 received by the light receiver 151, and performs processing such as demodulation/error correction decoding on the modulated signal included in the reception signal 152 and outputs a result as reception data 154.

The data analysis unit 155 receives, as an input thereto, the reception data 154, and outputs, based on the reception data, for example, information 1052 related to an encryption key for communicating with a base station that is to be a connection destination. Encryption schemes for use in a wireless LAN (Local Area Network) include, for example, WEP (Wired Equivalent Privacy), WPA (Wi-Fi Protected Access), WPA2 (Wi-Fi Protected Access 2) (PSK (Pre-Shared Key) mode, EAP (Extended Authentication Protocol) mode). Note that the encryption schemes are not limited to the examples described above.

Thus, from the information 1052 relates to the encryption key for communicating with the base station to which the wireless apparatus 453 is to connect (for example, via a radio wave), the wireless apparatus 453 in the terminal 1050 obtains information on the encryption key for communicating with the base station 470 to which the wireless apparatus 453 is to be connected.

The display 157 receives, as inputs thereto, the information 1051 on the SSID and the information 1052 on the encryption key, and displays, for example, an SSID of a communication counterpart to be accessed by the wireless apparatus 453 of the terminal 1050 and an encryption key (this displaying is referred to as "first displaying" according to the present embodiment).

For example, after the first displaying, the wireless apparatus 453 receives, as inputs thereto, the SSID information 1051 and the encryption key information 1052, and establishes a radio-wave connection with the base station 470. In this situation, in a case where the base station 470 also communicates with the wireless apparatus 453 of the terminal 1050, the base station 470 transmits a modulated signal using, for example, a radio wave.

Thereafter, the wireless apparatus 453 receives, as inputs thereto, the data 1053 and the control signal 1054, and modulates the data 1053 according to the control indicated by the control signal 1054 and transmits a result as the modulated signal using a radio wave.

Then, for example, the base station 470 performs data transmission (471) to a network and data reception (472) from the network. Thereafter, for example, the base station 470 transmits the modulated signal to the terminal 1050 using a radio wave.

The wireless apparatus 453 in the terminal 1050 performs processing such as demodulation, error correction decoding, and/or the like on the modulated signal received via the radio wave thereby acquiring reception data 1056. The display 157 performs displaying based on the reception data 1056.

Figure 18:
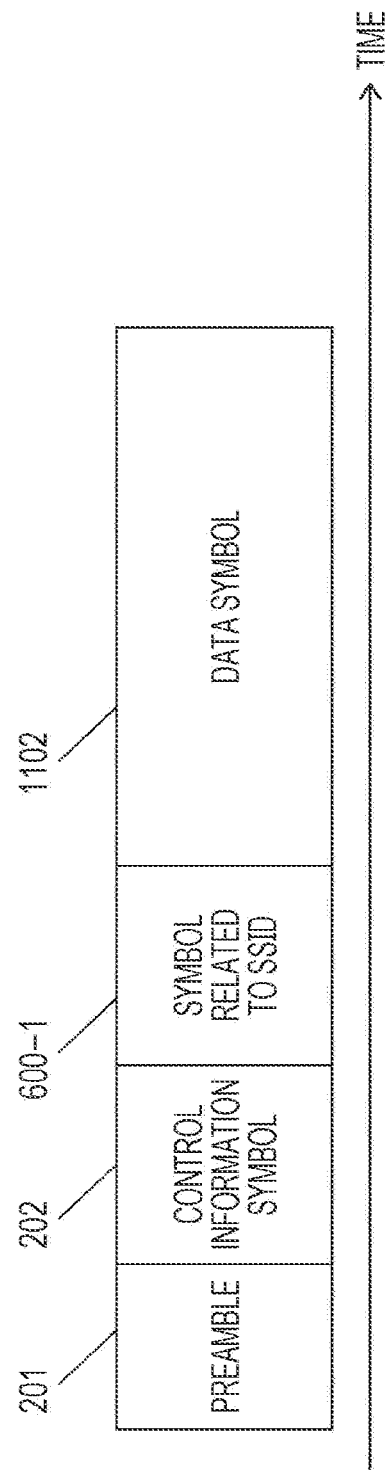
FIG. 18 is a diagram illustrating an example of a frame configuration of a modulated signal including an SSID transmitted by a third device according to Embodiment 5.

FIG. 18 illustrates an example of a frame configuration of a modulated signal transmitted by the third device 1400A shown in FIG. 17. In FIG. 18, a horizontal axis represents time. In FIG. 18, symbols similar to those in FIG. 2, FIG. 10, or FIG. 14 are denoted by similar reference numerals, and a description thereof is omitted.

A symbol 600-1 related to an SSID is a symbol for transmitting the information 1401-1 related to the SSID shown in FIG. 17. A data symbol 1102 is a symbol for transmitting the data 1402-1.

The third device 1400A transmits a preamble 201, a control information symbol 202, a symbol 600-1 related to an SSID, and a data symbol 1102. The third device 1400A may transmit a frame including a symbol other than the symbols shown in FIG. 18. The frame configuration, including the order of transmitting symbols, is not limited to the configuration shown in FIG. 18.

Figure 19:
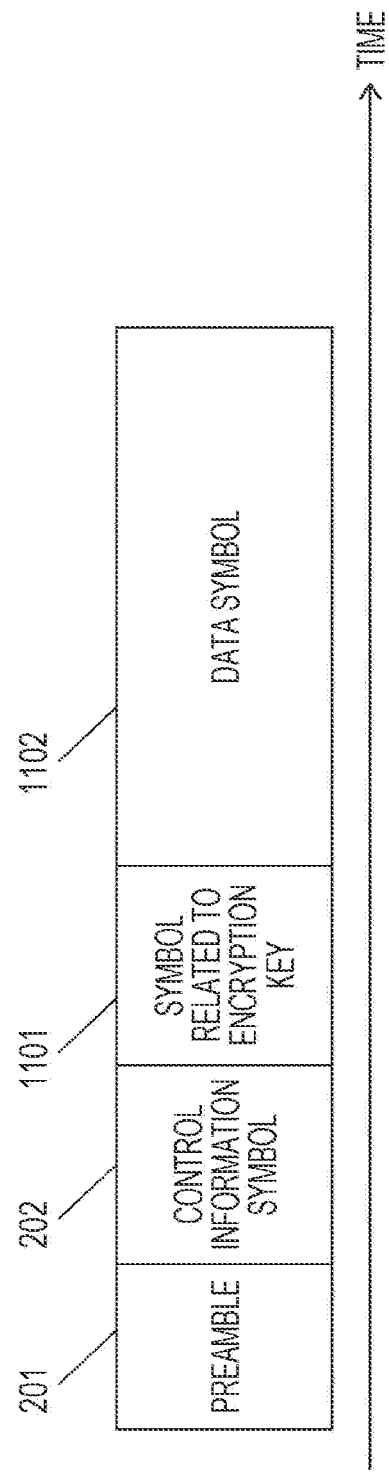
FIG. 19 is a diagram illustrating an example of a frame configuration of a modulated signal including an encryption key transmitted by the third device according to Embodiment 5.

FIG. 19 illustrates an example of a frame configuration of a modulated signal transmitted by the fourth device 1400B shown in FIG. 17. In FIG. 19, a horizontal axis represents time. In FIG. 19, symbols similar to those shown in FIG. 7 or FIG. 14 are denoted by the same reference numerals, and a description thereof is omitted.

A symbol 1101 related to an encryption key is a symbol for transmitting the information 1403-2 related to the encryption key shown in FIG. 17. A data symbol 1102 is a symbol for transmitting the data 1402-2.

The fourth device 1400B transmits a preamble 201, a control information symbol 202, a symbol 1101 related to an encryption key, and a data symbol 1102. The fourth device 1400B shown in FIG. 17 may transmit a frame including a symbol other than the symbols shown in FIG. 19. The frame configuration, including the order of transmitting symbols, is not limited to the configuration shown in FIG. 19.

The frame configuration of the modulated signal transmitted by wireless apparatus 453 according to the present embodiment is the same as the frame configuration according to Embodiment 4 described above with reference to FIG. 15. That is, as shown in FIG. 15, the wireless apparatus 453 included in the terminal 1050 transmits, for example, a preamble 1201, and then transmits a control information symbol 1202 and an information symbol 1203.

The preamble 1201 is a symbol for use by the base station (or the AP) 470 in, when receiving the modulated signal transmitted from the wireless apparatus 453 of the terminal 1050 shown in FIG. 17, performing, for example, signal detection, time synchronization, frame synchronization, a frequency synchronization, frequency offset estimation and/or the like.

The control information symbol 1202 is, for example, a symbol including data such as information related to an error correction coding scheme and modulation scheme used in generating a modulated signal, information related to a frame configuration, and information related to a transmission scheme, and/or the like. The base station 470 performs processing such as demodulation on the modulated signal or the like based on the information included in the control information symbol 1202.

The information symbol 1203 is a symbol for the wireless apparatus 453 of the terminal 1050 to transmit data.

The wireless apparatus 453 of the terminal 1050 shown in FIG. 17 may transmit a frame including a symbol other than the symbols shown in FIG. 15. For example, the wireless apparatus 453 may transmit a frame including a pilot symbol (a reference symbol) in the middle of the information symbol 1203, or the like. The frame configuration, including the order of transmitting symbols, is not limited to the configuration shown in FIG. 15. In FIG. 15, a plurality of symbols may exist in a direction along the frequency axis. That is, in FIG. 15, symbols may exist at a plurality of frequencies (a plurality of carriers).

The frame configuration of the modulated signal transmitted by base station 470 according to the present embodiment is the same as the frame configuration according to Embodiment 3 described above with reference to FIG. 11. That is, as shown in FIG. 11, the base station 470 transmits, for example, a preamble 701, and then transmits a control information symbol 702 and an information symbol 703.

The preamble 701 is a symbol for use by the wireless apparatus 453 of the terminal 1050 shown in FIG. 17 in, when receiving the modulated signal transmitted by the base station 470, performing, for example, signal detection, time synchronization, frame synchronization, frequency synchronization, frequency offset estimation, and/or the like.

The control information symbol 702 is, for example, a symbol including data such as information related to an error correction coding scheme and a modulation scheme used in generating a modulated signal, information related to a frame configuration, information related to a transmission scheme, and/or the like. The wireless apparatus 453 of the terminal 1050 shown in FIG. 17 performs processing such as demodulation or the like on the modulated signal based on the information represented by the control information symbol 702.

The information symbol 703 is a symbol used by the base station 470 in FIG. 17 to transmit data.

The base station 470 shown in FIG. 17 may transmit a frame including a symbol other than the symbols shown in FIG. 11. For example, the base station 470 may transmit a frame including a pilot symbol (a reference symbol) in the middle of the information symbol 703, or the like. The frame configuration, including the order of transmitting symbols, is not limited to the configuration shown in FIG. 11. In FIG. 11, a plurality of symbols may exist in a direction along the frequency axis. That is, in FIG. 11, symbols may exist at a plurality of frequencies (a plurality of carriers).

For example, in a method, the modulated signal in the frame configuration shown in FIG. 18 may be transmitted by the third device 1400A repeatedly, for example, at regular intervals. This makes it possible for a plurality of terminals 1050 to perform the operation as described above. Similarly, in a method, the modulated signal in the frame configuration shown in FIG. 19 may be transmitted by the fourth device 1400B repeatedly, for example, at regular intervals. This makes it possible for a plurality of terminals 1050 to perform the operation as described above.

Figure 20:
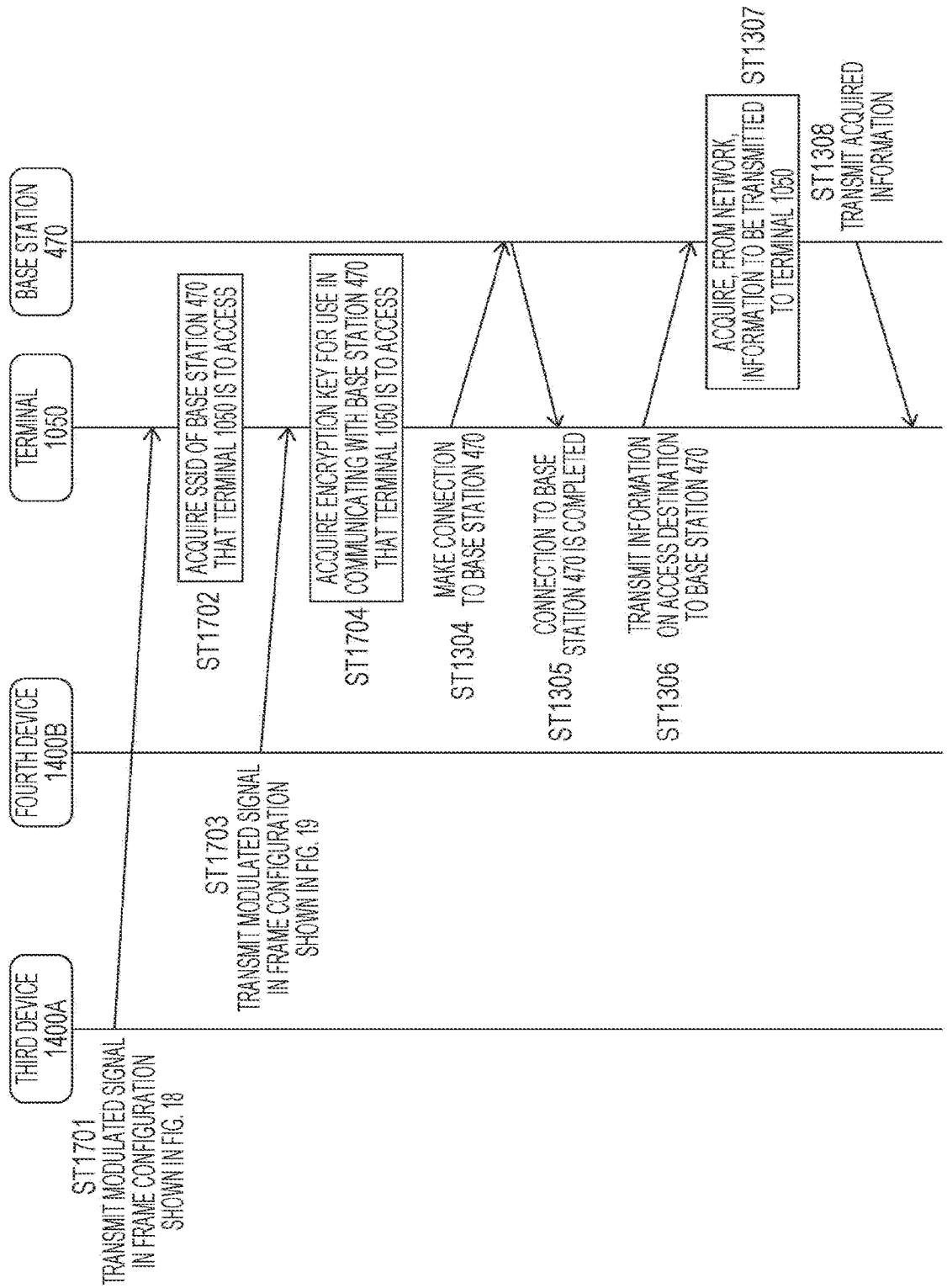
FIG. 20 is a flow chart illustrating an example of a process performed in a communication system according to Embodiment 5.

FIG. 20 is a flow chart illustrating a first example of processing performed by the "third device 1400A", the "fourth device 1400B", the "terminal 1050", and the "base station 470" illustrated in FIG. 17. In FIG. 20, elements that operate in similar manners to those shown in FIG. 16 are denoted by similar reference numerals.

First, the third device 1400A transmits a modulated signal in the frame configuration shown in FIG. 18 (ST1701).

The terminal 1050 receives the modulated signal transmitted from the third device 1400A, and acquires the SSID of the base station 470 to be accessed by the terminal 1050 (ST1702).

Next, the fourth device 1400B transmits a modulated signal in the frame configuration shown in FIG. 19 (ST1703).

The terminal 1050 receives the modulated signal transmitted from the fourth device 1400B, and acquires the encryption key for use in communicating with the base station 470 to be accessed by the terminal 1050 (ST1704).

The terminal 1050 then connects to the base station 470 using a radio wave (ST1304). When the terminal 1050 receives a response from the base station 470, the radio-wave connection with the base station 470 is completed (ST1305).

The terminal 1050 then transmits connection destination information to the base station 470 using a radio wave (ST1306).

The base station 470 obtains information to be transmitted to the terminal 1050 from a network (ST1307).

The base station 470 transmits the obtained information to the terminal 1050 using a radio wave. The terminal 1050 obtains this information (ST1308). The terminal 1050 may obtain necessary information from the network via the base station 470, for example, when necessary.

Figure 21:
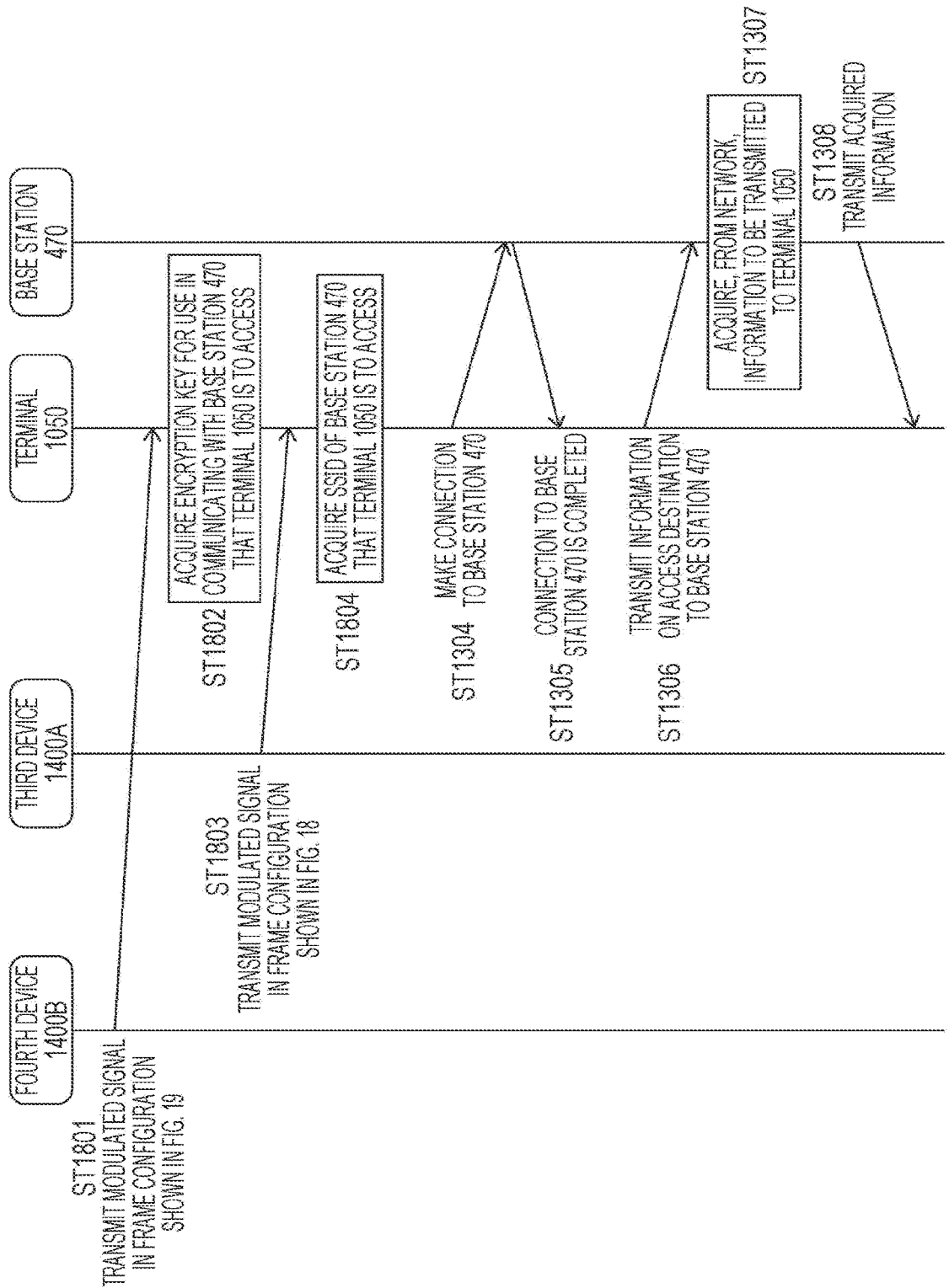
FIG. 21 is a flow chart illustrating another example of a process performed in a communication system according to Embodiment 5.

FIG. 21 is a flow chart illustrating a second example of processing performed by the "third device 1400A", the "fourth device 1400B", the "terminal 1050", and the "base station 470" illustrated in FIG. 17. In FIG. 21, elements that operate in similar manners to those shown in FIG. 16 are denoted by similar reference numerals.

First, the fourth device 1400B transmits a modulated signal in the frame configuration shown in FIG. 19 (ST1801).

The terminal 1050 receives the modulated signal transmitted from the fourth device 1400B, and acquires the encryption key for use in communicating with the base station 470 to be accessed by the terminal 1050 (ST1802).

Next, the third device 1400A transmits a modulated signal in the frame configuration shown in FIG. 18 (ST1803).

The terminal 1050 receives the modulated signal transmitted from the third device 1400A, and acquires the SSID of the base station 470 to be accessed by the terminal 1050 (ST1804).

The terminal 1050 then connects to the base station 470 using a radio wave (ST1304). When the terminal 1050 receives a response from the base station 470, the radio-wave connection with the base station 470 is completed (ST1305).

The terminal 1050 then transmits connection destination information to the base station 470 using a radio wave (ST1306).

The base station 470 obtains information to be transmitted to the terminal 1050 from a network (ST1307).

The base station 470 transmits the obtained information to the terminal 1050 using a radio wave. The terminal 1050 obtains this information (ST1308). The terminal 1050 may obtain necessary information from the network via the base station 470, for example, when necessary.

As described above, based on the SSID transmitted from the third device 1400A and the information on the encryption key transmitted from the fourth device 1400B, the terminal 1050 connects to the base station 470 and acquires information. That is, since the device from which the terminal 1050 acquires information on the SSID is different from the device from which the information on the encryption key is acquired, the information can be securely acquired via the base station 470 whose security is guaranteed. This is because when the terminal 1050 obtains information from a modulated signal of visible light, use of the visible light allows the user to easily determine whether the information source is secure or not. In contrast, for example, in a case where an SSID is acquired from a modulated signal of a radio wave transmitted via a wireless LAN, it is difficult for a user to determine a device from which the radio wave is received. Thus, from the point of view of ensuring the security of information, visible light communication is more suitable for acquiring an SSID than wireless LAN communication.

In the present embodiment described above, by way of example, the fourth device 1400B transmits the information on the encryption key. However, for example, when the base station 470 does not perform communication encrypted using an encryption key, the information on the encryption key is not transmitted by the fourth device 1400B. In this case, only the information on the SSID may be transmitted by the third device 1400A. In this case, the operation may be performed in a similar manner as described above except that part of the operation related to the encryption key described above is not performed.

In the present embodiment, the device (the third device 1400A) that transmits information related to the SSID is different from the device (the fourth device 1400B) that transmits information related to the encryption key, and thus it becomes possible for the terminal 1050 to more securely communicate with the base station 470.

Note that the encryption key for use by the terminal 1050 in communicating with the base station 470 may be changed (for example, in particular time intervals) such that it becomes impossible for the terminal 1050 having an old encryption key to communicate with the base station 470. By performing such operation, it is possible to perform more secure communications.

Note that the configurations of the third device and the fourth device are not limited to the specific configurations of the third device 1400A and the fourth device 1400B shown in FIG. 17. The configuration of the terminal is not limited to the specific configuration of the terminal 1050 shown in FIG. 17. The connection destination to which the base station is connected is not limited to the connection destination to which the base station 470 shown in FIG. 17 is connected, and the configuration of the connection destination device is not limited to the configuration of the connection destination device shown in FIG. 17.

Furthermore, although in the example shown in FIG. 17, the base station 470 is the only base station existing there, there may be a plurality of (secure) base stations (or APs) which can be accessed by the terminal 1050. In this case, the symbol related to the SSID transmitted by the third device 1400A shown in FIG. 17 may include information indicating the SSIDs of the respective base stations 470. The symbol related to the encryption key transmitted by the fourth device 1400B shown in FIG. 17 may include information on the encryption key used to connect to each of the plurality of base stations. In this case, the display 157 of the terminal 1050 in FIG. 17 displays information indicating access destinations (in the above-described "first displaying") including a list of SSIDs of the plurality of base stations and/or a list of a plurality of access destinations. The terminal 1050 in FIG. 17 may select one or more base stations to be actually connected wirelessly based on the information on the SSIDs of the plurality of base stations and the information on the encryption keys (that is, the terminal 1050 may be connected to a plurality of base stations at the same time).

For example, let it be assumed that there are three base stations 470. Herein, let the three base stations 470 be respectively referred to as a base station #A, a base station #B, and a base station #C. Furthermore, let it be assumed that the SSID of the base station #A is "abcdef", the SSID of the base station #B is "ghijk", and the SSID of the base station #C is "pqrstu". Let it be further assumed that an encryption key for connecting to the base station #A is "123", an encryption key for connecting to the base station #B is "456", and an encryption key for connecting to the base station #C is "789".

In this case, the symbol 600-1 related to the SSID described in the modulated signal transmitted from the third device 1400A in the frame configuration shown in FIG. 18 includes information indicating the SSID of the base station #A is "abcdef", SSID of the base station #B is "ghijk" and the SSID of the base station #C is "pqrstu". The symbol 1101 related to the encryption key in the frame configuration shown in FIG. 19 in the modulated signal transmitted by the fourth device 1400B includes information indicating that an encryption key for connecting to the base station #A is "123", an encryption key for connecting to the base station #B is "456", and an encryption key for connecting to the base station #C is "789".

The terminal 1050 shown in FIG. 17 receives the symbol 600-1 related to the SSID thereby obtaining information indicating that the SSID of the base station #A is "abcdef", the SSID of the base station #B is "ghijk", and the SSID of the base station #C is "pqrstu". The terminal 1050 also receives the symbol 1101 related to the encryption key thereby obtaining information indicating that the encryption key for connecting to the base station #A is "123", the encryption key for connecting to the base station #B is "456" and the encryption key for connecting to the base station #C is "789". The terminal 1050 selects a base station to be wirelessly connected (for example, via a radio wave) based on these pieces of information, and connects to the selected base stations.

By performing setting of the base station 470 to be accessed by the terminal 1050 using a light source such as an LED according to the present embodiment, it becomes unnecessary for the modulated signal for wireless communication transmitted by the terminal 1050 to have a special setting mode for a procedure to establish a wireless communication connection between the terminal 1050 and the base station 470. It also becomes unnecessary to provide, in the modulated signal transmitted by the terminal 1050, a special setting mode for a procedure to make a wireless communication connection between the terminal 1050 and the base station 470. Thus, according to the present embodiment, it is possible to improve the data transmission efficiency of wireless communication.

As described above, the encryption key may be an encryption key for the SSID for the wireless LAN, or may be an encryption key for limiting the connection mode, the service mode, the connection range of the network, and/or the like. That is, an encryption key may be introduced for imposing some restriction.

Embodiment 6

Figure 22:
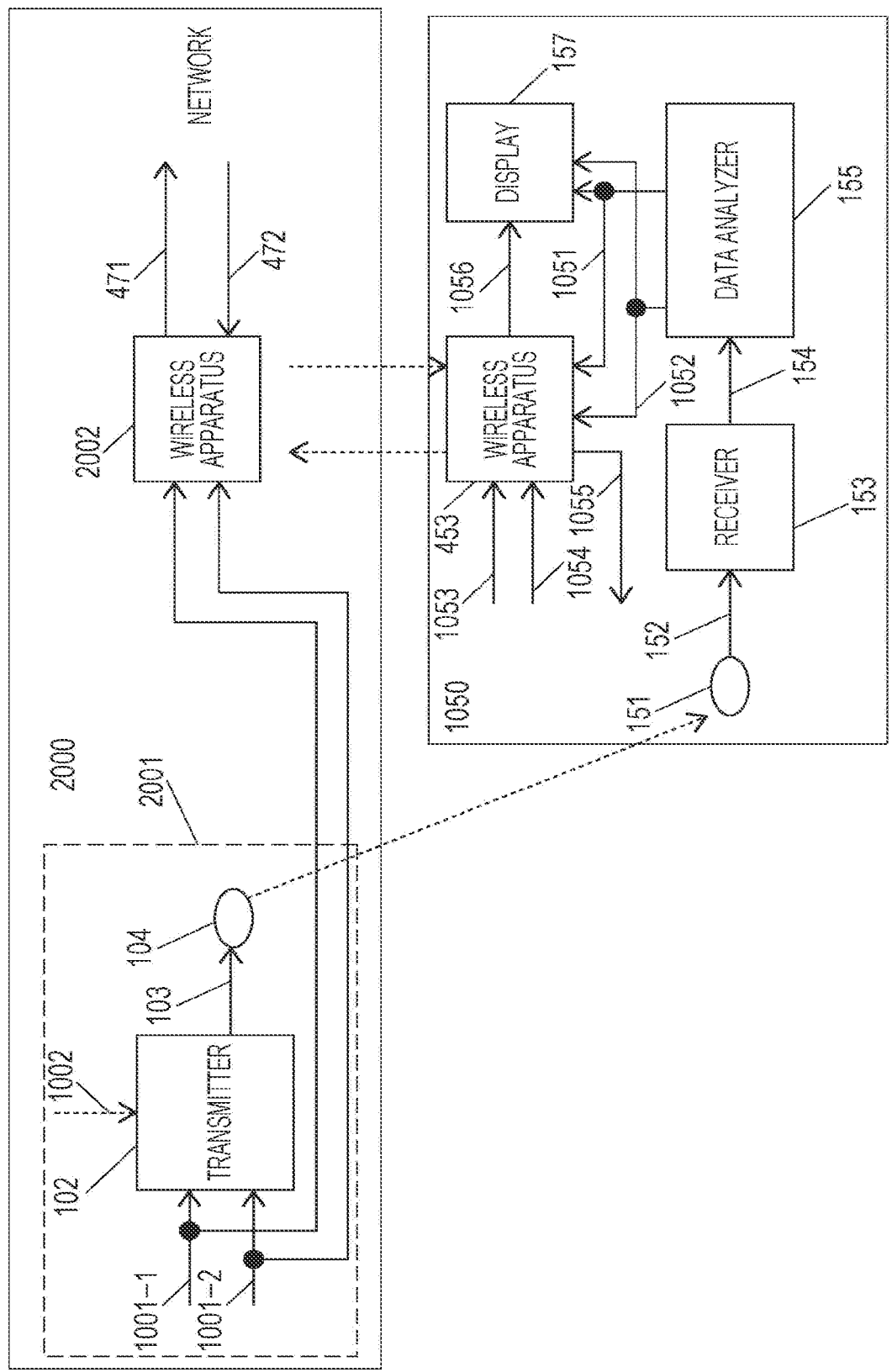
FIG. 22 is a diagram illustrating an example of a configuration of a communication system according to Embodiment 6.

FIG. 22 is a diagram illustrating an example of a configuration of a communication system according to Embodiment 6.

The communication system in FIG. 22 includes, for example, a base station 2000 and a terminal 1050. The base station 2000 includes a transmission apparatus 2001 and a wireless apparatus 2002. In FIG. 22, elements that operate in similar manners to those shown in FIG. 6 or FIG. 13 are denoted by similar reference numerals. Note that it is assumed that communication between the wireless apparatus 2002 and the wireless apparatus 453 shown in FIG. 22 is performed using, for example, radio waves.

The transmission apparatus 2001 of the base station (or the AP) 2000 shown in FIG. 22 includes, for example, a visible light source such as an LED, lighting, a light source, and a light (hereinafter, referred to as a light source 104). First, the operation of the transmission apparatus 2001 (that is, "a part related to a visible light source such as an LED, lighting, a light source, and light") will be described.

In the transmission apparatus 2001, a transmitter 102 gets, as inputs thereto, information 1001-1 related to an SSID, information 1001-2 related to an encryption key, and data 1002, and generates a (light) modulated signal 103 based on these input signals and outputs a result as a modulated signal 103. The modulated signal 103 is transmitted, for example, from a light source 104.

Next, information 1001-1 related to the SSID and information 1001-2 related to the encryption key are described below.

First, the information 1001-1 related to the SSID is described.

The information 1001-1 related to the SSID is information indicating the SSID of the wireless apparatus 2002 using a radio wave in the base station 2000 in FIG. 22. That is, the transmission apparatus 2001 can provide, to the terminal 1050, access to the wireless apparatus 2002, which is a secure access destination via a radio wave. Thus, the terminal 1050 shown in FIG. 22 can securely obtain information from the wireless apparatus 2002.

On the other hand, the transmission apparatus 2001 can limit terminals allowed to access the wireless apparatus 2002 to those terminals that are located within a space in which it is possible to receive a light signal transmitted (emitted) by the transmission apparatus 2001.

When the terminal 1050 receives a light signal transmitted in a predetermined scheme, the terminal 1050 may determine that the notified SSID is an SSID of a secure base station. The terminal 1050 may perform a separate process of determining whether the notified SSID is secure or not. For example, the transmission apparatus 2001 may transmit a light signal including a predetermined identifier, and the terminal 1050 may determine whether the notified SSID is an SSID of a secure base station or not based on the received identifier.

Although only the base station 2000 is shown as a base station in FIG. 22, there may be one or more other base stations (or APs) in addition to the base station 2000. Also, in such a case, the terminal 1050 may access the wireless apparatus 2002 of the base station 2000 using the SSID and the encryption key obtained from the transmission apparatus 2001 to acquire information.

Next, the information 1001-2 related to the encryption key is described.

The information 1001-2 related to the encryption key is information related to an encryption key required for the terminal 1050 to communicate with the wireless apparatus 2002. By acquiring the information 1001-2 related to the encryption key from the transmission apparatus 2001, it becomes possible for the terminal 1050 to perform encrypted communication with the wireless apparatus 2002.

The information 1001-1 related to the SSID and the information 1001-2 related to the encryption key have been described above.

The terminal 1050 in FIG. 22 receives the modulated signal transmitted from the transmission apparatus 2001. In the terminal 1050 shown in FIG. 22, elements similar in operation to those in the terminal 150 shown in FIG. 6 or the terminal 1050 shown in FIG. 13 are denoted by similar reference numerals.

The light receiver 151 of the terminal 1050 is, for example, an image sensor such as a CMOS sensor or an organic CMOS sensor. The light receiver 151 receives light including the modulated signal transmitted from the transmission apparatus 2001, and outputs a reception signal 152.

The receiver 153 receives, as an input thereto, the reception signal 152 received by the light receiver 151, and performs processing such as demodulation/error correction decoding on the modulated signal included in the reception signal 152 and outputs a result as reception data 154.

The data analysis unit 155 receives, as an input thereto, the reception data 154, and outputs, based on the reception data, for example, information 1051 on the SSID of the wireless apparatus 2002 of the base station 2000 which is to be a connection destination and information 1052 on the encryption key for use in communicating with the wireless apparatus 2002 of the base station 2000 which is to be the connection destination. Encryption schemes for use in a wireless LAN (Local Area Network) include, for example, WEP (Wired Equivalent Privacy), WPA (Wi-Fi Protected Access), WPA2 (Wi-Fi Protected Access 2) (PSK (Pre-Shared Key) mode, EAP (Extended Authentication Protocol) mode). Note that the encryption schemes are not limited to the examples described above.

The display 157 receives, as inputs thereto, the information 1051 on the SSID and the information 1052 on the encryption key, and displays, for example, an SSID of a communication counterpart to be accessed by the wireless apparatus 453 of the terminal 1050 and an encryption key (this displaying is referred to as "first displaying" according to the present embodiment).

For example, after the first displaying, the wireless apparatus 453 receives, as inputs thereto, the SSID information 1051 and the encryption key information 1052, and establishes a connection with the wireless apparatus 2002 of the base station 2000 (for example, a radio wave is used in the connection). In this situation, if the wireless apparatus 2002 of the base station 2000 also communicates with the wireless apparatus 453 of the terminal 1050, the wireless apparatus 2002 transmits a modulated signal using, for example, a radio wave.

Thereafter, the wireless apparatus 453 receives, as inputs thereto, the data 1053 and the control signal 1054, and modulates the data 1053 according to the control indicated by the control signal 1054 and transmits a result as the modulated signal using a radio wave.

Then, for example, the wireless apparatus 2002 of the base station 2000 performs data transmission (471) to a network and data reception (472) from the network. Thereafter, for example, the wireless apparatus 2002 of the base station 2000 transmits a modulated signal to the terminal 1050 using a radio wave.

The wireless apparatus 453 in the terminal 1050 performs processing such as demodulation, error correction decoding, and/or the like on the modulated signal received via the radio wave thereby acquiring reception data 1056. The display 157 performs displaying based on the reception data 1056.

The frame configuration of the modulated signal transmitted by wireless apparatus 2002 of the base station 2000 according to the present embodiment is the same as the frame configuration according to Embodiment 4 described above with reference to FIG. 14. That is, in FIG. 14, a symbol 600-1 related to the SSD is a symbol for transmitting the information 1001-1 related to the SSID shown in FIG. 22, an encryption key symbol 1101 is a symbol for transmitting the information 1001-2 related to the encryption key shown in FIG. 22, and a data symbol 1102 is a symbol for transmitting the data 1002 shown in FIG. 22.

As shown in FIG. 14, the wireless apparatus 2002 of the base station 2000 transmits a preamble 201, a control information symbol 202, a symbol 600-1 related to an SSID, a symbol 1101 related to an encryption key, and a data symbol 1102. The wireless apparatus 2002 of the base station 2000 may transmit a frame including a symbol other than the symbols shown in FIG. 14. The frame configuration, including the order of transmitting symbols, is not limited to the configuration shown in FIG. 14.

The frame configuration of the modulated signal transmitted by wireless apparatus 453 of the terminal 1050 according to the present embodiment is the same as the frame configuration according to Embodiment 4 described above with reference to FIG. 15. That is, as shown in FIG. 15, the wireless apparatus 453 included in the terminal 1050 in FIG. 22 transmits, for example, a preamble 1201 and then transmits a control information symbol 1202 and an information symbol 1203.

The preamble 1201 is a symbol for use by the wireless apparatus 2002 of the base station 2000 in, when receiving the modulated signal transmitted from the wireless apparatus 453, performing, for example, signal detection, time synchronization, frame synchronization, a frequency synchronization, frequency offset estimation and/or the like.

The control information symbol 1202 is, for example, a symbol including data such as information related to an error correction coding scheme and modulation scheme used by the terminal 1050 in generating a modulated signal, information related to a frame configuration, and information related to a transmission scheme, and/or the like. The wireless apparatus 2002 of the base station 2000 performs processing such as demodulation on the modulated signal or the like based on the information included in the control information symbol 1202.

The information symbol 1203 is a symbol for the wireless apparatus 453 of the terminal 1050 to transmit data.

The wireless apparatus 453 of the terminal 1050 may transmit a frame including a symbol other than the symbols shown in FIG. 15. For example, the wireless apparatus 453 may transmit a frame including a pilot symbol (a reference symbol) in the middle of the information symbol 1203, or the like. The frame configuration, including the order of transmitting symbols, is not limited to the configuration shown in FIG. 15. In FIG. 15, a plurality of symbols may exist in a direction along the frequency axis. That is, in FIG. 15, symbols may exist at a plurality of frequencies (a plurality of carriers).

The frame configuration of the modulated signal transmitted by wireless apparatus 2002 according to the present embodiment is the same as the frame configuration according to Embodiment 3 described above with reference to FIG. 11. That is, as shown in FIG. 11, the wireless apparatus 2002 transmits, for example, a preamble 701, and then transmits a control information symbol 702 and an information symbol 703.

The preamble 701 is a symbol for use by the wireless apparatus 453 of the terminal 1050 in, when receiving a modulated signal transmitted by the wireless apparatus 2002, performing, for example, signal detection, time synchronization, frame synchronization, frequency synchronization, frequency offset estimation, and/or the like.

The control information symbol 702 is, for example, a symbol including data such as information related to an error correction coding scheme and a modulation scheme used in generating a modulated signal, information related to a frame configuration, information related to a transmission scheme, and/or the like. The wireless apparatus 453 of the terminal 1050 performs processing such as demodulation or the like on the modulated signal based on the information represented by the control information symbol 702.

The information symbol 703 is a symbol used by the wireless apparatus 2002 to transmit data.

The wireless apparatus 2002 of the base station 2000 shown in FIG. 22 may transmit a frame including a symbol other than the symbols shown in FIG. 11. For example, the wireless apparatus 2002 may transmit a frame including a pilot symbol (a reference symbol) in the middle of the information symbol 703, or the like. The frame configuration, including the order of transmitting symbols, is not limited to the configuration shown in FIG. 11. In FIG. 11, a plurality of symbols may exist in a direction along the frequency axis. That is, in FIG. 11, symbols may exist at a plurality of frequencies (a plurality of carriers).

For example, in a method, the modulated signal in the frame configuration shown in FIG. 14 may be transmitted by the transmission apparatus 2001, for example, repeatedly at regular intervals. This makes it possible for a plurality of terminals 1050 to perform the operation as described above.

Figure 23:
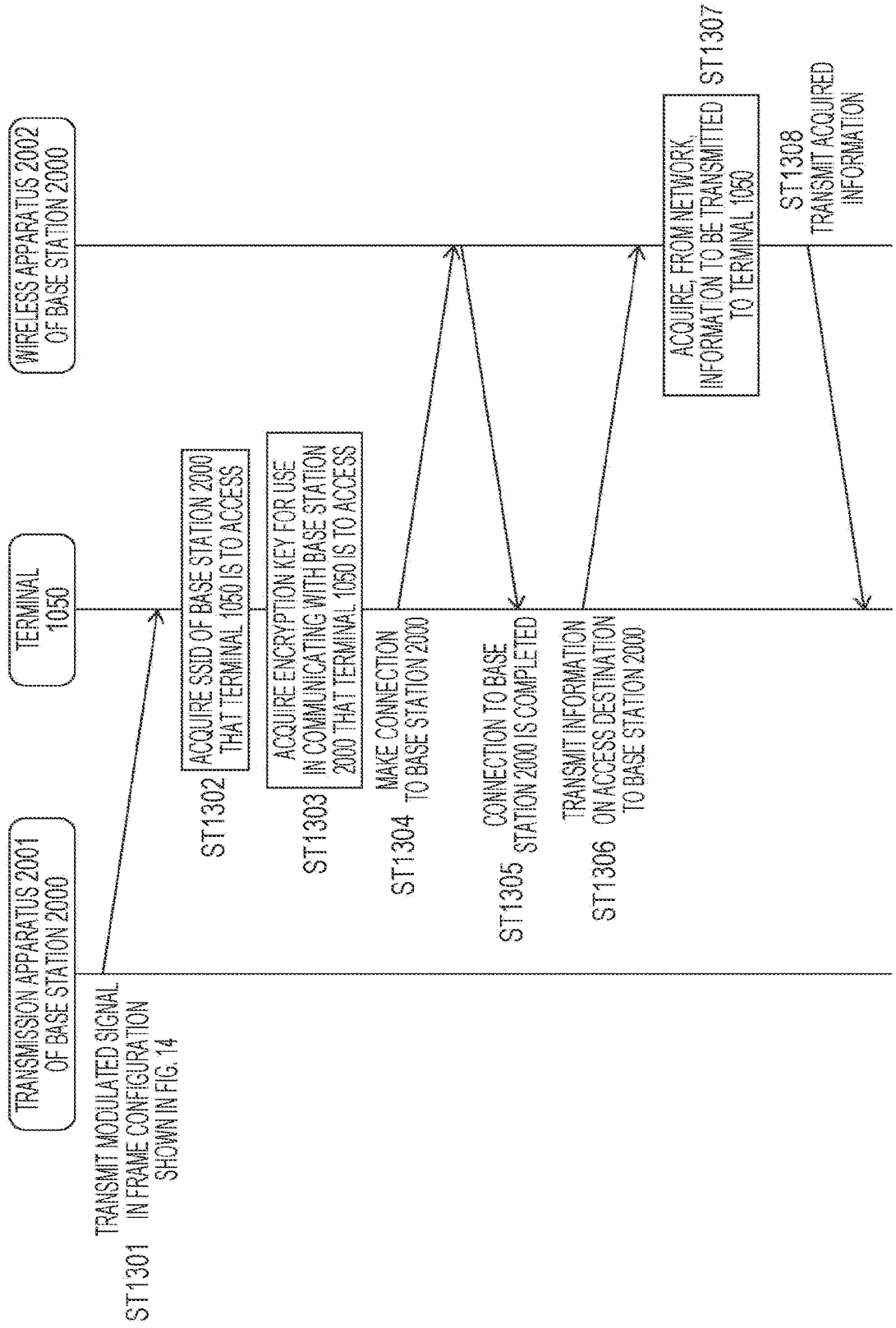
FIG. 23 is a flow chart illustrating an example of a process performed in a communication system according to Embodiment 6.

FIG. 23 is a flow chart illustrating an example of processing performed by the "transmission apparatus 2001 of the base station 2000", the "terminal 1050", and the "wireless apparatus 2002 of the base station 2000" illustrated in FIG. 22.

First, the transmission apparatus 2001 transmits a modulated signal in the frame configuration shown in FIG. 14 (ST1301).

The terminal 1050 receives the modulated signal transmitted from the transmission apparatus 2001, and acquires the SSID of the base station 2000 (the wireless apparatus 2002) to be accessed by the terminal 1050 (ST1302).

The terminal 1050 also acquires an encryption key used for communication with the base station 2000 (the wireless apparatus 2002) to be accessed by the terminal 1050 (ST1303).

The terminal 1050 then makes a radio-wave connection to the wireless apparatus 2002 of the base station 2000 (ST1304). When the terminal 1050 receives a response from the base station 2000, the connection between the terminal 1050 and the wireless apparatus 2002 of the base station 2000 is completed (ST1305).

The terminal 1050 then transmits information related to the connection destination to the wireless apparatus 2002 of the base station 2000 using a radio wave (ST1306).

The wireless apparatus 2002 of the base station 2000 obtains information to be transmitted to the terminal 1050 from a network (ST1307).

The wireless apparatus 2002 of the base station 2000 transmits the obtained information to the terminal 1050 using a radio wave. The terminal 1050 obtains this information (ST1308). The terminal 1050 may, for example, obtain necessary information from the network via the wireless apparatus 2002 of the base station 2000 when necessary.

As described above, since the terminal 1050 is connected to the wireless apparatus 2002 of the base station 2000 based on the information on the SSID and the information on the encryption key transmitted from the transmission apparatus 2001 of the base station 2000, the terminal 1050 can securely acquire information via the base station 2000 guaranteed to be secure. This is because when the terminal 1050 obtains information from a modulated signal of visible light, use of the visible light allows the user to easily determine whether the information source is secure or not. In contrast, for example, in a case where an SSID is acquired from a modulated signal of a radio wave transmitted via a wireless LAN, it is difficult for a user to determine a device from which the radio wave is received. Thus, from the point of view of ensuring the security of information, visible light communication is more suitable for acquiring an SSID than wireless LAN communication.

In the present embodiment described above, by way of example, the transmission apparatus 2001 transmits the information on the encryption key. However, for example, when the wireless apparatus 2002 of the base station 2000 does not perform communication encrypted using an encryption key, the transmission apparatus 2001 may transmit only the information on the SSID without transmitting the information on the encryption key. This can be achieved simply by deleting part related to the encryption key from the configuration of the transmission apparatus 2001.

As shown in FIG. 22, the wireless apparatus 2002 of the base station 2000 may be configured such that the SSID and the encryption key associated with the wireless apparatus 2002 are allowed to be rewritten. For example, in FIG. 22, the wireless apparatus 2002 receives, as inputs thereto, information 1001-1 related to the SSID and information 1001-2 related to the encryption key. The wireless apparatus 2002 of the base station 2000 rewrites the SSID and the encryption key with the input information 1001-1 related to the SSID and the information 1001-2 related to the encryption key. This makes it possible to further enhance the security in the communication between the terminal 1050 and the wireless apparatus 2002 of the base station 2000. In FIG. 22, the wireless apparatus 2002 of the base station 2000 has the function of rewriting the SSID and the encryption. However, the wireless apparatus 2002 may not have the function of rewriting one of or any of one of the SSID and the encryption key.

The configuration of the transmission apparatus is not limited to the configuration of the transmission apparatus 2001 shown in FIG. 22. The configuration of the terminal is not limited to the configuration of the terminal 1050 shown in FIG. 22. The connection destination to which the wireless apparatus is connected and the configuration of the connection destination device are not limited to the connection destination to which the wireless apparatus 2002 is connected and the configuration of the connection destination device shown in FIG. 22.

Furthermore, although in the example shown in FIG. 22, the base station 2000 is the only base station existing there, there may be a plurality of wireless apparatuses 2002 in (secure) base stations (or APs) 2000 which can be accessed by the terminal 1050. The plurality of the wireless apparatuses 2002 of the base stations 2000 and the terminal 1050 transmit and receive modulated signals using radio waves. In this case, the symbol related to the SSID transmitted by the transmission apparatus 2001 shown in FIG. 22 may include information on the SSID of each of the plurality of wireless apparatuses 2002 of the base stations 2000. The symbol related to the encryption key transmitted by the transmission apparatus 2001 shown in FIG. 22 may include information on the encryption key used to connect to each of the plurality of wireless apparatuses 2002 of the base stations 2000. The terminal 1050 in FIG. 22 may select a wireless apparatus 2002 of a base station 2000 to be wirelessly connected (for example, using a radio wave) based on the information on the SSIDs of the plurality of wireless apparatuses 2002 of base stations 2000 and the information on the encryption keys (that is, the terminal 1050 may be connected to a plurality of wireless apparatuses of base stations).

For example, let it be assumed that there are three base stations 2000 each having a wireless apparatus 2002. Let the three wireless apparatuses 2002 of the base stations 2000 be respectively denoted as a wireless apparatus #A, a wireless apparatus #B, and a wireless apparatus #C. Furthermore, let it be assumed that the SSID of the wireless apparatus #A is "abcdef", the SSID of the wireless apparatus #B is "ghijk", and the SSID of the wireless apparatus #C is "pqrstu". Let it be further assumed that an encryption key for connecting to the wireless apparatus #A is "123", an encryption key for connecting to the wireless apparatus #B "456", and an encryption key for connecting to the wireless apparatus #C is "789"

In this case, the symbol 600-1 related to the SSID transmitted from the transmission apparatus 2001 using the modulated signal having the frame configuration shown in FIG. 14 includes information indicating that the SSID of the wireless apparatus #A is "abcdef", SSID of the wireless apparatus #B is "ghijk" and the SSID of the wireless apparatus #C is "pqrstu". The symbol 1101 related to the encryption key in the frame configuration of FIG. 14 includes information indicating that an encryption key for connecting to the wireless apparatus #A is "123", an encryption key for connecting to the wireless apparatus #B is "456", and an encryption key for connecting to the wireless apparatus #C is "789".

The terminal 1050 in FIG. 22 receives the symbol 600-1 related to the SSID thereby obtaining information indicating that the SSID of the wireless apparatus #A is "abcdef", the SSID of the wireless apparatus #B is "ghijk", and the SSID of the wireless apparatus #C is "pqrstu". The terminal 1050 also receives the symbol 1101 related to the SSID thereby obtaining information indicating that the encryption key for connecting to the wireless apparatus #A is "123", the encryption key for connecting to the wireless apparatus #B is "456", and the encryption key for connecting to the wireless apparatus #C is "789". The terminal 1050 selects a base station to be wirelessly connected (for example, via a radio wave) based on these pieces of information, and connects to the selected base stations.

By performing setting of the wireless apparatus 2002 of the base station 2000 to be accessed by the terminal 1050 using a light source such as an LED according to the present embodiment, it becomes unnecessary for the modulated signal for wireless communication transmitted by the terminal 1050 to have a special setting mode for a procedure to establish a wireless communication connection between the terminal 1050 and the base station 2000. It also becomes unnecessary to provide, in the modulated signal transmitted by the terminal 1050, a special setting mode for a procedure to make a wireless communication connection between the terminal 1050 and the base station 2000. Thus, according to the present embodiment, it is possible to improve the data transmission efficiency of wireless communication.

As described above, the encryption key may be an encryption key for the SSID for the wireless LAN, or may be an encryption key for limiting the connection mode, the service mode, the connection range of the network, and/or the like. That is, an encryption key may be introduced for imposing some restriction.

Embodiment 7

Figure 24:
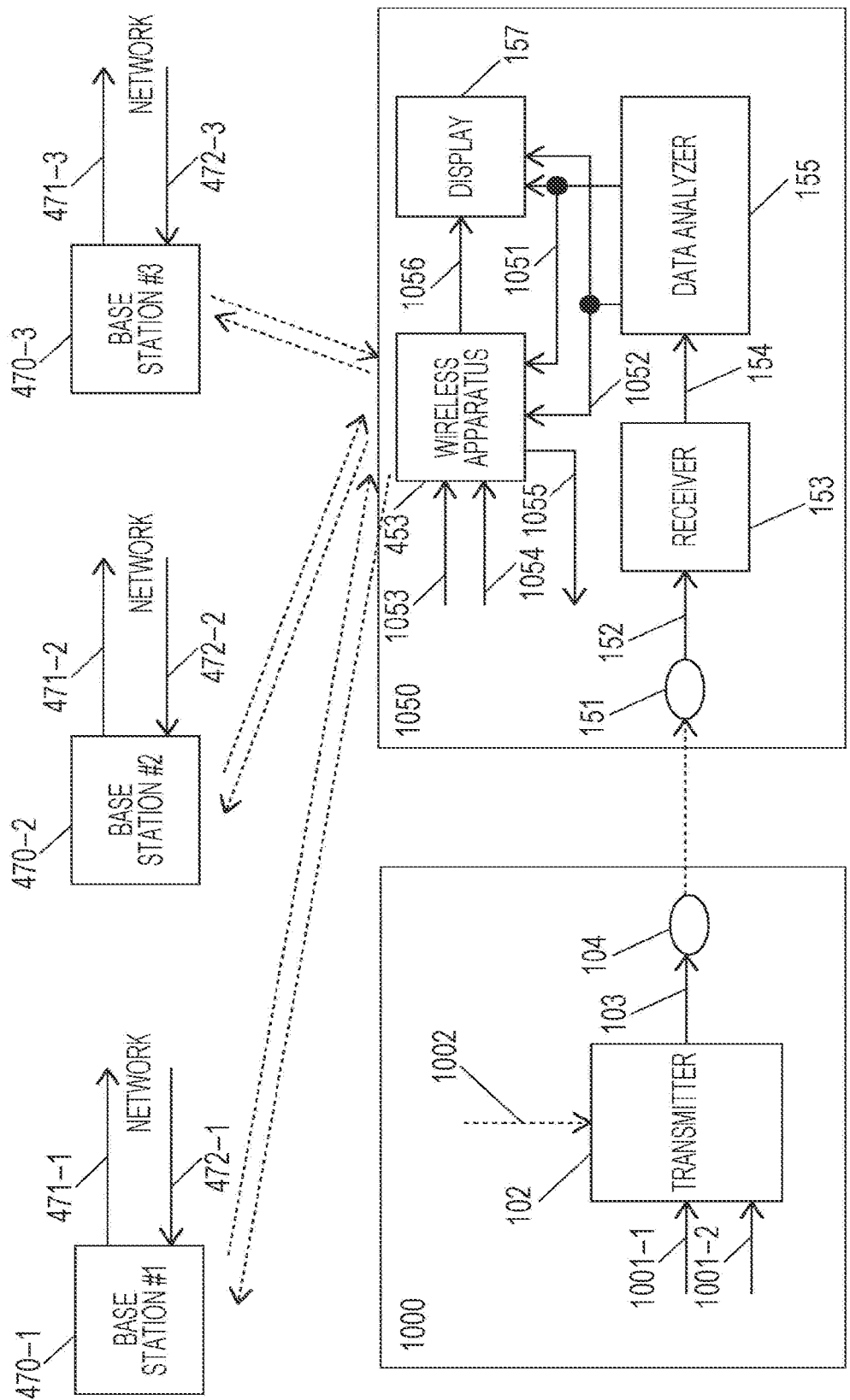
FIG. 24 is a diagram illustrating an example of a configuration of a communication system according to Embodiment 7.

FIG. 24 is a diagram illustrating an example of a configuration of a communication system according to Embodiment 7.

The communication system in FIG. 24 includes a device 1000, a terminal 1050, a base station (or an AP) 470-1 (a base station #1), a base station (or an AP) 470-2 (a base station #2), and a base station (or an AP) 470-3 (a base station #3), that communicate with the terminal 1050. In FIG. 24, elements that operate in similar manners to those shown in FIG. 6, FIG. 9, or FIG. 13 are denoted by similar reference numerals.

The device 1000 includes, for example, a visible light source such as an LED, lighting, a light source, and a light (hereinafter, referred to as a light source 104). Hereinafter, the device 1000 may also be referred to as a "fifth device" according to the present embodiment. Note that it is assumed that communication between the wireless apparatus 453 and the terminal 470-1 (the base station #1), between the wireless apparatus 453 and the base station 470-2 (the base station #2), and between the wireless apparatus 453 and the base station 470-3 (the base station #3) shown in FIG. 24 is performed using, for example, radio waves.

In the fifth device 1000 shown in FIG. 24, a transmitter 101 gets, as inputs thereto, information 1001-1 related to an SSID, information 1001-2 related to an encryption key, and data 1002, and the fifth device 1000 generates a (light) modulated signal 103 based on these input signals and outputs the resultant modulated signal 103. The modulated signal 103 is transmitted, for example, from a light source 104.

Next, information 1001-1 related to the SSID and information 1001-2 related to the encryption key are described below.

First, the information 1001-1 related to the SSID is described.

The information 1001-1 related to the SSID includes, for example, information indicating the SSID of the base station 470-1 (the base station #1), information indicating the SSID of the base station 470-2 (the base station #2), information indicating the SSID of the station 470-3 (the base station #3) shown in FIG. 24. By way of example, the base stations 470-1, 470-2, and 470-3 transmit modulated signals via radio waves and receive modulated signals via radio waves. That is, the fifth device 1000 can provide, to the terminal 1050, access to the base stations 470-1, 470-2 and 470-3 which are secure access destinations. This allows the terminal 1050 in FIG. 24 to obtain information securely from the base stations 470-1, 470-2, and 470-3.

On the other hand, the fifth device 1000 can limit terminals allowed to access the base stations 470-1, 470-2, and 470-3 to those terminals that are located within a space in which it is possible to receive a light signal transmitted (emitted) by the fifth device 1000.

When the terminal 1050 receives a light signal transmitted in a predetermined scheme, the terminal 1050 may determine that the notified SSID is an SSID of a secure base station. The terminal 1050 may perform a separate process of determining whether the notified SSID is secure or not. For example, the fifth device 1000 may transmit a light signal including a predetermined identifier, and the terminal 1050 may determine whether the notified SSID is an SSID of a secure base station or not based on the received identifier.

FIG. 24 illustrates the base stations 470-1, 470-2, and 470-3, but, for example, a base station (or an AP) other than the base stations 470-1, 470-2, and 470-3 may exist.

Next, the information 1001-2 related to the encryption key is described.

The encryption key information 1001-2 is information related to an encryption key required for the terminal 1050 to communicate with the base stations 470-1, 470-2, and 470-3. When the terminal 1050 obtains the information 1001-2 related to the encryption key from the fifth device 1000, it becomes possible to perform encrypted communication between the terminal 1050 and the base station 470-1, between the terminal 1050 and the base station 470-2, and between the terminal 1050 and the base station 470-3.

The information 1001-1 related to the SSID and the information 1001-2 related to the encryption key have been described above.

The terminal 1050 in FIG. 24 receives a modulated signal transmitted by the fifth device 1000. In the terminal 1050 shown in FIG. 24, elements similar in operation to those in the terminal 150 shown in FIG. 6 or the terminal 450 shown in FIG. 9 are denoted by similar reference numerals.

The light receiver 151 of the terminal 1050 is, for example, an image sensor such as a CMOS sensor or an organic CMOS sensor. The light receiver 151 receives light including the modulated signal transmitted from the fifth device 1000, and outputs a reception signal 152.

The receiver 153 receives, as an input thereto, the reception signal 152 received by the light receiver 151, and performs processing such as demodulation/error correction decoding on the modulated signal included in the reception signal 152 and outputs a result as reception data 154.

The data analysis unit 155 receives, as an input thereto, the reception data 154, and outputs, based on the reception data 154, for example, information 1051 on the SSIDs of the base stations 470-1, 470-2, and 470-3 to be connected and outputs information 1052 on encryption keys for communicating with the base stations 470-1, 470-2, and 470-3 to be connected. Encryption schemes for use in a wireless LAN (Local Area Network) include, for example, WEP (Wired Equivalent Privacy), WPA (Wi-Fi Protected Access), WPA2 (Wi-Fi Protected Access 2) (PSK (Pre-Shared Key) mode, EAP (Extended Authentication Protocol) mode). Note that the encryption schemes are not limited to the examples described above.

The display 157 receives, as inputs thereto, the information 1051 on the SSID and the information 1052 on the encryption key, and displays, for example, an SSID of a communication counterpart to be accessed by the wireless apparatus 453 of the terminal 1050 and an encryption key (this displaying is referred to as "first displaying" according to the present embodiment).

For example, after the first displaying, the wireless apparatus 453 receives, as inputs thereto, the information 1051 on the SSIDs and the information 1052 on the encryption keys, and establishes a connection with one of the base stations 470-1, 470-2, and 470-3 (for example, a radio wave is used in the connection). In this situation, if the connected base station 470 also communicates with the wireless apparatus 453 of the terminal 1050, the base station 470 transmits a modulated signal using, for example, a radio wave.

Thereafter, the wireless apparatus 453 receives, as inputs thereto, the data 1053 and the control signal 1054, and modulates the data 1053 according to the control indicated by the control signal 1054 and transmits a result as the modulated signal using a radio wave.

Then, for example, the connected base station 470 performs data transmission (one of 471-1, 471-2, and 471-3) to a network and data reception (one of 472-1, 472-2, and 472-3) from the network. Thereafter, for example, the connected base station 470 transmits a modulated signal to the terminal 1050 using a radio wave.

The wireless apparatus 453 in the terminal 1050 performs processing such as demodulation, error correction decoding, and/or the like on the modulated signal received via the radio wave thereby acquiring reception data 1056. The display 157 performs displaying based on the reception data 1056.

Figure 25:
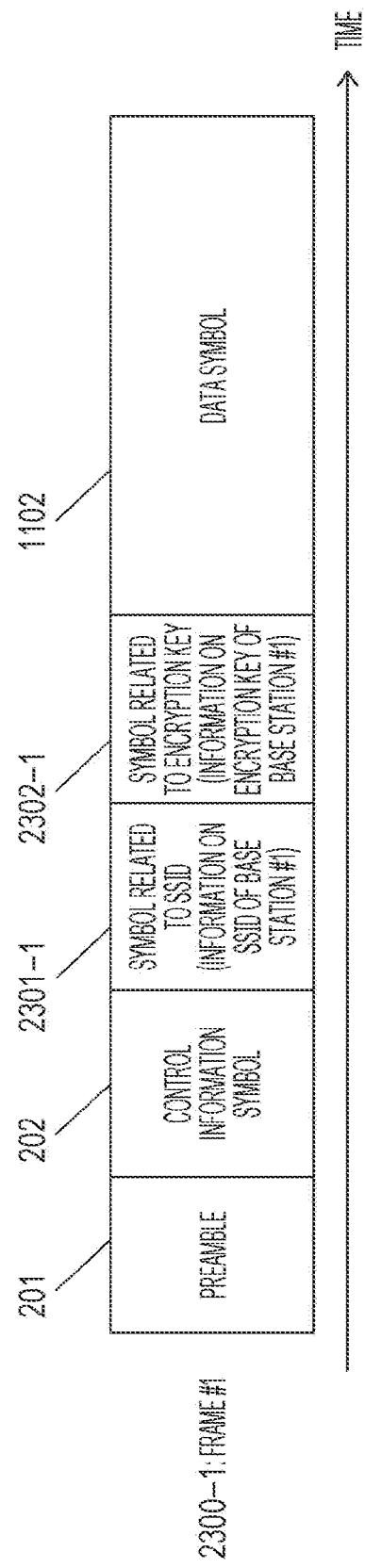
FIG. 25 is a diagram illustrating an example of a frame configuration of a modulated signal transmitted by a fifth device according to Embodiment 7.
Figure 26:
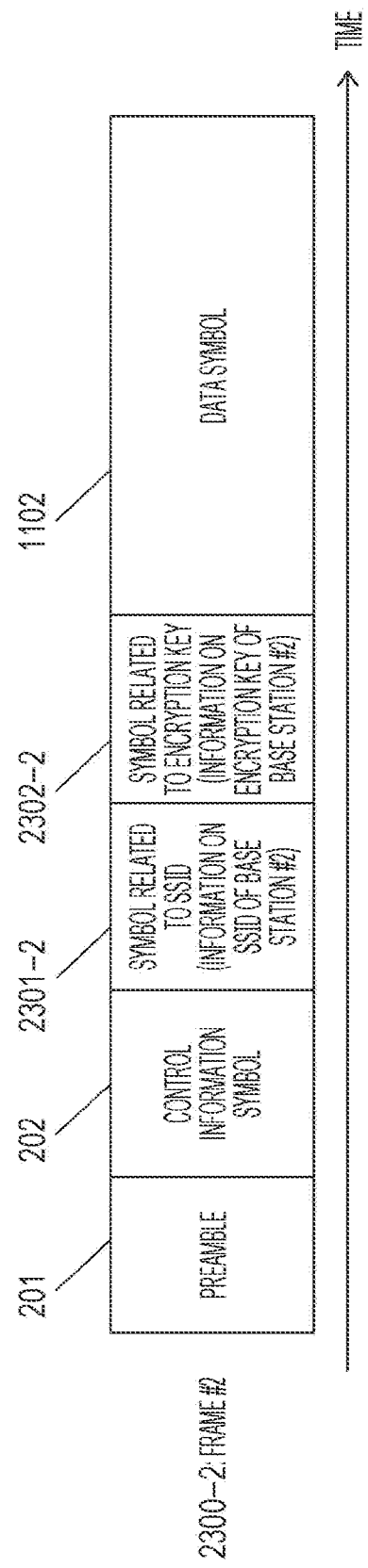
FIG. 26 is a diagram illustrating an example of a frame configuration of a modulated signal transmitted by the fifth device according to Embodiment 7.
Figure 27:
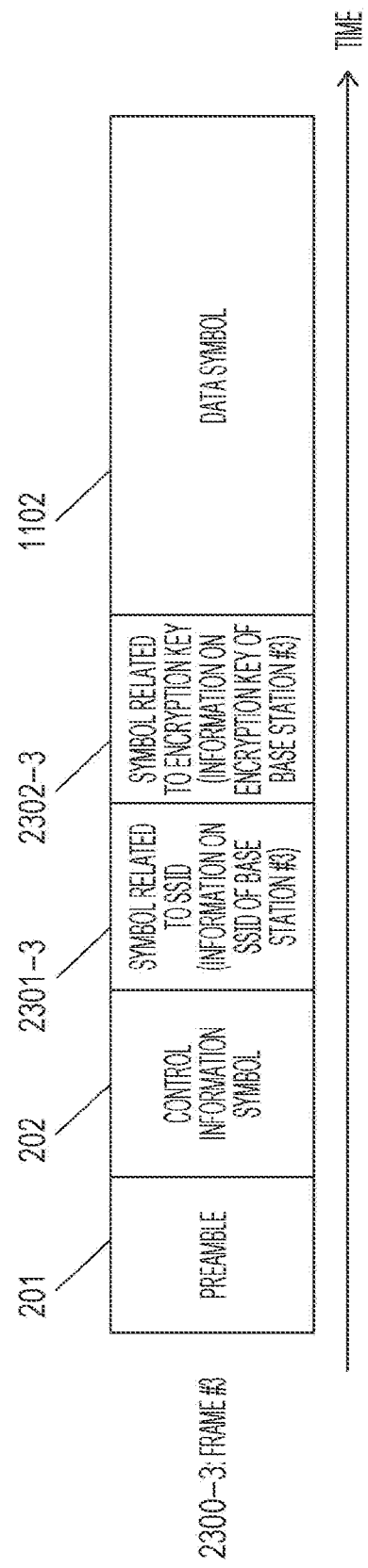
FIG. 27 is a diagram illustrating an example of a frame configuration of a modulated signal transmitted by the fifth device according to Embodiment 7.

In the case shown in FIG. 24, there are three types of frame configurations for use in the modulated signal transmitted by the fifth device 1000 configurations. FIG. 25 illustrates a frame 2300-1 (a frame #1) which is one of three types of frame configurations. FIG. 26 illustrates a frame 2300-2 (a frame configuration #2) which is one of three types of frame configurations. FIG. 27 illustrates a frame 2300-3 (a frame configuration #3) which is one of three types of frame configurations.

FIG. 25 illustrates an example of a configuration of the frame 2300-1 (the frame #1) of the modulated signal transmitted by the fifth device 1000. In FIG. 25, a horizontal axis represents time. In FIG. 25, symbols similar to those shown in FIG. 2 or FIG. 14 are denoted by the same reference numerals, and a description thereof is omitted. The frame 2300-1 (the frame #1) shown in FIG. 25 is a frame for transmitting information on the SSID of the base station 470-1 (the base station #1) shown in FIG. 24 and information on the encryption key of the base station 470-1 (the base station #1) (the encryption key for accessing the base station 470-1.

A symbol 2301-1 related to an SSID is a symbol for transmitting the information 1001-1 related to the SSID shown in FIG. 24. A symbol 2301-1 related to an SSID is a symbol used by the fifth device 1000 in FIG. 24 to transmit the SSID of the base station 470-1 (the base station #1).

A symbol 2302-1 related to an encryption key is a symbol for transmitting the information 1001-2 related to the encryption key shown in FIG. 24. The symbol 2302-1 related to the encryption key is also a symbol used by the fifth device 1000 in FIG. 24 to transmit the encryption key of the base station 470-1 (the base station #1) (the encryption key for accessing the base station 470-1).

The fifth device 1000 transmits a preamble 201, a control information symbol 202, a symbol 2301-1 relating to an SSID, a symbol 2302-1 relating to an encryption key, and a data symbol 1102. The frame 2300-1 (the frame #1) transmitted by the fifth device 1000 may include a symbol other than the symbols described in FIG. 25. The configuration of the frame 2300-1 (the frame #1), including the order of transmitting symbols, is not limited to the configuration shown in FIG. 25.

FIG. 26 illustrates an example of a configuration of the frame 2300-2 (the frame #2) of the modulated signal transmitted by the fifth device 1000. In FIG. 26, a horizontal axis represents time. In FIG. 26, symbols similar to those shown in FIG. 2 or FIG. 14 are denoted by similar reference numerals, and a description thereof is omitted. The frame 2300-2 (the frame #2) shown in FIG. 26 is a frame for transmitting information on the SSID of the base station 470-2 (the base station #2) shown in FIG. 24 and information on the encryption key of the base station 470-2 (the base station #2) (the encryption key for accessing the base station 470-2.

A symbol 2301-2 related to an SSID is a symbol for transmitting the information 1001-1 related to the SSID shown in FIG. 24. A symbol 2301-2 related to the SSID is a symbol used by the fifth device 1000 in FIG. 24 to transmit the SSID of the base station 470-2 (the base station #2).

A symbol 2302-2 related to an encryption key is a symbol for transmitting the information 1001-2 related to the encryption key shown in FIG. 24. The symbol 2302-2 related to the encryption key is also a symbol used by the fifth device 1000 in FIG. 24 to transmit the encryption key of the base station 470-2 (the base station #2) (the encryption key for accessing the base station 470-2).

The fifth device 1000 transmits a preamble 201, a control information symbol 202, a symbol 2301-2 relating to an SSID, a symbol 2302-2 relating to an encryption key, and a data symbol 1102. The frame 2300-2 (the frame #2) transmitted by the fifth device 1000 may include a symbol other than the symbols described in FIG. 26. The configuration of the frame 2300-2 (the frame #2), including the order of transmitting symbols, is not limited to the configuration shown in FIG. 26.

FIG. 27 illustrates an example of a configuration of the frame 2300-3 (the frame #3) of the modulated signal transmitted by the fifth device 1000. In FIG. 27, a horizontal axis represents time. In FIG. 27, symbols similar to those shown in FIG. 2 or FIG. 14 are denoted by similar reference numerals, and a description thereof is omitted. The frame 2300-3 (the frame #3) shown in FIG. 27 is a frame for transmitting information on the SSID of the base station 470-3 (the base station #3) shown in FIG. 24 and information on the encryption key of the base station 470-3 (the base station #3) (the encryption key for accessing the base station 470-3).

A symbol 2301-3 related to an SSID is a symbol for transmitting the information 1001-1 related to the SSID shown in FIG. 24. A symbol 2301-3 related to the SSID is a symbol used by the fifth device 1000 in FIG. 24 to transmit the SSID of the base station 470-3 (the base station #3).

A symbol 2302-3 related to an encryption key is a symbol for transmitting the information 1001-2 related to the encryption key shown in FIG. 24. The symbol 2302-3 related to the encryption key is also a symbol used by the fifth device 1000 to transmit the encryption key of the base station 470-3 (the base station #3) (the encryption key for accessing the base station 470-3).

The fifth device 1000 transmits a preamble 201, a control information symbol 202, a symbol 2301-3 relating to an SSID, a symbol 2302-3 relating to an encryption key, and a data symbol 1102. The frame 2300-3 (the frame #3) transmitted by the fifth device 1000 may include a symbol other than the symbols described in FIG. 27. The configuration of the frame 2300-3 (the frame #3), including the order of transmitting symbols, is not limited to the configuration shown in FIG. 27.

Figure 28:
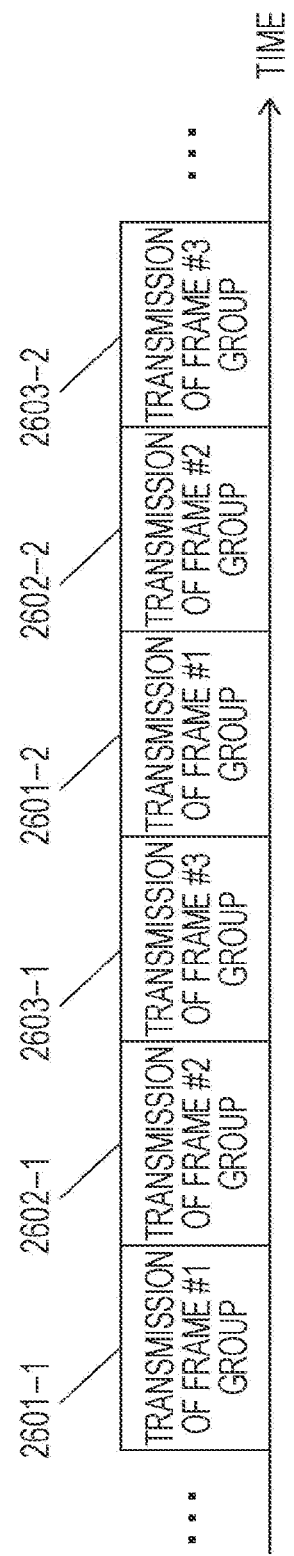
FIG. 28 is a diagram illustrating an example of a frame transmission method by the fifth device according to Embodiment 7.

FIG. 28 illustrates an example of a manner in which the fifth device 1000 transmits "the frame 2300-1 (the frame #1 in FIG. 25), "the frame 2300-2 (the frame #2 in FIG. 26)", and "the frame 2300-3 in FIG. 27 (the frame #3). In FIG. 28, a horizontal axis represents time.

In "transmission of frame #1 group" 2601-1 and 2601-2 in FIG. 28, one or more frames 2300-1 (frames #1) shown in FIG. 25 are transmitted. In "transmission of frame #2 group" 2602-1 and 2602-2, one or more frames 2300-2 (frames #2) shown in FIG. 26 are transmitted. In "transmission of frame #3 group" 2603-1 and 2603-2, one or more frames 2300-3 (frames #3) shown in FIG. 27 are transmitted.

The transmissions are described in further detail below.

First, a description is given as to the "transmission of frame #1 group" 2601-1 and 2601-2 in which one or more frames 2300-1 (frame #1) shown in FIG. 25 are transmitted.

For example, in the case where a CMOS sensor or an organic CMOS sensor is used as an image sensor in the light receiver 151, there is a possibility that a reception signal is processed in units of frames of a moving image or a still image. For example, when "4K 30p" is described for a moving image, this means that the number of pixels in each frame is 3840×2160 and the number of frames per second is 30.

Therefore, when a modulated signal transmitted by the fifth device 1000 is configured such that "a frame 2300-1 (a frame #1) shown in FIG. 25", "a frame 2300-2 (a frame #2) shown in FIG. 26", and "a frame 2300-3 (a frame #3) shown in FIG. 27" exist in one frame, it is difficult for the terminal 1050 in FIG. 24 to select a base station 470 to be accessed from the base stations 470-1, 470-2, and 470-3.

In view of the above, in the present embodiment, a frame configuration such as that shown in FIG. 28 is proposed.

<Method 1-1>

In Method 1-1, each of the "transmission of frame #1 group" 2601-1 and 2601-2 includes a plurality of frames 2300-1 (frames #1) shown in FIG. 25 such that each of the "transmission of frame #1 group" 2601-1 and 2601-2 occupies a time interval longer than the frame length in the moving image or the still image.

By employing this method, it is ensured that the modulated signal received by the terminal 1050 from the fifth device 1000 is prevented from having a configuration in which a "frame 2300-1 (a frame #1) shown in FIG. 25", a "frame 2300-2 (a frame #2) shown in FIG. 26", and a "frame 2300-3 (a frame #3) shown in FIG. 27" are included in one frame of a moving image or a still image, that is, it is ensured that the received modulated signal does not include different SSIDs or different encryption keys. Thus, the terminal 1050 in FIG. 24 can easily select a base station 470 to be accessed from a plurality of base stations 470-1, 470-2, and 470-3.

<Method 2-1>

In Method 2-1, a time interval occupied by the frame 2300-1 (the frame #1) in FIG. 25 is set to be longer than the frame length of a moving image or a still image.

For example, the symbol 2301-1 related to the SSID in FIG. 25 may include a plurality of pieces of "information on the SSID of the base station #1" (that is, "the information on the SSID of the base station #1" may be repeatedly included), and the symbol 2302-1 related to the encryption key may include a plurality of pieces of "information on the encryption key of the base station #1 (information on the encryption key for connecting to the base station #1)" (that is, "the information on the encryption key of the base station #1 (the information on the encryption key for connection to the base Station #1) may be repeatedly included).

By employing this method, it is ensured that the modulated signal received by the terminal 1050 from the fifth device 1000 is prevented from having a configuration in which a "frame 2300-1 (a frame #1) shown in FIG. 25", a "frame 2300-2 (a frame #2) shown in FIG. 26", and a "frame 2300-3 (a frame #3) shown in FIG. 27" are included in one frame of a moving image or a still image, that is, it is ensured that the received modulated signal does not include different SSIDs or different encryption keys. Thus, the terminal 1050 can easily select a base Station 470 to be accessed from a plurality of base stations 470-1, 470-2, and 470-3.

Similarly, it may be desirable to configure the "transmission of frame #2 group" 2602-1 and 2602-2 as described below.

<Method 1-2>

In Method 1-2, each of the "transmission of frame #2 group" 2602-1 and 2602-2 includes a plurality of frames 2300-2 (frames #2) shown in FIG. 26 such that a time interval occupied by the "transmission of frame #2 group" is longer than the frame length of a moving image or a still image.

<Method 2-2>

In Method 2-2, a time interval occupied by the frame 2300-2 (the frame #2) in FIG. 26 is set to be longer than the frame length of a moving image or a still image.

For example, the symbol 2301-2 related to the SSID in FIG. 26 may include a plurality of pieces of "information on the SSID of the base station #2" (that is, "the information on the SSID of the base station #2" may be repeatedly included), and the symbol 2302-2 related to the encryption key may include a plurality of pieces of "information on the encryption key of the base station #2 (information on the encryption key for connecting to the base station #2)" (that is, "the information on the encryption key of the base station #2 (the information on the encryption key for connection to the base station #2) may be repeatedly included).

Similarly, it may be desirable to configure the "transmission of frame #3 group" 2603-1 and 2603-2 as described below.

<Method 1-3>

In Method 1-3, each of the "transmission of frame #3 group" 2603-1 and 2603-2 includes a plurality of frames 2300-3 (frames #3) shown in FIG. 27 such that a time interval occupied by the "transmission of frame #3 group" is longer than the frame length of a moving image or a still image.

<Method 2-3>

In Method 2-3, a time interval occupied by the frame 2300-3 (the frame #3) in FIG. 27 is set to be longer than the frame length of a moving image or a still image.

For example, the symbol 2301-3 related to the SSID in FIG. 27 may include a plurality of pieces of "information on the SSID of the base station #3" (that is, "the information on the SSID of the base station #3" may be repeatedly included), and the symbol 2302-3 related to the encryption key may include a plurality of pieces of "information on the encryption key of the base station #3 (information on the encryption key for connecting to the base station #3)" (that is, "the information on the encryption key of the base station #3 (the information on the encryption key for connection to the base station #3) may be repeatedly included).

Next, effects obtained when the fifth device 1000 transmits a frame as shown in FIGS. 25 to 28 will be described.

Figure 29:
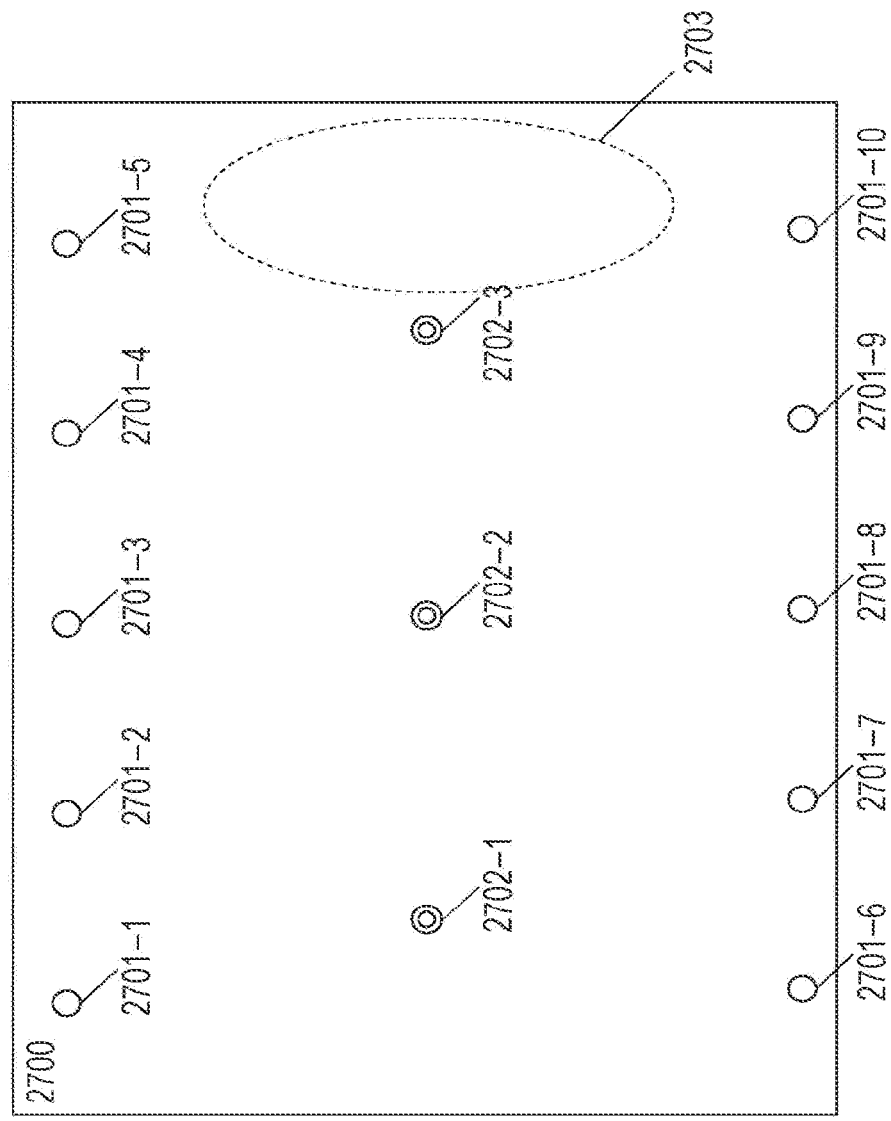
FIG. 29 is a diagram illustrating an example of a manner of disposing a communication system in an area according to Embodiment 7.

A discussion is given below, by way for example, with reference to an area 2700 in FIG. 29. In FIG. 29, fifth devices 1000 are located at respective locations denoted by circles 2701-1, 2701-2, 2701-3, 2701-4, 2701-5, 2701-6, 2701-7, 2701-8, 2701-8, 2701-9, and 2701-10. A base station 470-1 (a base station #1) is located at a location denoted by a double circle 2702-1. A base station 470-2 (a base station #2) is located at a location denoted by a double circle 2702-2. A base station 470-3 (a base station #3) is located at a location denoted by a double circle 2702-3.

It is assumed by way of example that there are 99 terminals (hereinafter, simply referred to as terminals 1050) having a similar configuration to the configuration of the terminal 1050 in the area 2703.

In this situation, for example, fifth devices 1000 located at locations denoted by circles 2701-5 and 2701-10 both transmit information on the SSID of the base station 470-3 (the base station #3), and also transmit information on the encryption key for accessing the station 470-3 (the base station #3). This is because the base station 470-3 (the base station #3) is a base station located closest to the locations denoted by circles 2701-5 and 2701-10.

In this case, all 99 terminals 1050 may access the base station 470-3 (the base station #3). This may cause too much accessing to occur, which may lead to a high possibility that there is a terminal 1050 having a difficulty in accessing the base station 470-3 (the base station #3).

To handle such a situation, accessing may be controlled such that accessing by 99 terminals 1050 is as evenly distributed as possible among the base station 470-1 (the base station #1) (at the location denoted by the circle 2702-1), the base station 470-2 (the base station #2) (at the location denoted by the circle 2702-2), and the base station 470-3 (the base station #3) (at the location denoted by the circle 2702-3) thereby reducing the number of terminals 1050 having a difficulty in accessing a base station 470.

The timing of accessing the fifth device 1000 by the 99 terminals 1050 is generally different among the terminals 1050. Therefore, when the fifth device 1000 transmits a frame according to the present embodiment as shown in FIGS. 25 to 28, each of the 99 terminals 1050 obtains an SSID and an encryption key of one of the base stations 470-1, 470-2, and 470-3 depending on the timing of accessing the fifth device 1000. As a result, controlling is performed such that "accessing by the 99 terminals 1050 to the base stations 470-1, 470-2, and 470-3 is distributed as evenly as possible among the base stations 470-1, 470-2, and 470-3". Thus, it is possible to reduce the number of terminals 1050 having a difficulty in accessing the base station 470.

Note that in the example shown in FIG. 28, a transmission manner is shown for a case where the fifth device 1000 transmits the "frame 2300-1 (the frame #1) in FIG. 25", the "frame 2300-2 (the frame #2) in FIG. 26", and the "frame 2300-3 (the frame #3) in FIG. 27". However, when the fifth device 100 transmits the "frame 2300-1 (the frame #1) in FIG. 25)," the "frame 2300-2 (the frame #2) in FIG. 26)," and the "frame 2300-3 (the frame #3) in FIG. 27)," the transmission manner is not limited to the example described above.

For example, FIG. 28 shows a transmission manner in which the fifth device 1000 repeatedly performs the "transmission of frame #1 group", the "transmission of frame #2 group", and the "transmission of frame #3 group" in this order. However, the "transmission of frame #1 group", the "transmission of frame #2 group", and the "transmission of frame #3 group" do not need to be performed in the order shown in FIG. 28. Alternatively, for example, the fifth device 1000 may perform the "transmission of frame #1 group", the "transmission of frame #2 group", and the "transmission of frame #3 group" randomly in time, or may perform the "transmission of frame #1 group", the "transmission of frame #2 group", and the "transmission of frame #3 group" in a regular order different from the order shown in FIG. 28. What is required is to perform at least the "transmission of frame #1 group", the "transmission of frame #2 group", and the "transmission of frame #3 group" by the fifth device 1000.

In the example shown in FIG. 28, the "transmission of frame #1 group", the "transmission of frame #2 group", and the "transmission of frame #3 group" are continuously performed by the fifth device 1000. However, the transmissions do not necessarily need to be performed continuously. For example, in FIG. 28, there may be a time interval between the transmission of the frame-#1 group 2601-1 and the transmission of the frame-#2 group 2602-2.

Furthermore, in the example shown in FIG. 28, only the "transmission of frame #1 group", the "transmission of frame #2 group", and the "transmission of frame #3 group" are performed. However, other symbols or other frames may also be transmitted. Furthermore, in FIG. 28 and FIG. 24, although the number of base stations 470 is three, the number of base stations 470 is not limited to three. Also in a case where the number of base stations 470 is two or more, the operation can be performed in a similar manner to the case where the number of base stations 470 is three. For example, in a case where there are N base stations 470 (N is an integer equal to or greater than 2), when the fifth device 1000 performs transmission in a manner as shown in FIG. 28, "transmission of frame #k group" is performed where k is an integer in a range from 1 to N (inclusive). The "frame #k group transmission" includes transmission of a symbol related to an SSID (information on an SSID of the base station #k), and a symbol related to an encryption key (information on an encryption key for accessing to the base station #k.

The frame configuration of a modulated signal transmitted by the wireless apparatus 453 included in the terminal 1050 in FIG. 24 is the same as the frame configuration in FIG. 15 according to Embodiment 4 described above. That is, as shown in FIG. 15, the wireless apparatus 453 in the terminal 1050 shown in FIG. 24 transmits, for example, a preamble 1201, and then transmits a control information symbol 1202 and an information symbol 1203.

The preamble 1201 is a symbol used by the base stations 470-1, 470-2, and 470-3 in, when receiving the modulated signal transmitted by the wireless apparatus 453 of the terminal 1050, performing, for example, signal detection, time synchronization, frame synchronization, frequency synchronization, frequency offset estimation, and/or the like.

The control information symbol 1202 is, for example, a symbol including data such as information related to an error correction coding scheme and a modulation scheme used in generating a modulated signal, information related to a frame configuration, and information related to a transmission scheme, and/or the like. The base stations 470-1, 470-2, and 470-3 perform processing such as demodulation on the modulated signal or the like based on the information included in the control information symbol 1202.

The information symbol 1203 is a symbol for the wireless apparatus 453 of the terminal 1050 to transmit data.

Note that the wireless apparatus 453 of the terminal 1050 in FIG. 24 may transmit a frame including a symbol other than the symbols described in FIG. 15 (for example, the wireless apparatus 453 may transmit a frame including a pilot symbol (a reference symbol) in the middle of the information symbol 1203). The frame configuration, including the order of transmitting symbols, is not limited to the configuration shown in FIG. 15. In FIG. 15, a plurality of symbols may exist in a direction along the frequency axis. That is, symbols may exist at a plurality of frequencies (a plurality of carriers).

Frame configurations of modulated signals transmitted by the base stations 470-1, 470-2, and 470-3 in FIG. 24 are the same as the frame configuration in FIG. 11 according to Embodiment 3 described above. That is, as shown in FIG. 11, the base stations 470-1, 470-2, and 470-3 transmit, for example, a preamble 701, and then transmits a control information symbol 702 and an information symbol 703.

The preamble 701 is a symbol for use by the wireless apparatus 453 of the terminal 1050 in, when receiving a modulated signal transmitted by the base stations 470-1, 470-2, or 470-3, performing, for example, signal detection, time synchronization, frame synchronization, frequency synchronization, frequency offset estimation, and/or the like.

The control information symbol 702 is, for example, a symbol including data such as information related to an error correction coding scheme and a modulation scheme used in generating a modulated signal, information related to a frame configuration, information related to a transmission scheme, and/or the like. The wireless apparatus 453 of the terminal 1050 performs processing such as demodulation or the like on the modulated signal based on the information represented by the control information symbol 702.

The information symbol 703 is a symbol used by the base stations 470-1, 470-2, and 470-3 to transmit data.

The base stations 470-1, 470-2, and 470-3 may transmit a frame including a symbol other than the symbols shown in FIG. 11. For example, the base stations 470-1, 470-2, and 470-3 may transmit a frame or the like including a pilot symbol (a reference symbol) in the middle of the information symbol 703. The frame configuration, including the order of transmitting symbols, is not limited to the configuration shown in FIG. 11. In FIG. 11, a plurality of symbols may exist in a direction along the frequency axis. That is, in FIG. 11, symbols may exist at a plurality of frequencies (a plurality of carriers).

Figure 30:
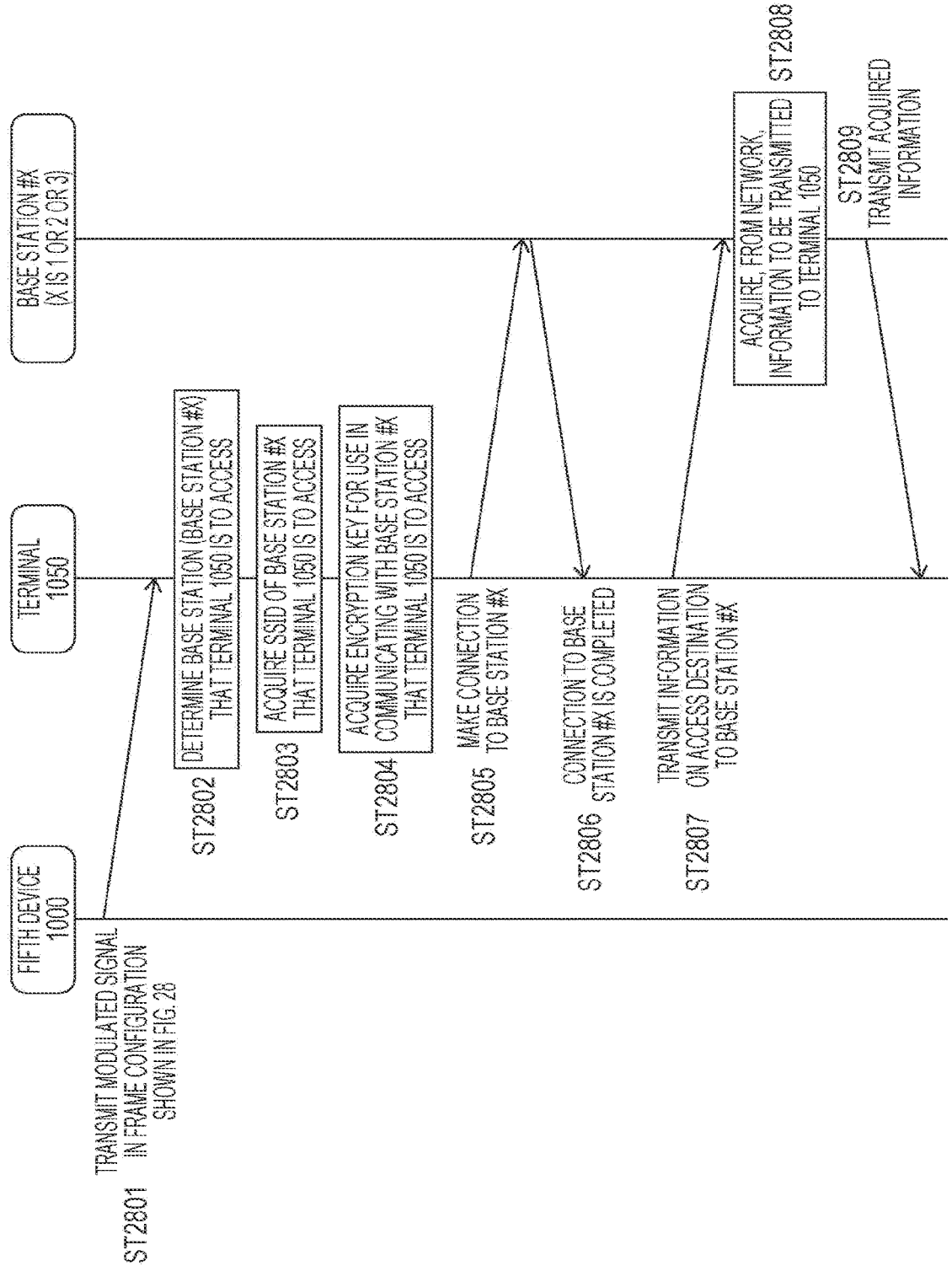
FIG. 30 is a flow chart illustrating an example of a process performed in a communication system according to Embodiment 7.

FIG. 30 is a flow chart illustrating an example of processing performed by the "fifth device 1000", the "terminal 1050", and the "base station #X" where X is 1 or 2 or 3.

First, the fifth device 1000 transmits a modulated signal in the frame configuration shown in FIG. 28 (ST2801).

The terminal 1050 receives the modulated signal transmitted by the fifth device 1000, and selects a base station that the terminal 1050 is to access, from the base station 470-1 (the base station #1), the base station 470-2 (the base station #2), and the base station 470-3 (the base station #3) shown in FIG. 24 (ST2802).

A further description regarding this is given below. In order to access one of the base stations 470, the terminal 1050 receives a modulated signal transmitted by the fifth device 1000. As a result, for example, the terminal 1050 obtains one of the "transmission of frame #1 group", the "transmission of frame #2 group", and the "transmission of frame #3 group" in FIG. 28 in a certain frame of a moving image or a still image. Based on the obtained information (for example, SSIDs) on the base stations, the terminal 1050 selects one the base station 470-1 (the base station #1), the base station 470-2 (the base station #2), and the base station 470-3 (the base station #3) as the base station 470 that the terminal 1050 is to access.

Next, the terminal 1050 receives the modulated signal transmitted by the fifth device 1000, and acquires an SSID of the base station #X to be accessed by the terminal 1050 (ST2803).

The terminal 1050 also acquires an encryption key used for communicating with the base station #X to be accessed by the terminal 1050 (ST2804).

The terminal 1050 then makes connection to the base station #X using a radio wave (ST2805). When the terminal 1050 receives a response from the base station #X, the connection between the terminal 1050 and the base station #X is completed (ST2806).

The terminal 1050 then transmits information on the connection destination to the base station #X using a radio wave (ST2807).

The base station #X obtains, from a network, information to be transmitted to the terminal 1050 (ST2808).

The base station #X transmits the obtained information to the terminal 1050 using a radio wave. Thus, the terminal 1050 obtains the information (ST2809). The terminal 1050 acquires necessary information from the network via the base station #X, for example, when necessary.

As described above, the terminal 1050 connects to the base station 470 based on the information on the SSID and the information on the encryption key transmitted from the fifth device 1000, and thus the terminal 1050 can securely acquire information via the base station 470 whose security is guaranteed. This is because information is obtained from a modulated signal of visible light, use of the visible light allows the user to easily determine whether the information source is secure or not. In contrast, for example, in a case where an SSID is acquired from a modulated signal of a radio wave transmitted via a wireless LAN, it is difficult for a user to determine a device from which the radio wave is received. Thus, from the point of view of ensuring the security of information, visible light communication is more suitable for acquiring an SSID than wireless LAN communication.

In the present embodiment described above, by way of example, the fifth device 1000 transmits the information on the encryption key. However, for example, when the base station 470 does not perform communication encrypted using an encryption key, the fifth device 1000 may transmit only the information on the SSID without transmitting the information on the encryption key. In this case, the operation may be performed in a similar manner as described above except that part of the operation related to the encryption key described above is not performed.

Note that the configuration of the fifth device is not limited to the specific configuration of the fifth device 1000 shown in FIG. 24. The configuration of the terminal is not limited to the configuration of the terminal 1050 shown in FIG. 24. The connection destination devices to which the base stations #1, #2, and #3 are connected and the configurations of the connection destination devices are not limited to the connection destination devices to which the base stations 470-1, 470-2, and 470-3 are connected and the configurations of the connection destination devices shown in FIG. 24.

Furthermore, according to the present embodiment, it is possible to reduce the number of terminals 1050 having a difficulty in accessing the base station 470 even in a case where a plurality of terminals 1050 exist in a particular area.

In FIG. 29, frame configurations of modulated signals transmitted by the fifth devices 1000 located at location denoted by circles 2701-1, 2701-2, 2701-3, 2701-4, 2701-5, 2701-6, 2701-7, 2701-8, 2701-8, 2701-9, and 2701-10 may all be similar to the frame configuration shown in FIG. 28, or modulated signals transmitted by the fifth devices 1000 may have different frame configurations. There may be a plurality of fifth devices 1000 that transmit modulated signals using the same frame configuration.

Figure 31:
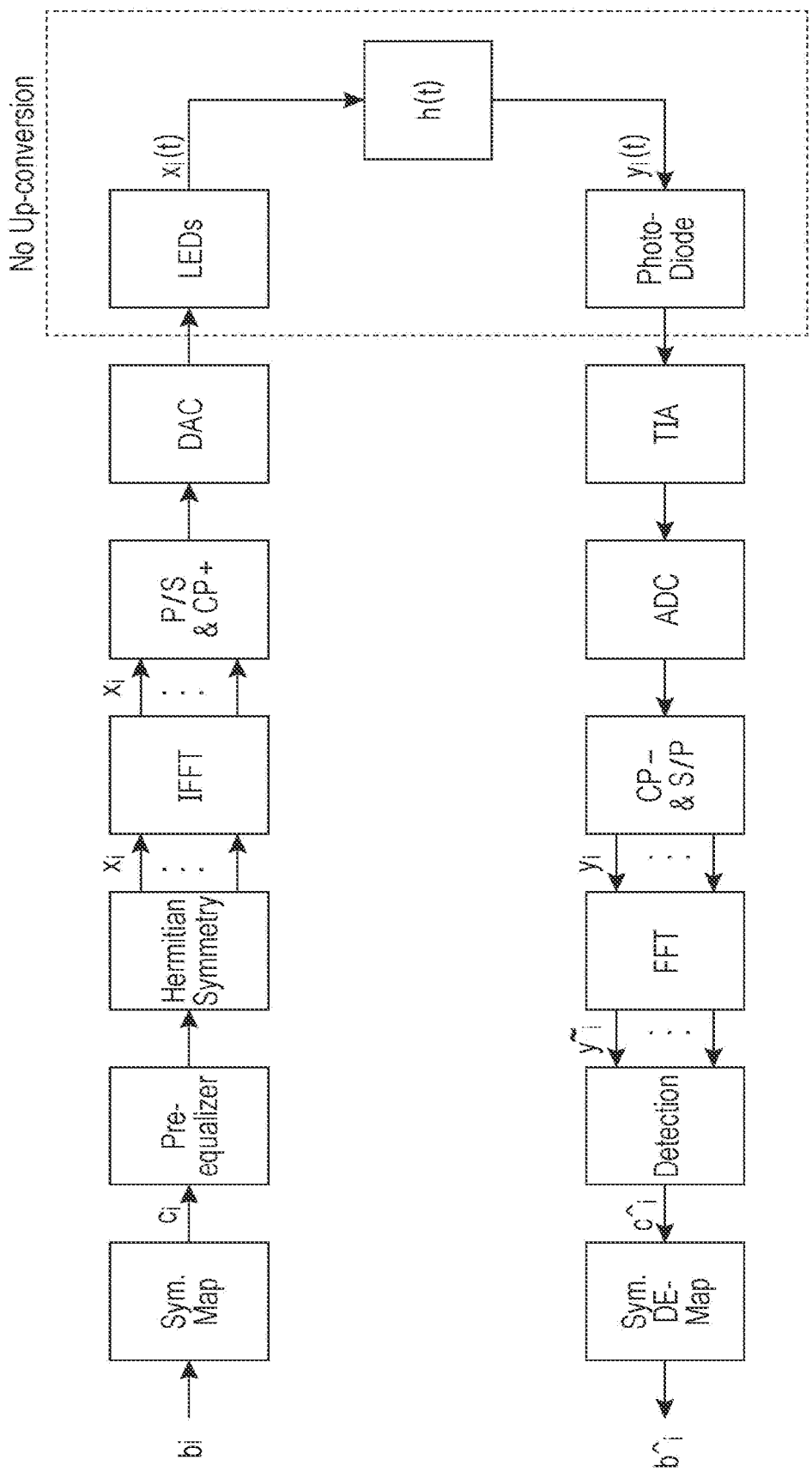
FIG. 31 is a diagram illustrating another example of a configuration of a communication system that performs a visible light communication.

Although the configuration shown in FIG. 5 has been described as an example of a configuration used in a communication system that performs visible light communication, the configuration of the communication system that performs visible light communication is not limited to that illustrated in FIG. 5. For example, a configuration such as that shown in FIG. 31 may be used (see, for example, "IEEE 802.11-16/1499 r1"). In FIG. 31, a transmission signal is transmitted as a light signal in a baseband without being upconverted. That is, a device that transmits a light signal according to the present embodiment (that is, a device having a light source) may have the configuration on the transmitting side shown in FIG. 31, and a terminal that receives an optical signal according to the present embodiment may have the configuration on the receiving side shown in FIG. 31.

The configuration in FIG. 31 is described in further detail below. A symbol mapping unit inputs transmission data and outputs a symbol sequence ($c_i$) that performs mapping based on a modulation scheme.

A pre-equalizer receives the symbol sequence as an input, performs pre-equalization processing on the symbol sequence to reduce equalization processing to be performed on the receiving side, and outputs the resultant pre-equalized symbol sequence.

A Hermitian symmetry processing unit receives, as an input thereto, the pre-equalized symbol sequence, performs subcarrier allocation on the pre-equalized symbol sequence such that Hermitian symmetry is obtained, and outputs a resultant parallel signal.

An inverse (fast) Fourier transform unit receives a parallel signal as an input, performs inverse (fast) Fourier transform on the parallel signal, and outputs a resultant inverse (fast) Fourier transformed signal.

A parallel-serial and cyclic prefix adder receives, as an input, the inverse (fast) Fourier transformed signal, performs parallel-serial transform, adds a cyclic prefix, and outputs a resultant signal-processed signal.

A digital-to-analog converter receives, as an input, the signal-processed signal, performs a digital-to-analog conversion, and outputs a resultant analog signal. The analog signal is output as light, for example, from one or more LEDs.

Note that the pre-equalizer and the Hermitian symmetry processing unit may not be provided. That is, the signal processing by the pre-equalizer and the Hermitian symmetry processing unit may not be performed.

A photodiode receives light as an input, and obtains a reception signal via a TIA (Transimpedance Amplifier).

An analog-to-digital converter performs an analog-to-digital conversion on the received signal and outputs a resultant digital signal.

A cyclic prefix removal and serial-to-parallel converter receives, as an input, the digital signal performs cyclic prefix removal, and then performs a serial-to-parallel conversion, and inputs a parallel signal.

A (fast) Fourier transform unit receives, as an input, the parallel signal, performs (fast) Fourier transform, and outputs a resultant (fast) Fourier transformed signal.

A detection unit receives, as an input, the Fourier transformed signal, performs detection, and outputs a resultant reception symbol sequence.

A symbol demapper receives, as an input, the reception symbol sequence, performs demapping, and obtains a reception data sequence as a result.

Embodiment 8

Figure 32:
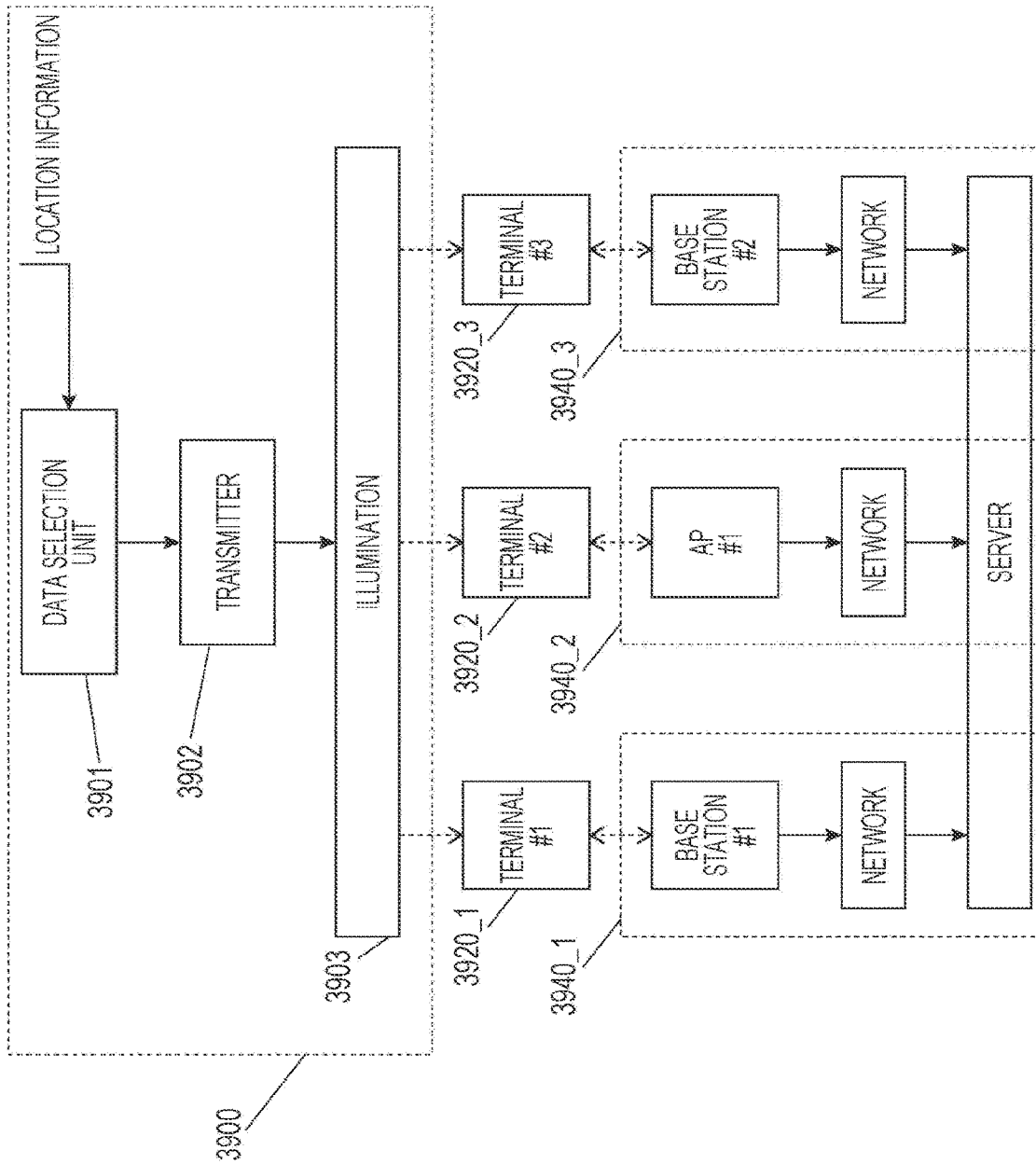
FIG. 32 is a diagram illustrating an example of a configuration of a communication system according to Embodiment 8.

FIG. 32 is a diagram illustrating an example of a configuration of a communication system according to Embodiment 8. The communication system in FIG. 32 includes a communication apparatus 3900, a terminal #1 (3920_1), a terminal #2 (3920_2), a terminal #3 (3920_3), a base station #1, a base station #2, an AP #1, a network, a server, etc. The communication apparatus 3900 described here may be installed, for example, on a transportation vehicle (a train, a bus, an aircraft, etc.). In the present embodiment, it is assumed by way of example that the communication apparatus 3900 is installed on a train. Note that the base station #1, the network, and the server may be collectively referred to as an external system 3940_1. The AP #1, the network, and the server may be collectively referred to as an external system 3940_2. The base station #2, the network, and the server may be collectively referred to as an external system 3940_3.

Let it be assumed by way example that a train is traveling from Shin-Yokohama to Tokyo. The communication apparatus 3900 shown in FIG. 32 is a communication apparatus installed in a train. The communication apparatus 3900 in FIG. 32 includes a data selection unit 3901, a transmitter 3902, and an illumination 3903.

The transmitter 3902 performs processing for transmission on the data input from the data selection unit 3901 thereby generating a modulated signal, and the illumination 3903 transmits the modulated signal as light. Hereinafter, the light transmitted from the illumination 3903 is referred to as a modulated light signal. The operations of the transmitter 3902 and the illumination 3903 have been described in Embodiment 1 to Embodiment 8, and thus a further detailed description is omitted. The transmitter 3902 and the illumination 3903 correspond to, for example, the transmitter 102 and the light source 104 in FIG. 6, FIG. 9, FIG. 13, FIG. 22, or FIG. 24.

Next, the operation of the data selection unit 3901 is described. To the data selection unit 3901, location information indicating, for example, a traveling point, a traveling direction, and/or the like is input. The location information may be traveling point information indicating a traveling point of a train on which the communication apparatus 3900 is installed, which is obtained by receiving a modulated signal from a GPS (Global Positioning Systems) satellite, or it may be location information based on "information on a station that has been passed" or "a distance from a passed station or an elapsed time since the passing". The traveling point information may be information transmitted from a predetermined system that manages the operation of the train, or may be information measured or obtained via another method.

The location information may further include traveling direction information related to the traveling direction of the train. The train traveling direction information may be set in advance based on a diagram of the train on which the communication apparatus 3900 is installed, or may be transmitted from the predetermined system that manages the operation of the train. The traveling direction information may be obtained by calculation or may be obtained by another method. The configuration of the location information is not limited to the examples described above.

Then, the data selection unit 3901 selects data to be transmitted from the illumination 3903 based on the location information described above, and outputs the selected data to the transmitter 3902. The data to be selected will be described later with reference to FIGS. 33 and 34.

The selected data is subjected to signal processing in the transmitter 3902 and transmitted as a modulated light signal from the illumination 3903. The transmitter 3902 performs signal processing such as error correction coding, mapping, and/or the like thereby generating a modulated light signal. The transmitter 3902 outputs the resultant modulated light signal to the illumination 3903.

The illumination 3903 controls the output of light and transmits the modulated light signal input from the transmitter 3902. The illumination 3903 is, for example, an illumination apparatus installed in each train car, or an illumination apparatus installed on each train seat, or the like.

Note that the operation of the transmitter 3902 may be similar to that of the transmitter 102, 103 or 1404 according to embodiments described above. The operation of the illumination 3903 may be similar to that of the light source 104 or 1406 according to the embodiments described above. Although in the present embodiment, the illumination 3903 transmits a signal using light, the signal transmission medium is not milted to light, and a signal may be transmitted using a radio wave. That is, the illumination 3903 is an example of a unit for realizing wireless transmission.

Next, an example of an operation of the terminal in FIG. 32 is described in detail.

The terminal 3920_1 (the terminal #1) receives the modulated light signal transmitted from the illumination 3903 and obtains data transmitted by the communication apparatus 3900 using the modulated light signal. A light-related configuration of the reception apparatus included in the terminal 3920_1 (the terminal #1) has been described above in Embodiment 1 to Embodiment 8, and thus a further description thereof is omitted. For example, it corresponds to the terminal 150 in FIG. 6, the terminal 450 in FIG. 9, or the terminal 1050 in FIG. 13, FIG. 22, or FIG. 24.

The terminal 3920_1 (the terminal #1) may obtain data, for example, by connecting to another communication system based on data obtained from the received modulated light signal. For example, the terminal 3920_1 (the terminal #1) may access a server via the base station #1 and a network to obtain data from the server.

Similarly, the terminal 3920_2 (the terminal #2) receives a modulated light signal transmitted from the illumination 3903, and obtains data transmitted by the communication apparatus 3900 using the modulated light signal. A light-related configuration of the reception apparatus included in the terminal 3920_2 (the terminal #2) has been described above in Embodiment 1 to Embodiment 8, and thus a further description thereof is omitted. For example, it corresponds to the terminal 150 in FIG. 6, the terminal 450 in FIG. 9, or the terminal 1050 in FIG. 13, FIG. 22, or FIG. 24.

The terminal 3920_2 (the terminal #2) may obtain data, for example, by connecting to another communication system based on data obtained from the received modulated light signal. For example, the terminal 3920_2 (the terminal #2) may access the server via the base station #2 and a network to obtain data from the server.

Similarly, the terminal 3920_3 (the terminal #3) receives a modulated light signal transmitted from the illumination 3903, and obtains data transmitted by the communication apparatus 900 using the modulated light signal. A light-related configuration of the reception apparatus included in the terminal 3920_3 (the terminal #3) has been described above in Embodiment 1 to Embodiment 8, and thus a further description thereof is omitted. For example, it corresponds to the terminal 150 in FIG. 6, the terminal 450 in FIG. 9, or the terminal 1050 in FIG. 13, FIG. 22, or FIG. 24.

The terminal 3920_3 (the terminal #3) may obtain data, for example, by connecting to another communication system based on data obtained from the received modulated light signal. For example, the terminal 3920_3 (the terminal #3) may access the server via the base station #3 and a network to obtain data from the server.

Figure 33:
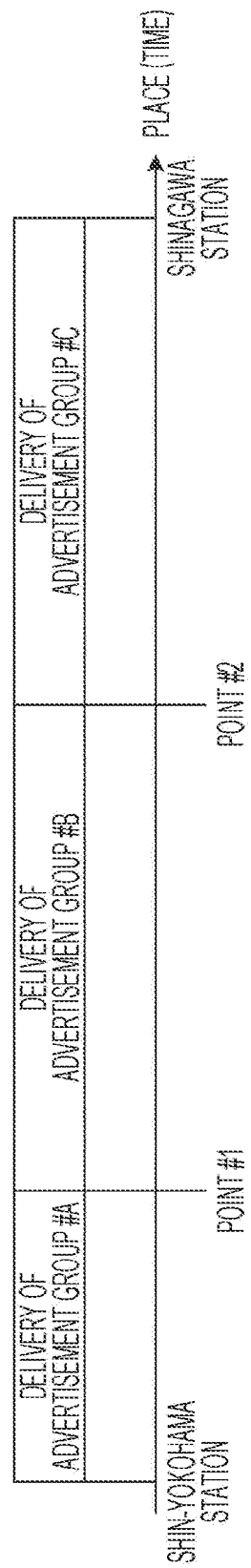
FIG. 33 is a diagram illustrating an example of an advertisement distribution according to Embodiment 8.
Figure 34:
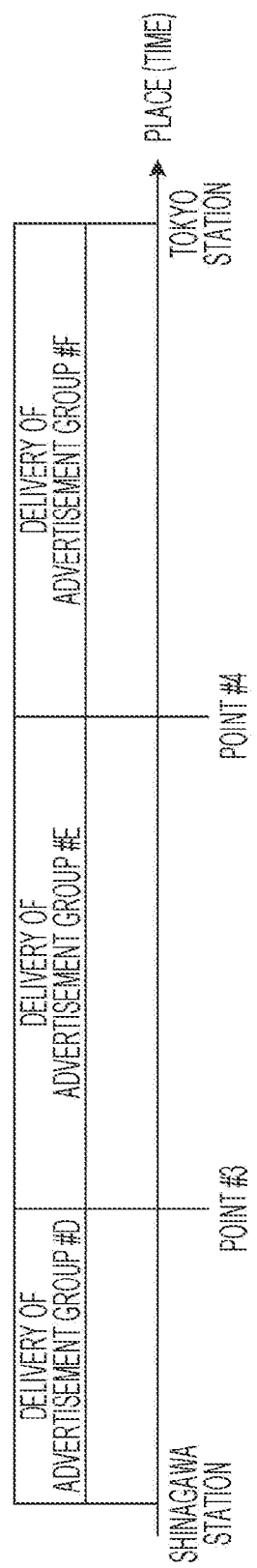
FIG. 34 is a diagram illustrating an example of an advertisement distribution according to Embodiment 8.

Next, with reference to FIGS. 33 and 34, an example of data selected by the data selection unit 3901 of the communication apparatus 3900 in FIG. 32 and an example of a selection method are described. FIGS. 33 and 34 each illustrate an example of data selected and output by the data selection unit of the communication apparatus 3900 shown in FIG. 32.

In each of FIGS. 33 and 34, a horizontal axis indicates "places" where the train is running. Note that the places may indicate, for example, places on a train traveling route. However, the horizontal axis may indicate "place" and "time (or elapsed time)". In this case, a "more specific place (traveling point)" of the train can be identified from the "place" and the "time (or elapsed time)". Here, the elapsed time is, for example, a time elapsed since a time of passing a immediately preceding reference point (such as a station).

FIG. 33 and FIG. 34 each illustrate an example of a method in which the data selection unit 3901 selects data related to a location ahead of a current train traveling point in a train traveling direction from a plurality of pieces of data. Hereinafter, the data related to the location ahead of the current location in the train traveling direction is also referred to as "approaching-location data". A plurality of data from which data is to be selected by the data selection unit 3901 may be stored locally in the communication apparatus 3900, or may be stored in an external server accessible by the communication apparatus 3900 using a communication function. In the present embodiment, the following description is given, by way of example, for a case where the data related to the location is data of an advertisement group related to the location. However, the data related to the location is not limited to the data of the advertisement group, but it may be any data such as data of a map or weather related to the location.

Next, with reference to FIG. 33, an example is described in which an advertisement group is transmitted in an up train traveling from Shin-Yokohama Station to Shinagawa Station.

As shown in FIG. 33, when the train is traveling in a section A from Shin-Yokohama Station to a point #1, the data selection unit 3901 disposed in the communication apparatus 3900 in FIG. 32 selects, for example, an advertisement group #A from data stored in the data selection unit, and outputs the data of the advertisement group #A as selected data. Thus, when the train is traveling in the section A from Shin-Yokohama Station to the point #1, the illumination 3903 on the train transmits the data of the advertisement group #A using a modulated light signal.

When the train is traveling in a section B from the point #1 to a point #2, the data selection unit 3901 disposed in the communication apparatus 3900 in FIG. 32 selects, for example, data of an advertisement group #B from the data stored in the data selection unit, and outputs the data of advertisement group #B is as selected data. Thus, when the train is traveling in the section B from the point #1 to the point #2, the illumination 3903 in the train transmits the data of the advertisement group #B using a modulated light signal.

When the train is traveling in a section C from the point #2 to Shinagawa Station, the data selection unit 3901 disposed in the communication apparatus 3900 in FIG. 32 selects, for example, data of an advertisement group #C from the data stored in the data selection unit, and outputs the data of the advertisement group #C as selected data. Thus, when the train is traveling in the section C from the point #2 to Shinagawa Station, the illumination 3903 on the train transmits the data of the advertisement group #C using a modulated light signal.

Next, with reference to FIG. 34, an example is described in which an advertisement group is delivered in an up train traveling from Shinagawa Station to Tokyo Station.

When the train is traveling in a section D from Shinagawa Station to a point #3 as shown in FIG. 34, the data selection unit 3901 disposed in the communication apparatus 3900 in FIG. 32 selects, for example, data of an advertisement group #D from the data stored in the data selection unit, and outputs the data of the advertisement group #D as selected data. Thus, when the train is traveling in the section D from Shinagawa Station to the point #3, the illumination 3903 on the train transmits the data of the advertisement group #D using a modulated light signal.

When the train is traveling in a section E from the point #3 to a point #4, the data selection unit 3901 disposed in the communication apparatus 3900 in FIG. 32 selects, for example, data of an advertisement group #E from the data stored in the data selection unit, and outputs the data of the advertisement group #E as selected data. Thus, when the train is traveling in the section E from the point #3 to the point #4, the illumination 3903 on the train transmits the data of the advertisement group #E using a modulated light signal.

When the train is traveling in a section F from the point #4 to Tokyo Station, the data selection unit 3901 disposed in the communication apparatus 3900 in FIG. 32 selects, for example, data of an advertisement group #F from the data stored in the data selection unit, and outputs the data of the advertisement group #F as selected data. When the train is traveling in the section F from the point #4 to Tokyo Station, the illumination 3903 on the train transmits the data of the advertisement group #F using a modulated light signal.

Note that the method employed by the data selection unit 3901 to obtain data of an advertisement group is not limited to the method in which data is obtained from the stored data including the data of the advertisement group #A, the data of the advertisement group #B, the data of the advertisement group #C, the data of the advertisement group #D, the data of the advertisement group #E, and the data of advertisement group #F. For example, the data selection unit 3901 of the communication apparatus 3900 in FIG. 32 may have a communication function, and may receive, from an external server or the like, the data of the advertisement group #A, the data of the advertisement group #B, the data of the advertisement group #C, the data of the advertisement group #D, the data of the advertisement group #E, and/or the data of the advertisement group #F.

For example, the advertisement group #A, the advertisement group #B, and the advertisement group #C in FIG. 33 each do not include "advertisements related to Shin-Yokohama Station and/or its neighbors" and "advertisements related to stations that the train stopped at or passed through before reaching Shin-Yokohama Station and/or their neighbors", but they each include "advertisements related to Shinagawa Station and/or its neighbors" or "advertisements related to stations, and/or their neighbors, the train will stop at or pass through after leaving Shinagawa Station". That is, the advertisement group #A, the advertisement group #B, and the advertisement group #C each include information on something related to places located ahead in the direction in which the train is traveling. That is, the data selection unit 3901 selects an advertisement group related to a location ahead of the current train traveling point in the traveling direction (that is, an approaching location-related advertisement group). However, the advertisement group #A, the advertisement group #B, and the advertisement group #C each may include an advertisement that does not follow this rule, or an advertisement not much related to stations or their neighbors.

Similarly, the advertisement group #D, the advertisement group #E, and the advertisement group #F in FIG. 34 each do not include "advertisements related to Shinagawa Station and/or its neighbors" and "advertisements related to stations that the trains stopped at or passed through before reaching Shinagawa Station, but they each includes "advertisements related to Tokyo Station and/or its neighbors" or "advertisements related to stations the train will stop at or pass through after leaving Tokyo Station and/or their neighbors". That is, the advertisement group #D, the advertisement group #E, and the advertisement group #F each include information on something related to places located ahead in the direction in which the train is traveling. That is, the data selection unit 3901 selects an advertisement group related to a location ahead of the current train traveling point in the traveling direction (that is, an approaching location-related advertisement group). However, the advertisement group #D, the advertisement group #E, and the advertisement group #F may include an advertisement that does not follow this rule, or an advertisement not much related to stations or their neighbors.

As described above, by switching data depending on the location of the train such that data such as an advertisement transmitted by the communication apparatus 3900 in FIG. 32 is switched to data such as an advertisement more suitable for the traveling point and the traveling direction of the train, it is possible to increase the possibility that a user using a terminal on the train can obtain desired data from the communication apparatus 3900 shown in FIG. 32. That is, by selecting an advertisement group to be transmitted to terminals based on the current train traveling point and the traveling direction, it becomes possible to deliver the advertisement group having a time-dependent high user value to terminals of train passengers (users).

Data of an advertisement group may be information of the advertisement itself, or information on an access destination from which to obtain information of the advertisement (for example, a URL (Uniform Resource Locator)). The information of the advertisement itself is, for example, data forming the advertisement itself (for example, characters, images, audio data, audio data). The data of the advertisement group may have information on one or more advertisements. In the above description, it is assumed by way of example that data selected by the data selection unit 3901 is an advertisement group. However, the data is not limited to the advertisement group. For example, the data may be map information on a location in the traveling direction (for example, an area around a station located ahead in the traveling direction) or information specific to a location (information specific to a place). However, the information is not limited to this.

Two different advertisement groups (for example, the advertisement group #A and the advertisement group #B) may include the same advertisement or different advertisements. For example, in FIG. 33, information of the same advertisement may exist in the advertisement group #A and the advertisement group #B. That is, the information of the same advertisement may be included in two different advertisement groups (for example, the advertisement group #A and advertisement group #B). On the other hand, for example, the advertisement group #A and the advertisement group #B may include different advertisement information. That is, two different advertisement groups may contain information of different advertisements. Note that this relationship is not limited to advertisements.

The configuration of the transmission frame of the advertisement groups transmitted by the communication apparatus 3900 in FIG. 32 is not limited to those shown in FIGS. 33 and 34.

Figure 35:
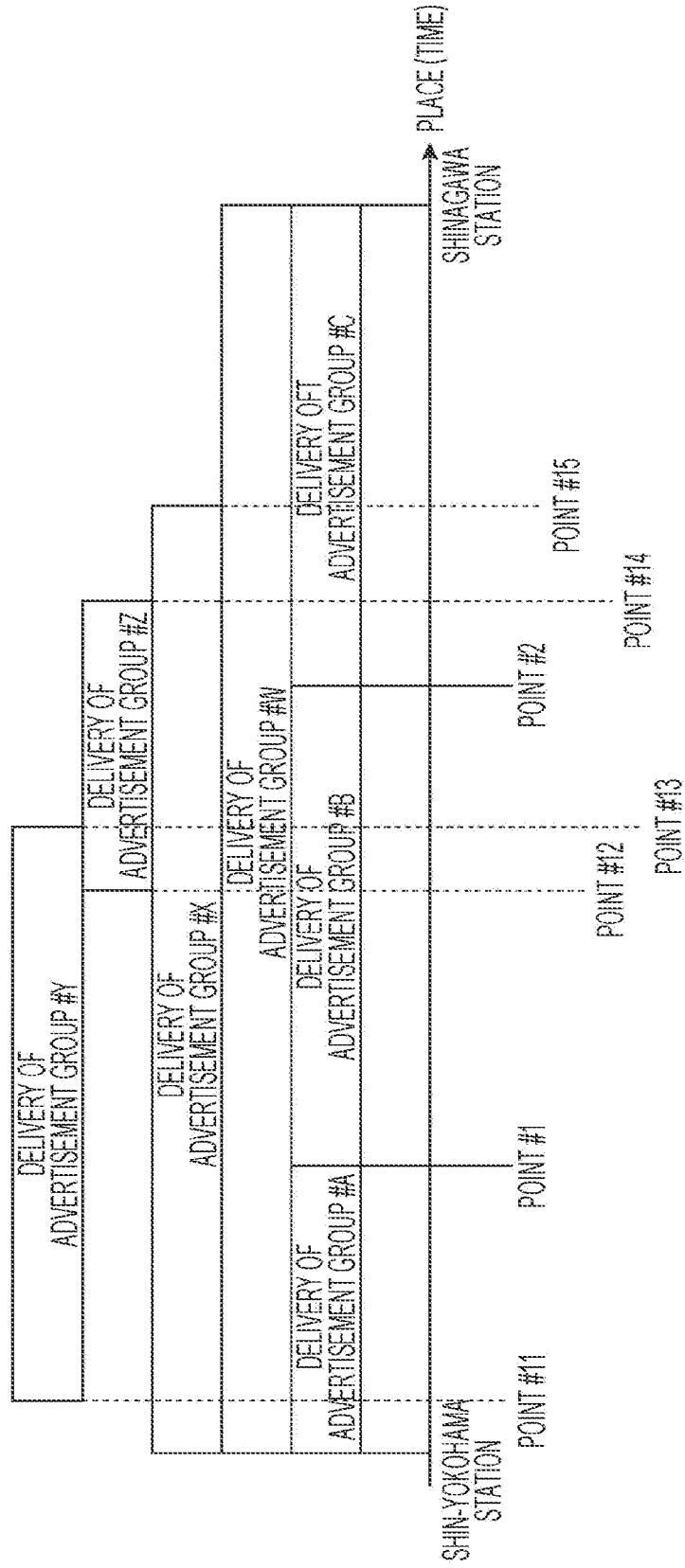
FIG. 35 is a diagram illustrating an example of an advertisement distribution according to Embodiment 8.

Next, FIG. 35 illustrates another example, different from that shown in FIG. 33, of data selected and output by the data selection unit 3901 of the communication apparatus 3900 in FIG. 32. That is, FIG. 35 illustrates another example different from the example shown in FIG. 33, in which advertisement groups are delivered in an up train traveling from Shin-Yokohama Station to Shinagawa Station. In the example described above with reference to FIG. 33, a plurality of advertisement groups are transmitted in associated corresponding sections without overlapping. In the example in FIG. 35, a plurality of advertisement groups are transmitted in at least partially overlapping sections.

In FIG. 35, as in FIG. 33, a horizontal axis indicates "places" where a train is running. Note that the places may indicate, for example, places on a train traveling route. Note that the horizontal axis may indicate "place" and "time (or elapsed time)". In this case, a "more specific place (traveling point)" of the train can be identified from the "place" and the "time (or elapsed time)". Here, the elapsed time is, for example, a time elapsed since a time of passing an immediately preceding reference point (such as a station).

As shown in FIG. 35, when the train is traveling in a section A from Shin-Yokohama Station to a point #1, the data selection unit 3901 disposed in the communication apparatus 3900 in FIG. 32 selects, for example, an advertisement group #A from data stored in the data selection unit, and outputs the data of the advertisement group #A as selected data. Thus, when the train is traveling in the section A from Shin-Yokohama Station to the point #1, the illumination 3903 in the train transmits the data of the advertisement group #A using a modulated light signal.

When the train is traveling in a section B from the point #1 to a point #2, the data selection unit 3901 disposed in the communication apparatus 3900 in FIG. 32 selects, for example, data of an advertisement group #B from the data stored in the data selection unit, and outputs the data of advertisement group #B is as selected data. Thus, when the train is traveling in the section B from the point #1 to the point #2, the illumination 3903 in the train transmits the data of the advertisement group #B using a modulated light signal.

When the train is traveling in a section C from the point #2 to Shinagawa Station, the data selection unit 3901 disposed in the communication apparatus 3900 in FIG. 32 selects, for example, data of an advertisement group #C from the data stored in the data selection unit 3901, and outputs the data of the advertisement group #C as selected data. Thus, when the train is traveling in the section C from the point #2 to Shinagawa Station, the illumination 3903 in the train transmits the data of the advertisement group #C using a modulated light signal.

When the train is traveling in a section W from Shin-Yokohama Station to Shinagawa Station, the data selection unit 3901 disposed in the communication apparatus 3900 in FIG. 32 selects, for example, data of an advertisement group #W from the data stored in the data selection unit 3901, and outputs the data of the advertisement group #W as selected data. Thus, when the train is traveling in the section W from Shin-Yokohama Station to Shinagawa Station, the illumination 3903 in the train transmits the data of the advertisement group #C using a modulated light signal.

When the train is traveling in a section X from Shin-Yokohama Station to a point #15, the data selection unit 3901 disposed in the communication apparatus 3900 in FIG. 32 selects, for example, data of an advertisement group #X from the data stored in the data selection unit 3901, and outputs the data of the advertisement group #X as selected data. Thus, when the train is traveling in the section X from Shin-Yokohama Station to the point #15, the illumination 3903 in the train transmits the data of the advertisement group #X using a modulated light signal.

When the train is traveling in a section Y from a point #11 to a point #13, the data selection unit 3901 disposed in the communication apparatus 3900 in FIG. 32 selects, for example, data of an advertisement group #Y from the data stored in the data selection unit 3901, and outputs the data of the advertisement group #Y as selected data. Thus, when the train is traveling in the section Y from the point #11 to the point #13, the illumination 3903 in the train transmits the data of the advertisement group #Y using a modulated light signal.

When the train is traveling in a section Z from a point #12 to a point #14, the data selection unit 3901 disposed in the communication apparatus 3900 in FIG. 32 selects, for example, data of an advertisement group #Z from the data stored in the data selection unit 3901, and outputs the data of the advertisement group #Z as selected data. Thus, when the train is traveling in the section Z from the point #12 to the point #14, the illumination 3903 in the train transmits the data of the advertisement group #Z using a modulated light signal.

Note that the data selection unit 3901 in the communication apparatus 3900 in FIG. 32 may select data of one or more advertisement groups from the data stored in the data selection unit 3901 depending on a place where the train is traveling and may output the selected one or more advertisement groups as selected data. For example, when the train is traveling in the section from the point #12 to the point #13, the data selection unit 3901 in the communication apparatus 3900 in FIG. 32 selects, from the data stored in the data selection unit 3901, the data of the advertisement group #B, the data of the advertisement group #W, the data of the advertisement group #X, the data of the advertisement group #Z, and the data of the advertisement group #Y and outputs them as selected data. Thus, when the train is traveling in the section from the point #12 to the point #13, the communication apparatus 3900 transmits the data of the advertisement group #B, the data of the advertisement group #W, the data of the advertisement group #X, the data of the advertisement group #Z, and the data of the advertisement group #Y using a modulated light signal.

That is, when the current traveling point belongs simultaneously to a plurality of sections overlapping at least partly, the data selection unit 3901 in FIG. 32 may select a plurality of advertisement groups respectively associated with the plurality of sections to which the current traveling point belongs.

Note that the method employed by the data selection unit 3901 to obtain data of an advertisement group is not limited to the method in which the advertisement group #A, the data of the advertisement group #B, the data of the advertisement group #C, the data of the advertisement group #W, the data of the advertisement group #X, the data of the advertisement group #Y, and/or the data of the advertisement group #Z is obtained from the stored data. For example, the data selection unit 3901 of the communication apparatus 3900 in FIG. 32 may have a communication function, and may receive the data of the advertisement group #A, the data of the advertisement group #B, the data of the advertisement group #C, the data of the advertisement group #W, the data of the advertisement group #X, the data of the advertisement group #Y, and/or the data of the advertisement group #Z from an external server or the like.

<Modifications>

Figure 36:
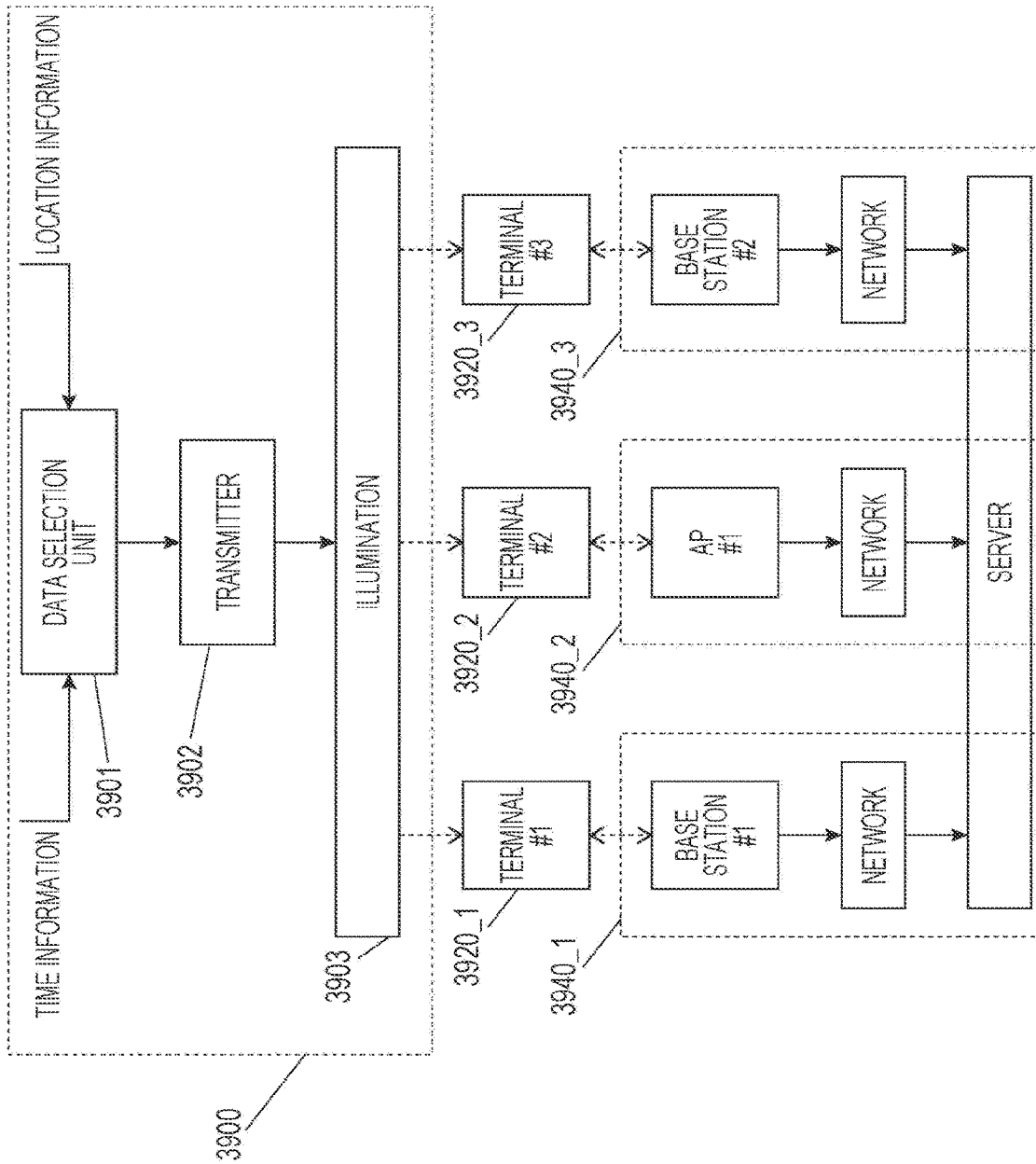
FIG. 36 is a diagram illustrating an example of a configuration of a communication system according to Embodiment 8.

FIG. 36 shows a modification of the configuration, different from that shown in FIG. 32, of the communication system according to the present embodiment. In FIG. 36, elements similar in operation to those shown in FIG. 32 are denoted by similar reference numerals. These elements have been already described above, and thus a further description thereof is omitted.

The configuration shown in FIG. 36 is different from that shown in FIG. 32 in that time information is input to the data selection unit 3901 of the communication apparatus 3900. That is, in addition to location information, time information is also input to the data selection unit 3901 in FIG. 36, and the data selection unit 3901 selects data based on the location information and the time information, and outputs it as selected data. The location information is as described above with reference to FIG. 32, and the time information is, for example, information indicating the current time.

Figure 37:
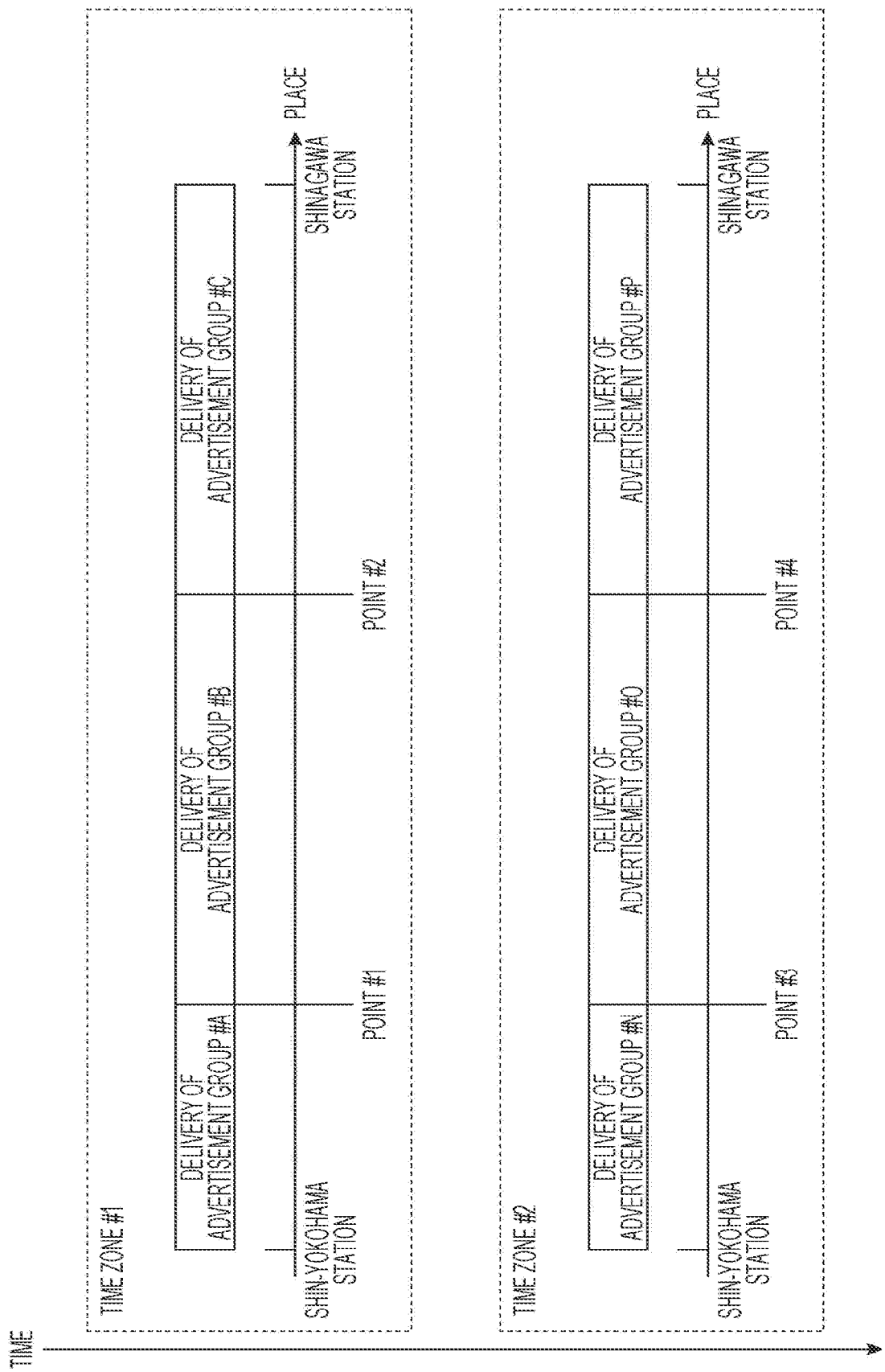
FIG. 37 is a diagram illustrating an example of an advertisement distribution according to Embodiment 8.
Figure 38:
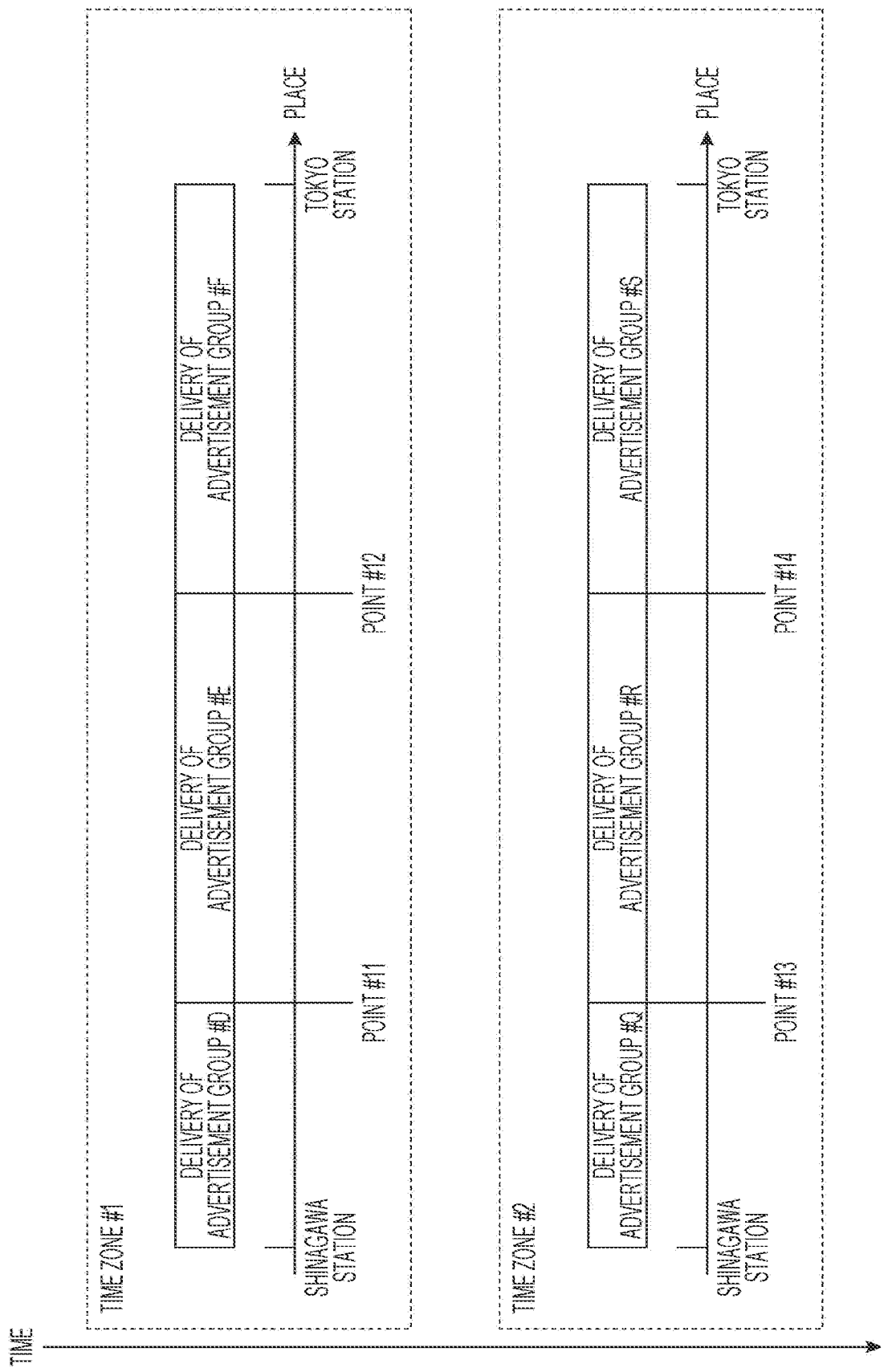
FIG. 38 is a diagram illustrating an example of an advertisement distribution according to Embodiment 8.

Next, an example of an operation of the data selection unit 3901 shown in FIG. 36 is described with reference to FIG. 37 and FIG. 38. FIGS. 37 and 38 illustrate examples of data selected and output by the data selection unit 3901 of the communication apparatus 3900 shown in FIG. 36.

In each of FIGS. 37 and 38, a horizontal axis indicates "places" where the train is running. Note that the places may indicate, for example, places on a train traveling route. Note that the horizontal axis may indicate "place" and "elapsed time". In this case, a "more specific place (traveling point)" of the train can be identified from the "place" and the "elapsed time". Here, the elapsed time is a time elapsed since the time of passing the immediately preceding reference point (such as a station). In each of FIGS. 37 and 38, a vertical axis represent time (current time). That is, the upper part and the lower part in each of FIG. 37 and FIG. 38 respectively show examples of set of advertisement groups transmitted in trains traveling along the same traveling route in different time zones #1 and #2. The time zone #2 is later in time than the time zone #1.

FIGS. 37 and 38 each illustrate an example of a method in which the data selection unit 3901 selects, from a plurality of pieces of data, data related to locations ahead of the current traveling point of the train in the traveling direction based on the traveling point of the train, the traveling direction, and the current time. A plurality of data from which data is to be selected by the data selection unit 3901 may be stored locally in the communication apparatus 3900, or may be stored in an external server accessible by the communication apparatus 3900 using a communication function. In the following description of the present embodiment, an explanation is given by way of example for a case where the data related to the location is an advertisement group related to the location. However, the data related to the location is not limited to the advertisement group, but it may be any data such as a map or weather related to the location.

Next, an example of a manner of transmitting an advertisement group in an up train traveling from Shin-Yokohama Station to Shinagawa Station in time zones #1 and #2 is described with reference to FIG. 37.

<Time Zone #1>

When the current time is within the time zone #1 and the train is traveling in a section A from Shin-Yokohama Station to a point #1, the data selection unit 3901 in the communication apparatus 3900 shown in FIG. 36 selects, for example, data of an advertisement group #A from the data stored in the data selection unit 3901 and outputs the data of the advertisement group #A as selected data. Thus, when the train is traveling in the section A from Shin-Yokohama Station to the point #1 and in the time zone #1, the illumination 3903 in the train transmits the data of the advertisement group #A using a modulated light signal. Note that the data of the advertisement group #A is data of an advertisement group suitable for the time zone #1.

When the current time is within the time zone #1 and the train is traveling in a section B from the point #1 to a point #2, the data selection unit 3901 in the communication apparatus 3900 shown in FIG. 36 selects, for example, data of an advertisement group #B from the data stored in the data selection unit 3901 and outputs the data of the advertisement group #B as selected data. Thus, when the train is traveling in the section B from the point #1 to the point #2 in the time zone #1, the illumination 3903 in the train transmits the data of the advertisement group #B using a modulated light signal. Note that the data of the advertisement group #B is data of an advertisement group suitable for the time zone #1.

When the current time is within the time zone #1 and the train is traveling in a section C from the point #2 to Shinagawa Station, the data selection unit 3901 in the communication apparatus 3900 shown in FIG. 36 selects, for example, data of an advertisement group #C from the data stored in the data selection unit 3901 and outputs the data of the advertisement group #C as selected data. Thus, in the communication apparatus 3900, when the train is traveling in the section C from the point #2 to Shinagawa Station, the illumination 3903 in the train transmits the data of the advertisement group #C using a modulated light signal. Note that the data of the advertisement group #B is data of an advertisement group suitable for the time zone #1.

Note that the data selection unit 3901 gets to know, from the time information, that the current time is within the time zone #1, and gets to know the current traveling point from the location information.

<Time Zone #2>

When the current time is within the time zone #2 and the train is traveling in a section N from Shin-Yokohama Station to a point #3, the data selection unit 3901 in the communication apparatus 3900 shown in FIG. 36 selects, for example, data of an advertisement group #N from the data stored in the data selection unit 3901 and outputs the data of the advertisement group #N as selected data. Thus, when the train is traveling in the section N from Shin-Yokohama Station to the point #3 in the time zone #2, the illumination 3903 in the train transmits the data of the advertisement group #N using a modulated light signal. Note that the data of the advertisement group #N is data of an advertisement group suitable for the time zone #2.

When the current time is within the time zone #2 and the train is traveling in a section O from the point #3 to a point #4, the data selection unit 3901 in the communication apparatus 3900 shown in FIG. 36 selects, for example, data of an advertisement group #0 from the data stored in the data selection unit 3901 and outputs the data of the advertisement group #0 as selected data. Thus, when the train is traveling in the section O from the point #3 to the point #4 in the time zone #2, the illumination 3903 in the train transmits the data of the advertisement group #0 using a modulated light signal. Note that the data of the advertisement group #0 is data of an advertisement group suitable for the time zone #2.

When the current time is within the time zone #2 and the train is traveling in a section P from the point #4 to Shinagawa Station, the data selection unit 3901 in the communication apparatus 3900 shown in FIG. 36 selects, for example, data of an advertisement group #P from the data stored in the data selection unit 3901 and outputs the data of the advertisement group #P as selected data. Thus, when the train is traveling in the section P from the point #4 to Shinagawa Station, the illumination 3903 in the train transmits the data of the advertisement group #P using a modulated light signal. Note that the data of the advertisement group #P is data of an advertisement group suitable for the time zone #2.

Note that the data selection unit 3901 gets to know, from the time information, that the current time is within the time zone #2, and gets to know the current traveling point # from the location information.

Note that, for example, the advertisement group #A, the advertisement group #B, and the advertisement group #C, the advertisement group #N, the advertisement group #O, and the advertisement group #P in FIG. 37 each do not include "advertisements related to Shin-Yokohama Station and/or its neighbors" and "advertisements related to stations and/or its neighbors that the train stopped at or passed through before Shin-Yokohama Station", but they each have "advertisements related to Shinagawa Station and/or its neighbors" or "advertisements related to stations the train will stop at or pass through after leaving Shinagawa Station and/or related to their neighbors". That is, the advertisement group #A, the advertisement group #B, the advertisement group #C, the advertisement group #N, the advertisement group #0, and the advertisement group #P each include information on something related to places located ahead in the direction in which the train is traveling. That is, the data selection unit 3901 selects an advertisement group related to a location ahead of the current train traveling point in the traveling direction (that is, an approaching location-related advertisement group). However, the advertisement group #A, the advertisement group #B, the advertisement group #C, the advertisement group #N, the advertisement group #O, and the advertisement group #P may include an advertisement that does not follow this rule, or an advertisement not much related to stations or their neighbors.

Next, with reference to FIG. 38, examples are described in which advertisement groups are transmitted in up trains traveling from Shinagawa Station to Tokyo Station in the time zone #1 and time zone #2.

<Time Zone #1>

In FIG. 38, when the current time is within the time zone #1 and the train is traveling in a section D from Shin-Yokohama Station to a point #11, the data selection unit 3901 in the transmission apparatus 3900 shown in FIG. 36 selects, for example, data of an advertisement group 3901 from the data stored in the data selection unit 3901 and outputs the data of the advertisement group #D as selected data. Thus, when the train is traveling in the section D from Shinagawa Station to the point #11, the illumination 3903 in the train transmits the data of the advertisement group #D using a modulated light signal. Note that the data of the advertisement group #D is data of an advertisement group suitable for the time zone #1.

When the current time is within the time zone #1 and the train is traveling in a section E from the point #11 to a point #12, the data selection unit 3901 in the transmission apparatus 3900 shown in FIG. 36 selects, for example, data of an advertisement group #E from the data stored in the data selection unit 3901 and output the data of the advertisement group #E as selected data. Thus, when the train is traveling in the section E from the point #11 to the point #12 in the time zone #1, the illumination 3903 in the train transmits the data of the advertisement group #E using a modulated light signal. Note that the data of the advertisement group #E is data of an advertisement group suitable for the time zone #1.

When the current time is within the time zone #1 and the train is traveling in a section F from the point #12 to Tokyo Station, the data selection unit 3901 in the transmission apparatus 3900 shown in FIG. 36 selects, for example, data of an advertisement group #F from the data stored in the data selection unit 3901 and outputs the data of the advertisement group #F as selected data. Thus, when the train is traveling in the section F from the point #12 to Tokyo in the time zone #1, the illumination 3903 in the train transmits the data of the advertisement group #F using a modulated light signal. Note that the data of the advertisement group #F is data of an advertisement group suitable for the time zone #1.

Note that the data selection unit 3901 gets to know, from the time information, that the current time is within the time zone #1, and gets to know the current traveling point from the location information.

<Time Zone #2>

When the current time is within the time zone #2 and the train is traveling in a section Q from Shinagawa Station to a point #13, the data selection unit 3901 in the transmission apparatus 3900 shown in FIG. 36 selects, for example, data of an advertisement group #Q from the data stored in the data selection unit 3901 and outputs the data of the advertisement group #Q as selected data. Thus, when the train is traveling in the section Q from Shinagawa Station to the point #13 in the time zone #2, the illumination 3903 in the train transmits the data of the advertisement group #Q using a modulated light signal.

When the current time is within the time zone #2 and the train is traveling in a section R from the point #13 to a point #14, the data selection unit 3901 in the transmission apparatus 3900 shown in FIG. 36 selects, for example, data of an advertisement group #R from the data stored in the data selection unit 3901 and outputs the data of the advertisement group #R as selected data. Thus, when the train is traveling in the section R from the point #13 to the point #14 in the time zone #2, the illumination 3903 in the train transmits the data of the advertisement group #R using a modulated light signal. Note that the data of the advertisement group #R is data of an advertisement group suitable for the time zone #2.

When the current time is within the time zone #2 and the train is traveling in a section S from the point #14 to Tokyo Station, the data selection unit 3901 in the transmission apparatus 3900 shown in FIG. 36 selects, for example, data of an advertisement group #S from the data stored in the data selection unit 3901 and outputs the data of the advertisement group #5 as selected data. Thus, when the train is traveling in the section S from the point #14 to Tokyo Station in the time zone #2, the illumination 3903 in the train transmits the data of the advertisement group #S using a modulated light signal. Note that the data of the advertisement group #S is data of an advertisement group suitable for the time zone #2.

Note that the data selection unit 3901 gets to know, from the time information, that the current time is within the time zone #2, and gets to know the current traveling point # from the location information.

Note that the method employed by the data selection unit 3901 to obtain data of an advertisement group is not limited to the method in which the data of the advertisement group #A, the data of the advertisement group #B, the data of the advertisement group #C, the data of the advertisement group #D, the data of the advertisement group #E, the data of the advertisement group #F, the data of the advertisement group #N, the data of the advertisement group #O, the data of the advertisement group #P, the data of the advertisement group #Q, the data of the advertisement group #R, and/or the data of the advertisement group is obtained from the stored data. For example, the data selection unit 3901 of the communication apparatus 3900 in FIG. 36 may have a communication function, and may acquire, from an external server or the like, the data of the advertisement group #A, the data of the advertisement group #B, the data of the advertisement group #C, the data of the advertisement group #D, the data of the advertisement group #E, the data of the advertisement group #F, the data of the advertisement group #N, the data of the advertisement group #O, the data of the advertisement group #P, the data of the advertisement group #Q, the data of the advertisement group #R, and/or the data of the advertisement group.

Note that the advertisement group #D, the advertisement group #E, the advertisement group #F, the advertisement group #Q, the advertisement group #R, and the advertisement group #S, in FIG. 38 each do not include "advertisements related to Shinagawa Station and/or its neighbors" and "advertisements related to stations that the train stopped at or passed through before Shinagawa Station" and/or related to their neighbors, but they each includes "advertisements related to Tokyo Station and/or its neighbors" or "advertisements related to stations the train will stop at or pass through after leaving Tokyo Station and/or their neighbors". That is, the advertisement group #D, the advertisement group #E, the advertisement group #F, the advertisement group #0, the advertisement group #R, and the advertisement group #S each include information on something related to places located ahead in the direction in which the train is traveling. That is, the data selection unit 3901 selects an advertisement group related to a location ahead of the current train traveling point in the traveling direction (that is, an approaching location-related advertisement group). However, the advertisement group #D, the advertisement group #E, the advertisement group #F, the advertisement group #0, the advertisement group #R, and the advertisement group #S each may include an advertisement that does not follow this rule, or an advertisement not much related to stations or their neighbors.

Let it be assumed, by way of example, that in FIGS. 37 and 38 the time zone #1 is "from 10 o'clock to 12 o'clock" and the time zone #2 is "from 16 o'clock to 18 o'clock". Let it be further assumed here, by way of example, that the advertisement group delivered in the time zone #1 is an advertisement group related to a lunch restaurant, and the advertisement group delivered in the time zone #2 is an advertisement group related to a dinner restaurant. As described above, by selecting an advertisement group to be transmitted to terminals based on the time zone including the current time, it becomes possible to deliver the advertisement group having a time-dependent high user value to terminals of train passengers (users). Thus, users using terminals shown in FIG. 36 in a train can obtain information more suitable for the current time.

As described above, by switching data such that data such as an advertisement transmitted by the communication apparatus 3900 in FIG. 36 is switched to data such as an advertisement more suitable for the traveling point and the traveling direction of the train and suitable for the time zone, depending on the traveling point of the train, the traveling direction, and the time zone to which the current time belongs, it is possible to increase the possibility that a user using a terminal on the train can obtain desired data from the communication apparatus 3900 shown in FIG. 36.

Data of an advertisement group may be information of the advertisement itself, or information on an access destination from which to obtain information of the advertisement (for example, a URL (Uniform Resource Locator)). The information of the advertisement itself is, for example, data forming the advertisement itself (for example, characters, images, audio data, audio data). The data of the advertisement group may have information on one or more advertisements. In the above description, it is assumed by way of example that data selected by the data selection unit 3901 is an advertisement group. However, the data is not limited to the advertisement group. For example, the data may be map information on a location in the traveling direction (for example, an area around a station located ahead in the traveling direction) or information specific to a location (information specific to a place). However, the information is not limited to this.

Two different advertisement groups (for example, the advertisement group #A and the advertisement group #B) may include the same advertisement or different advertisements. For example, in FIG. 37, information of the same advertisement may exist in the advertisement group #A and the advertisement group #B. That is, the information of the same advertisement may be included in two different advertisement groups (for example, the advertisement group #A and advertisement group #B). On the other hand, for example, the advertisement group #A and the advertisement group #B may include different advertisement information. That is, two different advertisement groups may contain information of different advertisements. Note that this relationship is not limited to advertisements.

Figure 39:
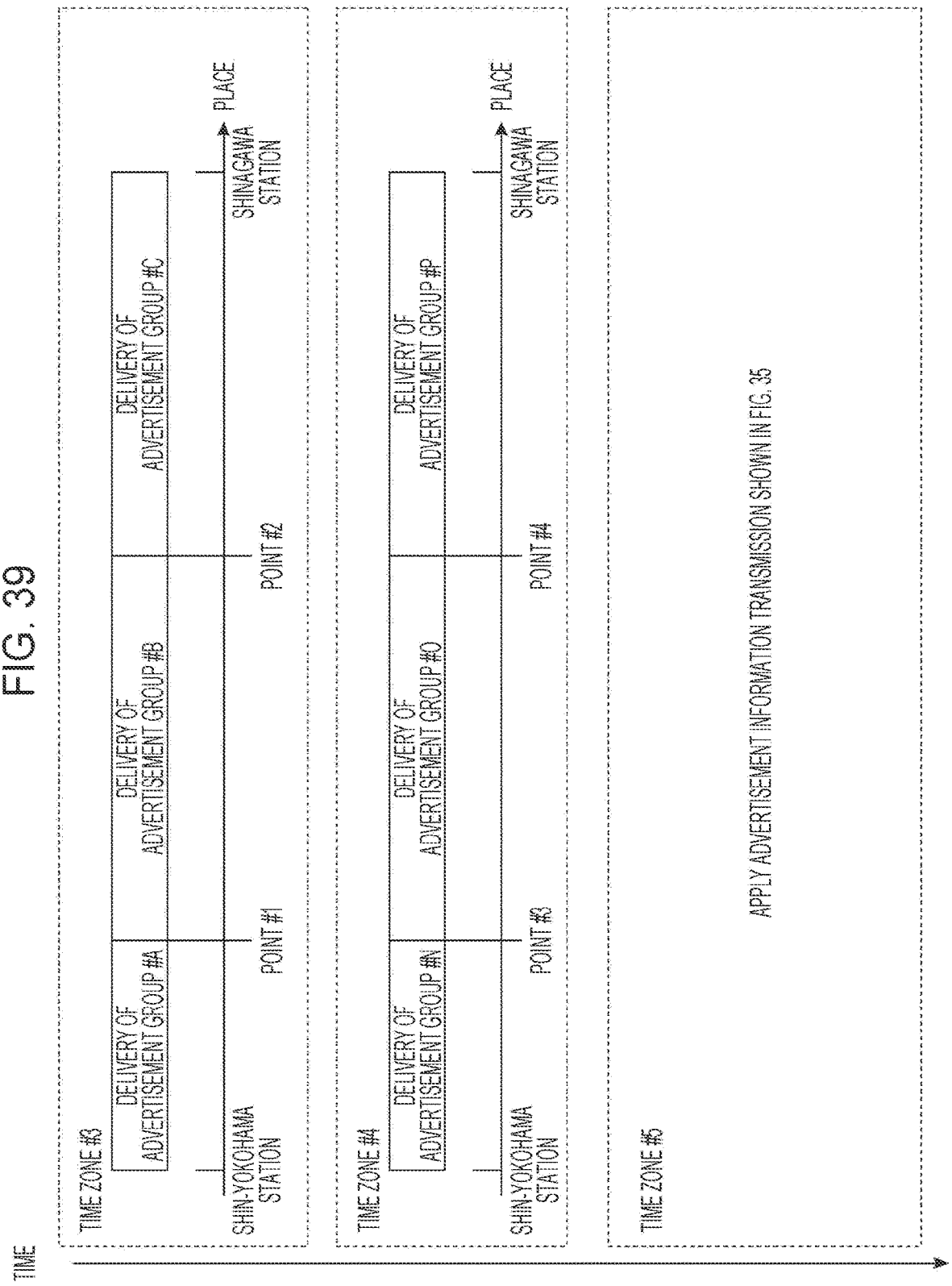
FIG. 39 is a diagram illustrating an example of an advertisement distribution according to Embodiment 8.

The configuration of the transmission frame of the advertisement groups transmitted by the communication apparatus 3900 in FIG. 36 is not limited to those shown in FIGS. 37 and 38, and the setting of the time zones is not limited to the examples shown in FIG. 37 and FIG. 38. FIG. 39 shows another example of data selected and output by the data selection unit 3901 disposed in the communication apparatus 3900 shown in FIG. 36.

FIG. 39 illustrates another example, different from the example shown in FIG. 37, in which advertisement groups are distributed in an up train traveling from Shin-Yokohama Station to Shinagawa Station in time zones #3, #4, and #5. In FIG. 39, as in FIG. 37, a horizontal axis indicates "places" where the train is running. Note that the horizontal axis may indicate "place" and "elapsed time". In this case, a "more specific place (traveling point)" of the train can be identified from the "place" and the "elapsed time". Here, the elapsed time is a time elapsed since the time of passing the immediately preceding reference point (such as a station). In FIG. 39, a vertical axis indicates time (current time). For example, the time zone is divided into three zones and named as a time zone #3, a time zone #4, and a time zone #5.

FIG. 39 illustrates an example of a manner of transmitting advertisement groups in three different time zones #3, #4 and #5. In the time zone #3, the advertisement group #A, the advertisement group #B, and the advertisement group #C are transmitted in sections #A, #B, and #C, respectively, as in the case shown in the upper part of FIG. 37. The manner of transmitting advertisement groups in the time zone #3 is the same as that in the time zone #1 shown in FIG. 37, and thus a further detailed description thereof is omitted. In the time zone #4, the advertisement group #N, the advertisement group #0, and the advertisement group #P are transmitted in sections #N, #0 and #P, respectively, as in the case shown in the lower part of FIG. 37. The manner of transmitting advertisement groups in the time zone #4 is the same as that in the time zone #2 shown in FIG. 37, and thus a further detailed description thereof is omitted. In the time zone #5, as in FIG. 35, the advertisement group #A, the advertisement group #B, the advertisement group #C, the advertisement group #W, the advertisement group #X, the advertisement group #Y, and the advertisement group #Z are transmitted in sections #A, #B, #C, #W, #X, #Y, and #Z, respectively. The transmission manner in the time zone #5 has already been described above with reference to FIG. 35, and thus a further detailed description thereof is omitted.

FIG. 39 illustrates an example of a configuration of a transmission frame of an advertisement group transmitted by the communication apparatus 3900 in FIG. 36, but the frame configuration is not limited to this.

As described above, in the present embodiment, the communication apparatus installed on a train or the like switches an advertisement group transmitted to a terminal based on information on a place and more particularly on a traveling point of the train or the like, a traveling direction, a time, and/or the like, and thus a user, who is communicating with this transmission apparatus, can obtain more suitable information.

The present embodiment has been described above assuming by way of example that trains are up trains. In a case where trains are down trains, the traveling direction is different from that of the up trains, and advertisement groups transmitted in down trains are different from those transmitted in up trains even in the same sections and/or in the same time zones. For example, in a down train traveling from Tokyo Station to Shinagawa Station on the route shown in FIG. 34, advertisement groups transmitted are different from the advertisement group #F which is transmitted in up trains in the section F from Tokyo Station to the point #4. The approaching location-related advertisement groups transmitted do not include "advertisements related to Tokyo Station and nearby locations" and "advertisements related to stations where the train stopped (or passed) before Tokyo Station and advertisements related to nearby locations", but they include "advertisements related to Shinagawa Station and nearby locations" and/or "advertisements related to stations where the train will stop (or pass) after Shinagawa Station and advertisements related to nearby locations".

In the present embodiment, the communication apparatus 3900 selects approaching-location data from a plurality of pieces of data based on the traveling point of the train, the traveling direction, and/or the current time. This makes it possible to transmit data having time-dependent high value for users to terminals of train passengers (users).

In the present embodiment, the communication apparatus 3900 is installed, by way of example, on a train. However, the communication apparatus 3900 may be installed on another type of transportation vehicle. For example, a communication apparatus 3900 may be installed on a transportation vehicle such as a bus, an aircraft, or the like, and the communication apparatus 3900 may transmit transmission destination data to terminals of passengers (users) of the transportation vehicle.

The communication apparatus 3900 may incorporate information indicating the traveling point and/or the current time into the data transmitted from the illumination 3903. This enables the terminal to obtain the traveling point and/or the current time from the received data.

Embodiment 9

Figure 40:
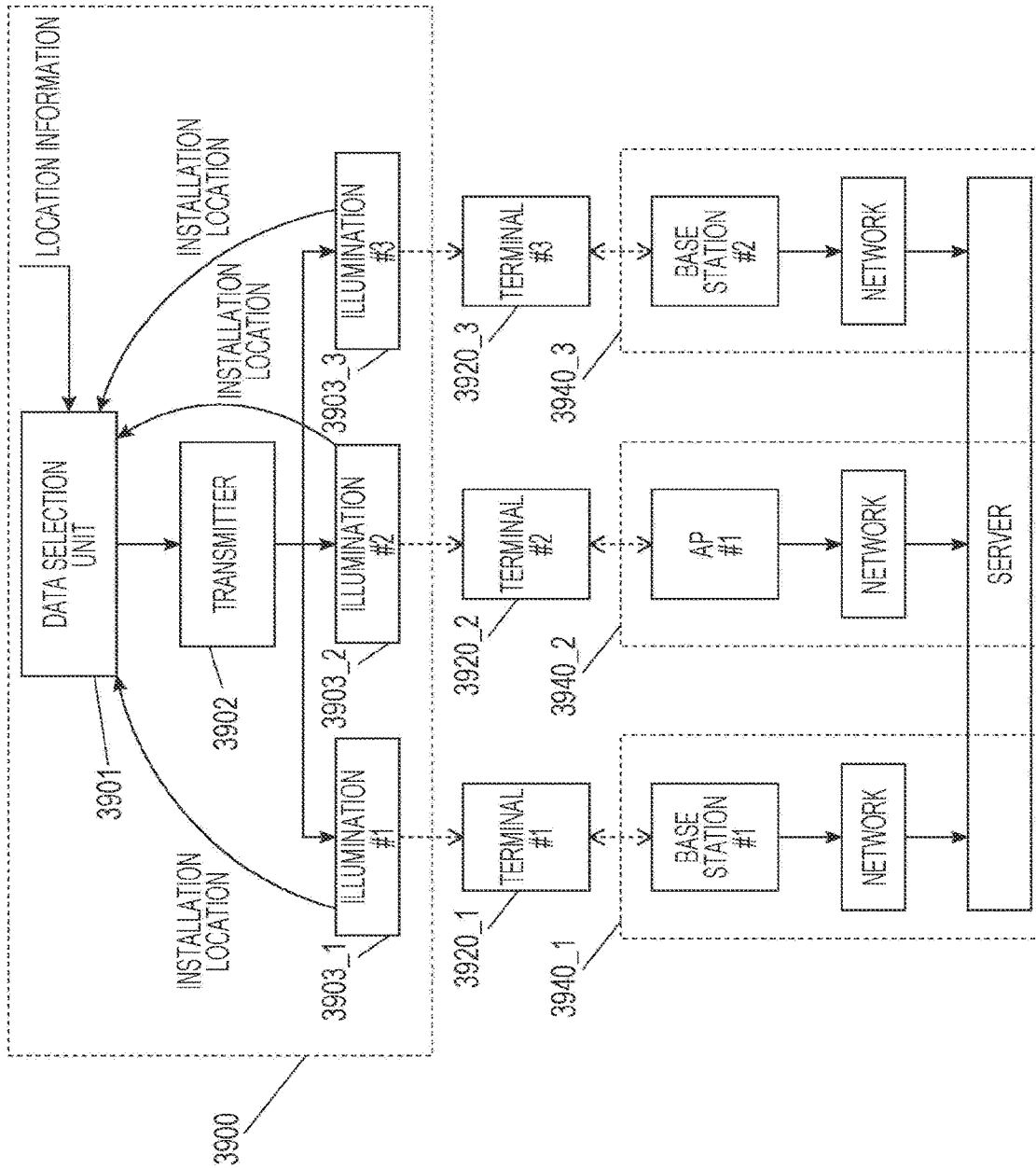
FIG. 40 is a diagram illustrating an example of a configuration of a communication system according to Embodiment 9.
Figure 41:
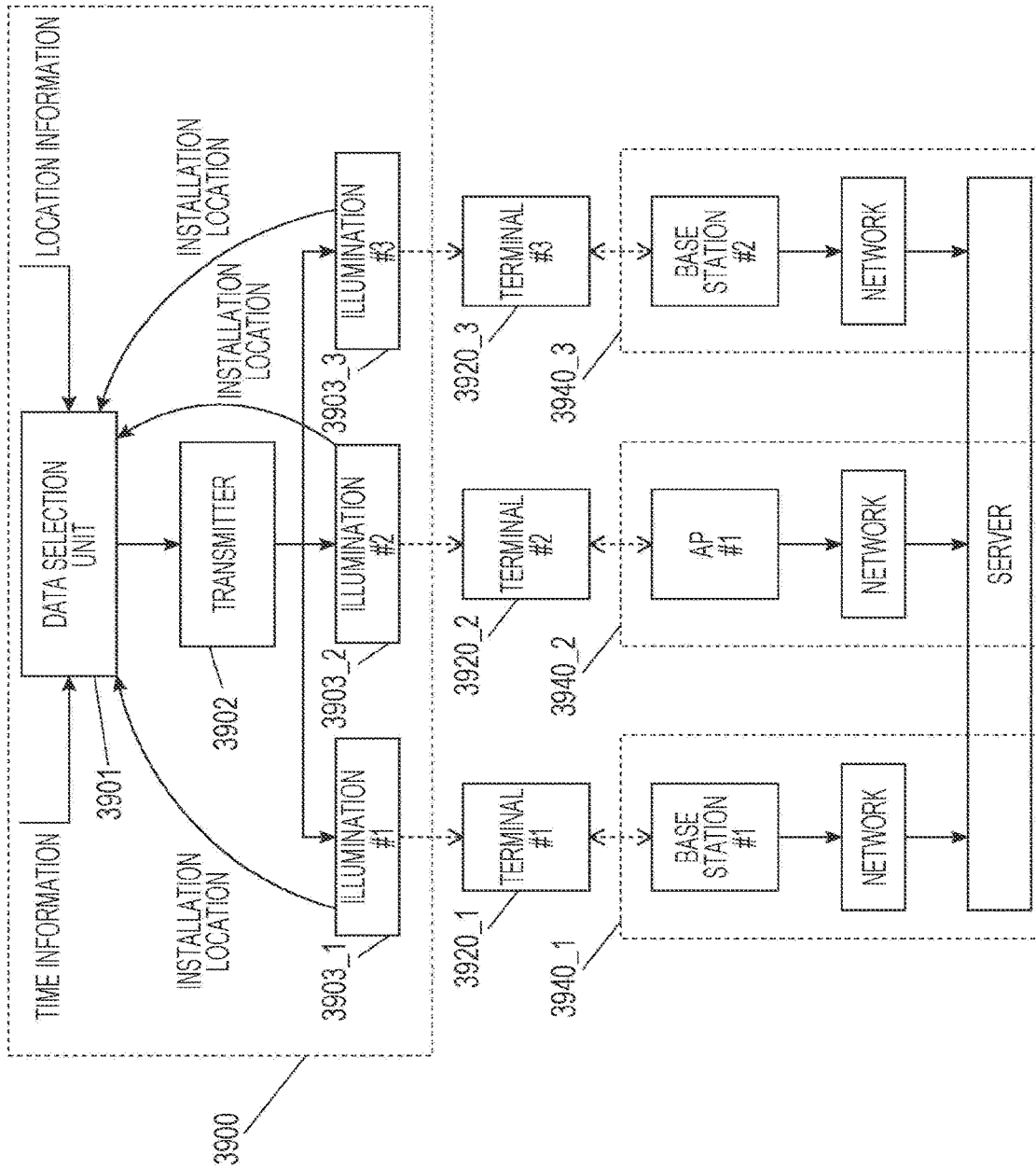
FIG. 41 is a diagram illustrating an example of a configuration of a communication system according to Embodiment 9.

FIGS. 40 and 41 are diagrams each illustrating an example of a configuration employed in a case where the communication apparatus 3900 in FIGS. 32 and 36 further uses information (location information) on an installation location of each illumination 3903. In this configuration, location information associated with each illumination is input to the data selection unit 3901 in FIG. 40 and FIG. 41.

In FIGS. 40 and 41, illuminations 3903_1, 3903_2, and 3903_3 transmit information on their respective installation locations (location information) to a data selection unit 3901. For example, in a case where the illumination 3903 is an illumination apparatus installed on a ceiling of each train car, the location information of the illumination 3903 may include a train car number of the train on which the illumination 3900 is installed (for example, when the train car is an n-th train car, the train car number may be n and n is, for example, a natural number). Note that the illumination 3903 may transmit its identification information, instead of the location information of the illumination 3903, to the data selection unit 3901. This makes it possible for the terminal to obtain the information on the train car number of the train car where the terminal is located.

The data selection unit 3901 manages the location information by associating each piece of location information (or identification information) of the illumination 3903 to particular information. For example, as described below with reference to "Example 5" and "Example 6", the location information is managed such that the location information of the illumination 3903 is associated with particular information. Also note that the following Example 5 and Example 6 may be implemented in combination.

Example 5

The data selection unit 3901 manages information such that the installation location (for example, the train car number) of each illumination 3903 is associated with connection information, for example, an SSID, assigned to a base station (or an AP) to which terminals in the train car are to be connected. For example, in FIG. 40, the illumination 3903_1 (the illumination #1) is associated with an SSID of a base station relatively close to this illumination #1 (for example, a base station located in the same train car), that is, the base station #1, in this case. Similarly, the illumination 3903_1 (an illumination #2) is associated with an SSID of an AP relatively close to the illumination #2 (for example, an AP located in the same train car), that is, the AP #1, in this case. An illumination 3903_1 (an illumination #3) is associated with an SSID of a base station relatively close to the illumination #3 (for example, a base station located in the same train car), that is, the base station #2, in this case.

When the data selection unit 3901 selects an advertisement group (data) to be transmitted using a modulated light signal from the illumination 3903 according to Embodiment 8, the data selection unit 3901 selects an SSID associated with the installation location of the illumination 3903 and the data selection unit 3901 incorporates the selected SSID into the data. That is, the data transmitted from the illumination 3903 to the terminal 3920 includes the SSID of the base station (or the AP) associated with the installation location of the illumination 3903. This makes it possible for terminals 3920 of passengers (users) in respective train cars of the train to be connected to different SSIDs depending on the train cars. For example, in FIG. 40, the terminal 3920_1 (the terminal #1) receives the SSID of the base station #1 from the illumination #1, and thus the terminal #1 is connected to the base station #1. Similarly, the terminal 3920_2 (the terminal #2) receives the SSID of the AP #1 from the illumination #2, and thus the terminal #2 is connected to the AP #1. Similarly, the terminal 3920_3 (the terminal #3) receives the SSID of the base station #2 # from the illumination #3, and thus the terminal #3 is connected to the base station #2.

Example 6

The data selection unit 3901 manages information such that the installation location (for example, the train car number) of each illumination 3903 is associated with an advertisement group to be transmitted to terminals in this train car. For example, in FIG. 40, the illumination 3903_1 (the illumination #1) is associated with an advertisement group to be transmitted to the terminal 3920_1 (the terminal #1) in a train car in which the illumination #1 is installed. Similarly, the illumination 3903_2 (the illumination #2) is associated with an advertisement group to be transmitted to the terminal 3920_2 (the terminal #2) in a train car in which the illumination #2 is installed. The illumination 3903_3 (the illumination #3) is associated with an advertisement group to be transmitted to the terminal 3920_3 (the terminal #3) in a train car in which the illumination #3 is installed.

The data selection unit 3901 selects approaching location-related advertisement groups based on the train traveling direction, the traveling point, and/or the current time according to Embodiment 8, and further selects, for each illumination 3903, an advertisement group associated with the installation location of the illumination 3903 from the selected approaching location-related advertisement groups. That is, approaching location-related advertisement groups are selected based on the train traveling direction, the traveling point, and/or the current time, and further an advertisement group associated with the installation location of the illumination 3903 is selected based on the installation location (for example, the train car number) of the illumination 3903 from the approaching location-related advertisement groups and the selected advertisement group is transmitted to terminals 3920 in the corresponding one of the train cars of the train. This makes it possible for the communication apparatus 3900 to transmit, to terminals 3920 of passengers (users) on the train, advertisement groups related to approaching locations such that the transmitted advertisement group is different depending on the train car.

Note that the information on the installation location of the illumination 3903 is not limited to the train car number of the train. For example, the illumination 3903 may be an illumination apparatus installed above each seat, and the installation location of the illumination 3903 may be indicated by a seat number of the train. In this case, the communication apparatus 3900 can transmit, to terminals 3920 of passengers (users) on the train, advertisement groups different for each seat.

In the present embodiment, the communication apparatus 3900 is installed, by way of example, on a train. However, the communication apparatus 3900 may be installed on another type of transportation vehicle. For example, a communication apparatus 3900 may be installed on a transportation vehicle such as a bus, an aircraft, or the like, and the communication apparatus 3900 may transmit data to terminals 3920 of passengers (users) of the transportation vehicle. The communication apparatus 3900 may incorporate information on a traveling point and/or a current time into data transmitted from the light source 3903. In this case, the terminal 3920 can obtain the travel location and/or the current time from the received data.

The communication apparatus may transmit a modulated light signal including both information on an advertisement or the like and information on an SSID.

Embodiment 10

The previous embodiments relate to vehicles, and directions in which the vehicles are traveling can be easily estimated. In Embodiment 10, in contrast, an example is described in which the communication apparatus 3900 transmits, to a pedestrian (a user) having a terminal, information suitable from the point of view of a traveling direction of the pedestrian using a modulated light signal.

Figure 42:
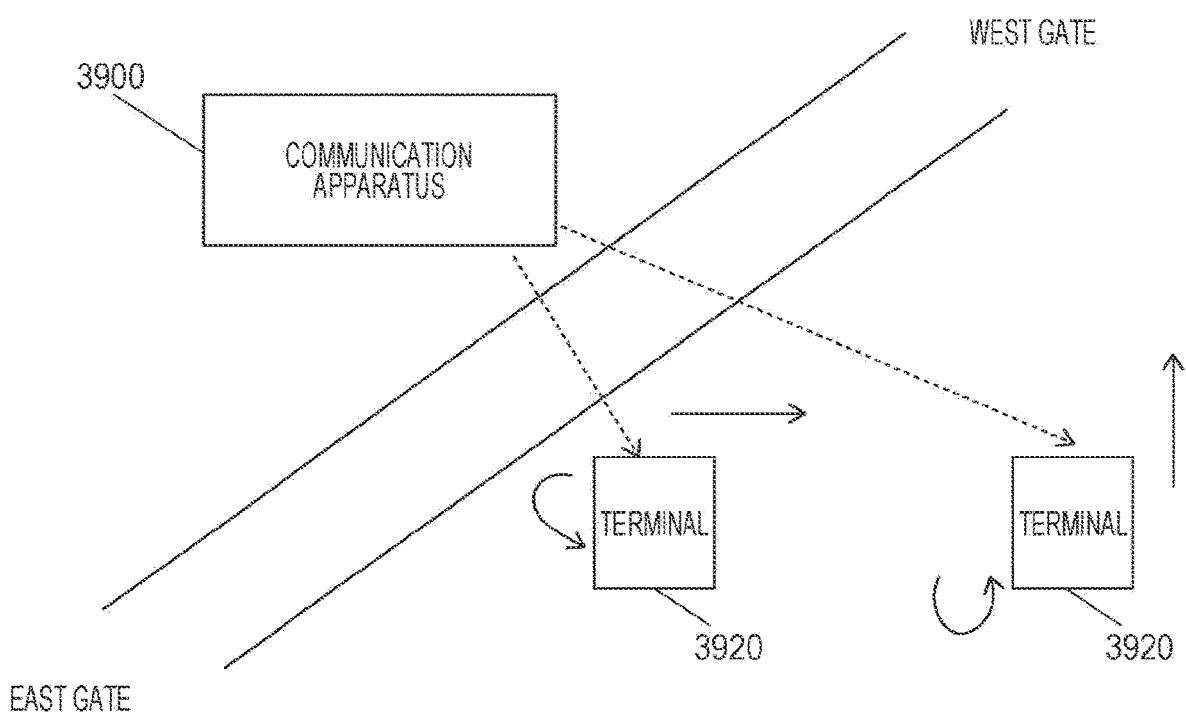
FIG. 42 is a diagram illustrating an example in which displaying is switched depending on a manner of moving a terminal according to Embodiment 10.

FIG. 42 illustrates an example in which the communication apparatus 3900 transmits, to terminals, a modulated light signal including an advertisement group related to a west gate direction of a station and an advertisement group related to an east gate direction.

In FIG. 42, the communication apparatus 3900 is installed, for example, on a road, and transmits from the illumination 3903 a modulated light signal including an advertisement group related to the west gate direction or east gate direction of the station. On the other hand, the terminals each has an acceleration sensor and/or a gyro sensor. When a terminal is moved, for example, to the right (in the direction to the west gate of the station in FIG. 42), the terminal displays information related to the west gate direction on its screen. In a case where the terminal is moved to the left (in the direction to the east gate of the station in FIG. 42), the terminal displays information related to the east gate direction on the screen. The manner of moving the terminal is not limited to these examples. For example, when the terminal is rotated left, the terminal displays information on the direction of the west gate on the screen, and when the terminal is rotated right, the terminal Information on the east gate direction may be displayed on the screen.

Thus, the communication apparatus 3900 associates data such that the advertisement group (data) related to the west gate direction of the station is associated to operation information indicating that this advertisement group is displayed when the terminal 3920 is moved in the direction to the west gate. On the other hand, the advertisement group (data) related to the east gate direction of the station is associated to operation information indicating that this advertisement group is displayed when the terminal 3920 is moved in the direction to the west gate. The terminal 3920 receives this modulated light signal, and stores advertisement information and operation information related to the west gate direction or east gate direction of the station included in the received modulated light signal.

When a pedestrian (a user) moves (for example, tilts) the terminal 3920 in the direction to the west gate of the station (to the right in FIG. 42), the terminal 3920 displays an advertisement group related to the west gate direction of the station associated with the operation information related to this operation. When a pedestrian (a user) moves (for example, tilts) the terminal 3920 in the direction to the east gate of the station (to the left in FIG. 42), the terminal 3920 displays an advertisement group related to the east gate direction of the station associated with the operation information related to this operation. The movement direction (or the tilt direction) of the terminal 3920 may be detected by the acceleration sensor and/or the gyro sensor provided on the terminal 3920.

The manner of moving the terminal 3920 is not limited to these examples. For example, a pedestrian rotates the terminal 3920 to the right, the terminal 3920 may display an advertisement group related to the west gate direction of the station. When the pedestrian rotates the terminal 3920 to the left, the terminal 3920 may display an advertisement group related to the east gate direction of the station.

Next, an example is described in which communication apparatuses 3900 are installed in a commercial facility having a plurality of floors.

In this case, a communication apparatus 3900 is installed on each floor and transmits, from an illumination 3903, a modulated light signal including advertisement groups related to upper and lower floors. To this end, the communication apparatus 3900 associates data to operation information such that an advertisement group (data) related to the upper floor is associated with operation information indicating that this advertisement group is displayed when the terminal 3920 is moved upward, while an advertisement group (data) related to the lower floor is associated with operation information indicating that this advertisement group is displayed when the terminal 3920 is moved downward. The terminal 3920 receives this modulated light signal and stores advertisement groups related to the upper floor and the lower floor included in the received modulated light signal and also stores operation information.

When a pedestrian (user) in a facility moves (for example, tilts or rotates) the terminal upward, the terminal 3920 displays, on a screen, the advertisement group related to the upper floor associated with the upward movement in the operation information. When a pedestrian (user) in the facility moves (for example, tilts or rotates) the terminal 3920 downward, the terminal 3920 may display, on the screen, the advertisement group related to the lower floor associated with the downward movement in the operation information operation.

When the terminal is rotated upward, the advertisement group related to the upper floor may be displayed on the screen, while when the terminal is rotated downward, the advertisement group related to the lower floor may be displayed on the screen.

Figure 43:
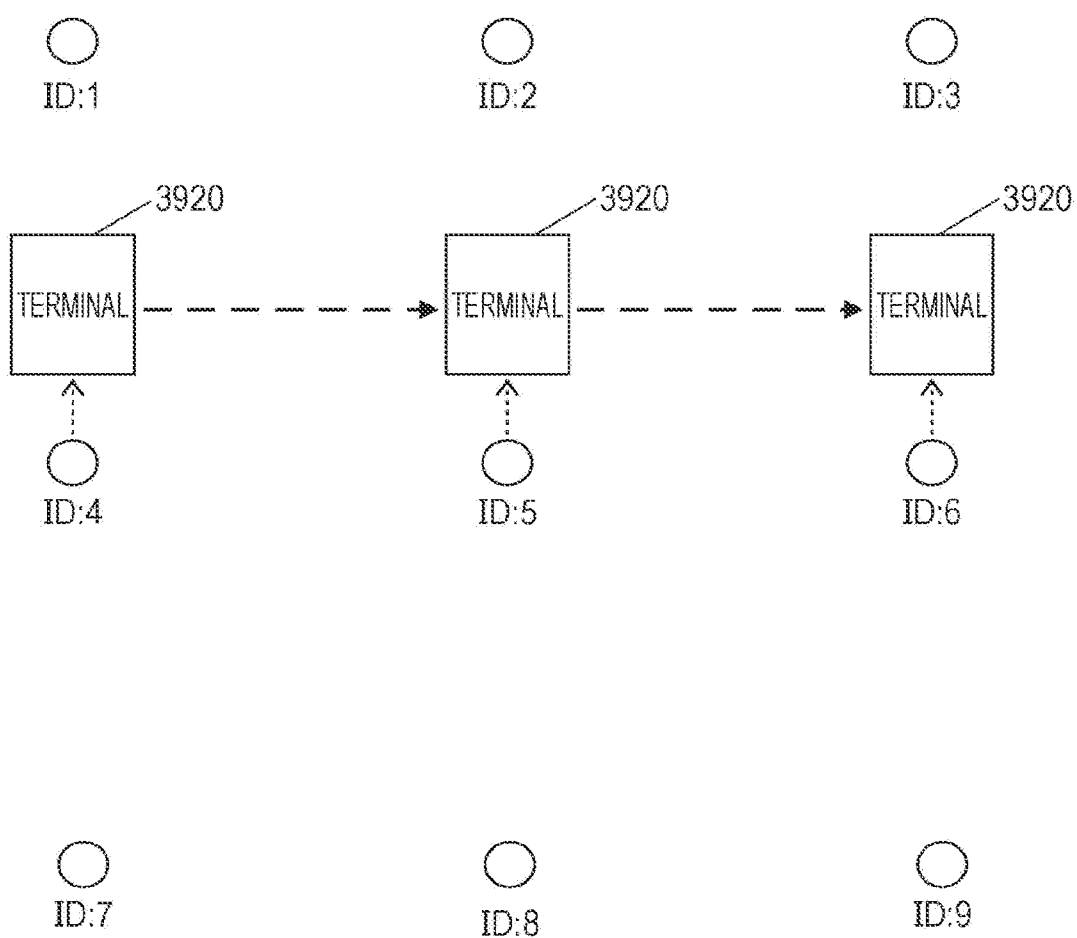
FIG. 43 is a diagram illustrating an example in which a movement direction of a terminal is estimated according to Embodiment 10.

FIG. 43 is a diagram illustrating an example in which a plurality of illuminations 3903 are arranged side by side.

In FIG. 43, a plurality of illuminations 3903 are prepared, and each illumination 3903 is assigned an ID (identification). The terminal 3920 detects IDs of two or more illuminations 3903 thereby recognizing a direction (a traveling direction) in which the terminal 3920 is moving. For example, when ID4 and ID6 are detected, it is determined that the terminal is moving in a rightward direction. Alternatively, from an image captured by an image sensor, the terminal 3920 may detect the direction (traveling direction) in which the terminal itself is moving.

In FIG. 43, an ID is assigned to each of the plurality of illuminations 3903. The communication apparatus 3900 transmits, from the illumination 3903, data including the ID of the illumination 3903. When the terminal 3920 receives data from the illumination 3903, the terminal 3920 identifies the ID of the illumination 3903 that is the transmission source of the data.

The terminal 3920 estimates the movement direction of the terminal 3920 based on the reception order of the IDs of the at least two illuminations 3903. For example, in FIG. 43, when the terminal receives IDs of illuminations 3903 in the order of ID4, ID5, and ID6, the terminal 3920 estimates that the terminal 3920 is moving in a direction from ID4 (left) to ID6 (right). Note that the terminal 3920 may capture light from illuminations 3903 by an image sensor, and may recognize the traveling direction of the terminal 3920 based on the image captured by the image sensor.

In the present embodiment, the communication apparatus 3900 transmits data associated with operation information including information on the movement operation of terminal 3920 that causes the data to be displayed. On the terminal 3920, data associated with the movement operation of the terminal 3920 is selected from a plurality of pieces of data and is displayed. Thus, the user can cause the terminal 3920 to display appropriate data only by moving (for example, tilting or rotating) the terminal 3920.

As a matter of course, a plurality of embodiments disclosed in the present description and/or other elements may be combined in implementation. That is, the contents of the above-described embodiments may be arbitrarily combined. In Embodiments 8 to 10 described above, it is assumed by way of example that the communication apparatus 3900 transmits data to terminals using a light wave (modulated light signal). However, instead of the light wave (modulated light signal), a radio wave may be used in transmission of data to terminals. The operations of the terminal disclosed in Embodiments 8 to 10 may be realized as operations of an application program installed in the terminal.

In Embodiment 8 and following Embodiments, it is assumed by way of example that the communication apparatus 3900 is installed in a train and a terminal communicates with this communication apparatus 3900. However, these embodiments may also be implemented in a case where a communication apparatus is installed in a vehicle such as a bus, an aircraft, or the like and a terminal communicates with the communication apparatus 3900. The communication apparatus 3900 may transmit information including time information in addition to location information such that the terminal is allowed to obtain the location information and the time information via communication with the communication apparatus 3900.

In Embodiment 8 and following Embodiments, instead of transmitting information using a modulated light signal, the information may be transmitted using a radio wave.

In FIG. 32, FIG. 36, FIG. 40, and FIG. 41, the communication apparatus 3900 may include a not-shown interface for updating data in the data selection unit 3901. That is, the data selection unit 3901 shown in FIG. 32, FIG. 36, FIG. 40, FIG. 41 or elsewhere may communicate with another device or a server to update data.

Note that the embodiments are described only to illustrate examples. For example, "modulation schemes, error correction coding schemes (error correction code used, code length, coding rate, etc.), control information and/or the like" may be replaced by other "modulation schemes, error correction coding schemes (error correction code used, code length, coding rate, etc.), control information and/or the like.

It is assumed in the description by way of example that information is advertisement information. However, the advertisement information may be information related to an application installed on a terminal and operated thereon. The advertisement information may be information on a URL from which it is allowed to obtain an application to be installed on the terminal and operated thereon.

In the above description, explanations are made by way of example for the case where the communication apparatus transmits information related to an advertisement. Hereinafter, examples are described in which information other than advertisements is transmitted.

In a situation in the communication apparatus 3900 is installed on a train, the communication apparatus 3900 may transmit information related to a map of a platform of a station existing in the direction in which the train is traveling (for example, Shinagawa Station and other stations beyond at which the train will stop, in a case where the train is traveling to Shinagawa Station after leaving Shin-Yokohama Station). The information related to the map may be information indicating the map itself, or information on a URL related to the map. Information on a map of a platform may include information related to a ticket gate and information related to nearby facilities and buildings. In a case where the communication apparatus is installed on an airplane, the communication apparatus 3900 may transmit information on a map of an airport the airplane is approaching. The information related to the map may be information indicating the map itself, or information on a URL related to the map.

In a case where the communication apparatus 3900 is installed on a bus, the communication apparatus 3900 may transmit a modulated light signal inside the bus or may transmit outside the bus. In the case where the modulated light signal is transmitted to the outside of the bus, the transmitted modulated light signal may include information on a destination of the bus and bus stops at which the bus will stop. In this case, the information may not include information on bus stops that the bus already left.

Similarly, in a case where the communication apparatus 3900 is installed on a train, the communication apparatus 3900 may transmit a modulated light signal inside the train or outside the train. In the case where the modulated light signal is transmitted to the outside of the train, the transmitted modulated light signal may include information on a destination of the train and stations at which the train will stop. In this case, the information may not include information on stations that the train already left.

When a terminal obtains information from the communication apparatus 3900 and an image (a still image, a moving image) via an image sensor, the terminal may store them, for example, in a memory (storage unit) disposed on the terminal such that a user using the terminal is allowed to read the stored information as needed, which provides improved convenience to the user. In this case, the communication apparatus 3900 does not necessarily need to be implemented in a vehicle such as a train, a bus, an airplane, or the like.

Note that the information obtained from the communication apparatus 3900 may be displayed on a display disposed on the terminal such that the information is superimposed on an image, or the information obtained from the communication apparatus 3900 may be displayed separately (without overlapping) from the image.

When information, such as information about disasters, information about operations, or the like, occurs that needs to be broadcast urgently, the communication apparatus 3900 may stop the distribution of information related to advertisements, and may distribute the information itself that needs to be broadcast urgently, or information on a URL of a server that provides the information that needs to be broadcast urgently. Alternatively, without stopping the distribution of the information related to the advertisements, the information itself that needs to be urgently distributed or the information on the URL of the server that provides the information that needs to be urgently distributed may be distributed.

Embodiment 11

Embodiment 11 discloses a method of updating data of the data selection unit 3901 in the communication apparatus 3900 shown in FIG. 32, FIG. 36, FIG. 40, FIG. 41, or elsewhere.

Figure 44:
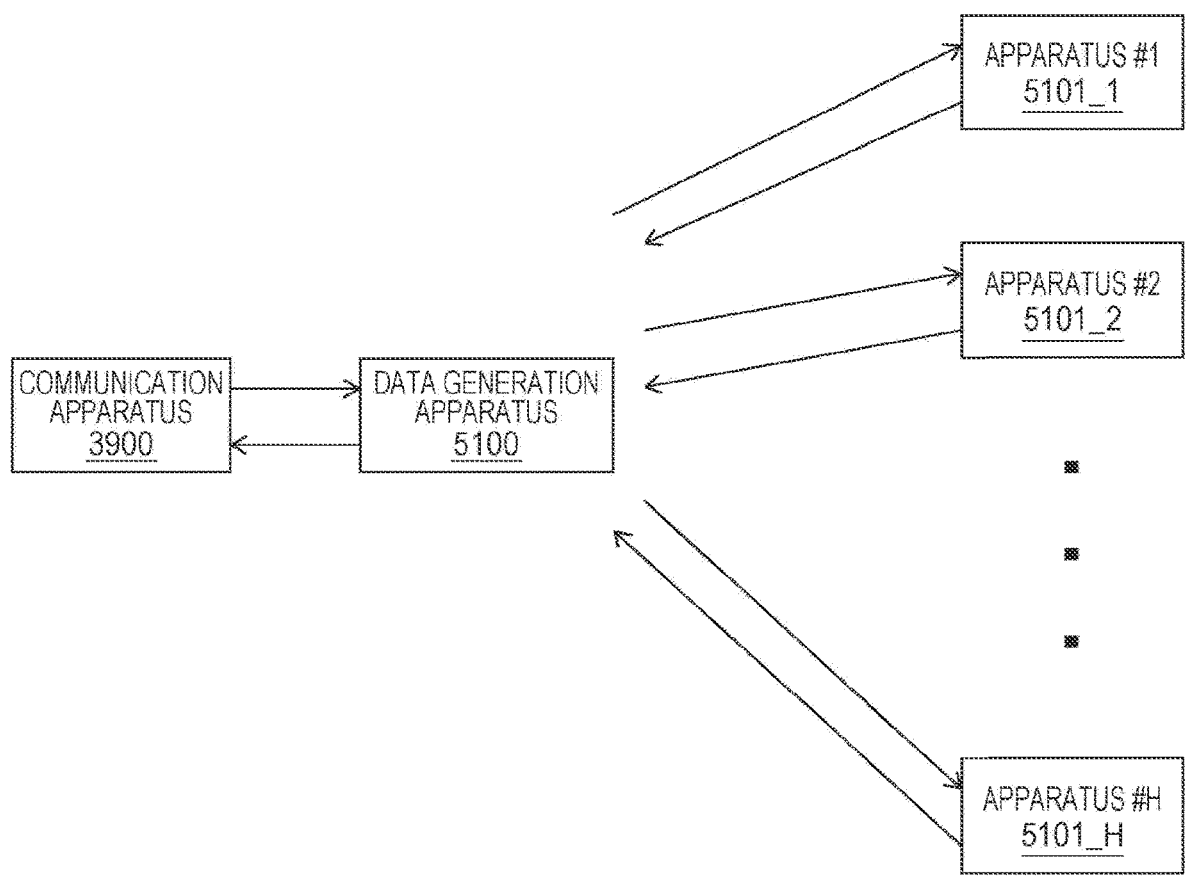
FIG. 44 is a diagram illustrating an example of an apparatus connection related to a method of updating data according to Embodiment 11.

FIG. 44 illustrates an example of a manner of connecting apparatuses in the data update method. The communication apparatus 3900 communicates with a data generation apparatus 5100, which allows the data selection unit 3901 disposed in the communication apparatus 3900 to acquire data generated by the data generation apparatus 5100 thereby updating information such as an advertisement or the like to be delivered to terminals.

The data generation apparatus 5100 also communicates with an apparatus #k (5101_k) in addition to the communication apparatus 3900 where k is an integer in a range from 1 to N (inclusive). Herein H is an integer greater than or equal to 2. In this situation, the apparatus #k (5101_k) transmits, to the data generation apparatus 5100, information such as a specific content of the advertisement, information on a place/section where the advertisement is delivered, a bid price, or the like.

FIG. 45 shows an example of a bid status of an advertisement generated by the data generation apparatus 5100 in FIG. 44. For example, the apparatus #k (5101_k) in FIG. 44 obtains the information such as that described in FIG. 45, and displays the acquired information on a display of the apparatus #k (5101_k) such that a user (who is a candidate of an advertiser) of the apparatus #k (5101_k) can get to know the information.

FIG. 45 illustrates an example of a bid status of an advertisement transmitted in a train running from Shin-Yokohama Station to Shinagawa Station and further to Tokyo Station in a section from Yokohama Station to Shinagawa Station as shown in FIG. 33, 35, 37, or 39. In FIG. 45, a horizontal axis represents places.

For example, in a region 5200 in FIG. 45, a request for distributing an advertisement #A is offered from a certain apparatus (a certain user). In this region, it has not yet been decided to distribute the advertisement #A, and thus another apparatus (user) is allowed to further bid on another advertisement. Note that the region 5200 is a region for indicating information related to an advertisement to be delivered in a section from Shin-Yokohama Station to a point #2. In this regard, a description has already been given in other embodiments, and thus a further detailed explanation is omitted.

In a region 5201 in FIG. 45, a request for distributing an advertisement #D is offered from a certain apparatus (a certain user), and it has already been decided to distribute the advertisement #D. Note that the region 5201 is a region for indicating information related to an advertisement to be delivered in a section from a point #2 to Shinagawa Station. In this regard, a description has already been given in other embodiments, and thus a further detailed explanation is omitted.

In a region 5202 in FIG. 45, a request for distributing an advertisement #B is offered from a certain apparatus (a certain user). In this region, it has not yet been decided to distribute the advertisement #B, and thus another apparatus (user) is allowed to further bid on another advertisement. Note that the region 5202 is a region for indicating information related to an advertisement to be delivered in a section from Shin-Yokohama Station to a point #3. In this regard, a description has already been given in other embodiments, and thus a further detailed explanation is omitted.

In a region 5203 in FIG. 45, no request for distributing an advertisement is offered from any apparatus (any user), and thus it is allowed to bid on an advertisement distribution. Note that the region 5203 is a region for indicating information related to an advertisement to be delivered in a section from the point #3 to Shinagawa Station. In this regard, a description has already been given in other embodiments, and thus a further detailed explanation is omitted.

In a region 5204 in FIG. 45, a request for distributing an advertisement #C is offered from a certain apparatus (a certain user). In this region, it has already been decided to distribute an advertisement #D, and thus a further bid on an advertisement by any apparatus (any user) is not allowed. Note that the region 5204 is a region for indicating information related to an advertisement to be delivered in a section from Shin-Yokohama Station to the point #1. In this regard, a description has already been given in other embodiments, and thus a further detailed explanation is omitted.

In a region 5205 in FIG. 45, no request for distributing an advertisement is offered from any apparatus (any user), and thus it is allowed to bid on an advertisement distribution. Note that the region 5205 is a region for indicating information related to an advertisement to be delivered in a section from the point #1 to Shinagawa Station. In this regard, a description has already been given in other embodiments, and thus a further detailed explanation is omitted.

In a region 5206 in FIG. 45, no request for distributing an advertisement is offered from any apparatus (any user), and thus it is allowed to bid on an advertisement distribution. Note that the region 5206 is a region for indicating information related to an advertisement to be delivered in a section from Shin-Yokohama Station to Shinagawa Station. In this regard, a description has already been given in other embodiments, and thus a further detailed explanation is omitted.

In a region 5207 in FIG. 45, no request for distributing an advertisement is offered from any apparatus (any user), and thus it is allowed to bid on an advertisement distribution. Note that the region 5207 is a region for indicating information related to an advertisement to be delivered in a section from Shin-Yokohama Station to Shinagawa Station. In this regard, a description has already been given in other embodiments, and thus a further detailed explanation is omitted.

An apparatus #k (5101_k) in FIG. 44 acquires information on the status shown in FIG. 45 from the data generation apparatus 5100. Taking into consideration the status, the apparatus #k (5101_k) offers a request for an advertisement distribution and bids on it. When placing the bid, the apparatus #k (5101_k) provides a content of the advertisement to the data generation apparatus 5100.

In response, the data generation apparatus 5100 may have a function of checking appropriateness of the content of the advertisement provided by the apparatus #k (5101_k). For example, in the case of FIG. 45, an advertisement related to Shin-Yokohama Station and nearby locations and an advertisement related to an already passed station before Shin-Yokohama Station are not suitable as advertisements. The data generation apparatus 5100 may have a function of checking whether the advertisement is such an advertisement. When the advertisement is determined to be an inappropriate advertisement, it will not be provided to the communication apparatus 3900.

In the data generation apparatus 5100 of FIG. 44, when bidding for advertisements is completed, the data possessed by the data selection unit 3901 of the communication apparatus 3900 is updated. For example, the data is updated as described below in "Example 7" or "Example 8".

Example 7

When the data selection unit 3901 in the communication apparatus 3900 has advertisements themselves, terminals obtain the updated advertisements based on the updated data.

Example 8

It is assumed that when the data selection unit 3901 of the communication apparatus 3900 acquires, for example, URL information of a server providing an advertisement, the data generation apparatus 5100 also has a function as a content server. In this case, the terminal is directed to the data generation apparatus 5100 via the communication with the communication apparatus 3900, and receives an advertisement from the data generation apparatus 5100. Note that in a case where the data generation apparatus 5100 does not have the function of the content server, and another server has and provides the content of the advertisement, the terminal obtains the updated advertisement from this server.

The bid status of advertisements in FIG. 45 is merely an example. For example, bids on advertisements may be placed for other train sections. A bid for an advertisement may be made for each hour or time.

Figure 46:
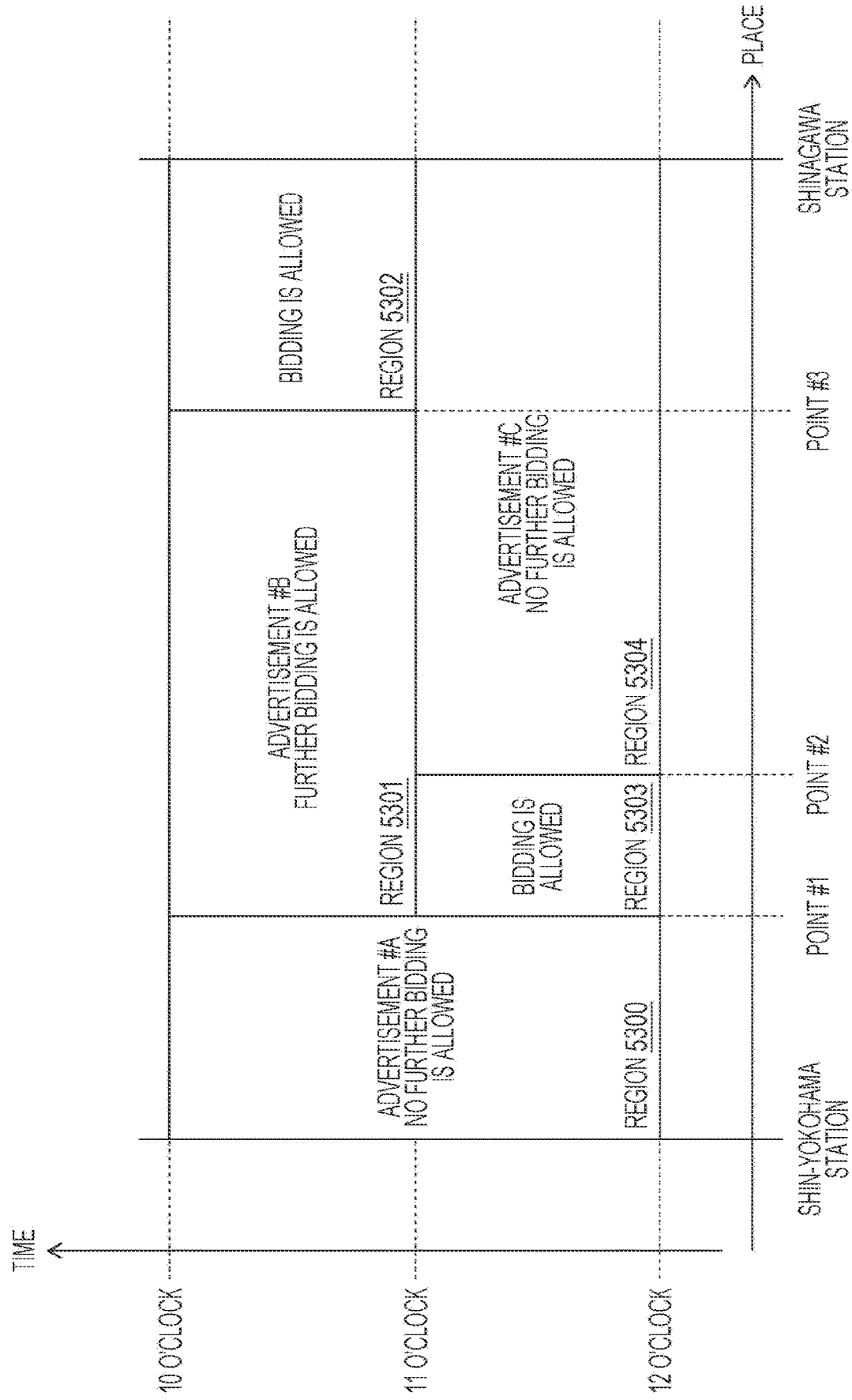
FIG. 46 is a diagram illustrating an example of an advertisement bid situation according to Embodiment 11.

This point will be described below with reference to FIG. 46. FIG. 46 shows an example of a bid status of advertisements generated by the data generation apparatus 5100 shown in FIG. 44. For example, the apparatus #k (5101_k) in FIG. 44 obtains the information such as that described in FIG. 46, and displays the acquired information on a display of the apparatus #k (5101_k) such that a user (who is a candidate of an advertiser) of the apparatus #k (5101_k) can get to know the information.

FIG. 46 illustrates an example of a bid status of an advertisement transmitted in a train running from Shin-Yokohama Station to Shinagawa Station and further to Tokyo Station in a section from Yokohama Station to Shinagawa Station as shown in FIG. 33, 35, 37, or 39. In FIG. 45, a horizontal axis represents places, and a vertical axis represents time.

For example, in a region 5300 in FIG. 46, a request for distributing an advertisement #A is offered from a certain apparatus (a certain user), and it has already been decided to distribute the advertisement #A. Note that the region 5300 is a region for indicating information related to an advertisement to be delivered in a section from Shin-Yokohama Station to the point #1 and in a time zone from 10 o'clock to 12 o'clock. In this regard, a description has already been given in other embodiments, and thus a further detailed explanation is omitted.

In a region 5301 in FIG. 46, a request for distributing an advertisement #B is offered from a certain apparatus (a certain user). In this region, it has not yet been decided to distribute the advertisement #B, and thus another apparatus (user) is allowed to further bid on another advertisement. Note that the region 5301 is a region for indicating information related to an advertisement to be delivered in a section from the point #1 to the point #3 and in a time zone from 10 o'clock to 11 o'clock. In this regard, a description has already been given in other embodiments, and thus a further detailed explanation is omitted.

In a region 5302 in FIG. 46, no request for distributing an advertisement is offered from any apparatus (any user), and thus it is allowed to bid on an advertisement distribution. Note that the region 5302 is a region for indicating information related to an advertisement to be delivered in a section from the point #3 to Shinagawa Station and in a time zone from 10 o'clock to 11 o'clock. In this regard, a description has already been given in other embodiments, and thus a further detailed explanation is omitted.

In a region 5303 in FIG. 46, no request for distributing an advertisement is offered from any apparatus (any user), and thus it is allowed to bid on an advertisement distribution. Note that the region 5303 is a region for indicating information related to an advertisement to be delivered in a section from the point #1 to the point #2 and in a time zone from 11 o'clock to 12 o'clock. In this regard, a description has already been given in other embodiments, and thus a further detailed explanation is omitted.

In a region 5304 in FIG. 46, a request for distributing an advertisement #C is offered from a certain apparatus (a certain user), and it has already been decided to distribute the advertisement #C. Note that the region 5304 is a region for indicating information related to an advertisement to be delivered in the section from the point #2 to Shinagawa Station and in the time zone from 11 o'clock to 12 o'clock. In this regard, a description has already been given in other embodiments, and thus a further detailed explanation is omitted.

An apparatus #k (5101_k) in FIG. 44 acquires information on the status shown in FIG. 46 from the data generation apparatus 5100. Taking into consideration the status, the apparatus #k (5101_k) offers a request for an advertisement distribution and bids on it. When placing the bid, the apparatus #k (5101_k) provides a content of the advertisement to the data generation apparatus 5100.

In response, the data generation apparatus 5100 may have a function of checking appropriateness of the content of the advertisement provided by the apparatus #k (5101_k). For example, in the case of FIG. 46, an advertisement related to Shin-Yokohama Station and nearby locations and an advertisement related to an already passed station before Shin-Yokohama Station are not suitable as advertisements. The data generation apparatus 5100 may have a function of checking whether the advertisement is such an advertisement. When the advertisement is determined to be an inappropriate advertisement, it will not be provided to the communication apparatus 3900.

In the data generation apparatus 5100 of FIG. 44, when bidding for advertisements is completed, the data possessed by the data selection unit 3901 of the communication apparatus 3900 is updated. Examples of updating have already been described in "Example 7" and "Example 8".

Note that the status of bids on advertisements shown in FIG. 46 is merely an example. For example, bids on advertisements may be placed for other train sections, or bids on advertisements for other train sections may be placed. In FIG. 46, each area indicates information related to a bid for one advertisement, bids may be made for a plurality of advertisements by a plurality of apparatuses (that is, a plurality of advertisements may be delivered in the region).

By generating advertisement data in the above-described manner, it becomes possible for terminals to receive more valuable data.

In the present description, the "illumination" or the "light source" may be a display that is emitting light to display an image, a moving image, an advertisement, and/or the like and a modulated light signal may be included in the light. That is, the "illumination" or the "light source" may have a function in addition to the function of emitting light. The "illumination" or the "light source" may include a plurality of "lightings" or "light sources".

The transmission method used by the communication apparatus in generating a modulated light signal and emits light may be a method other than the transmission method described in the present description. The modulated light signal may include information other than information described in the present description.

Embodiment 12

Embodiment 12 discloses modifications of Embodiment 8, Embodiment 9, Embodiment 10, and Embodiment 11. In particular, the present embodiment described below is related to an application of visible light communication to a "pedestrian", a "communication apparatus possessed by a pedestrian", and a "communication apparatus installed on a car (or a vehicle, or the like)".

Figure 47:
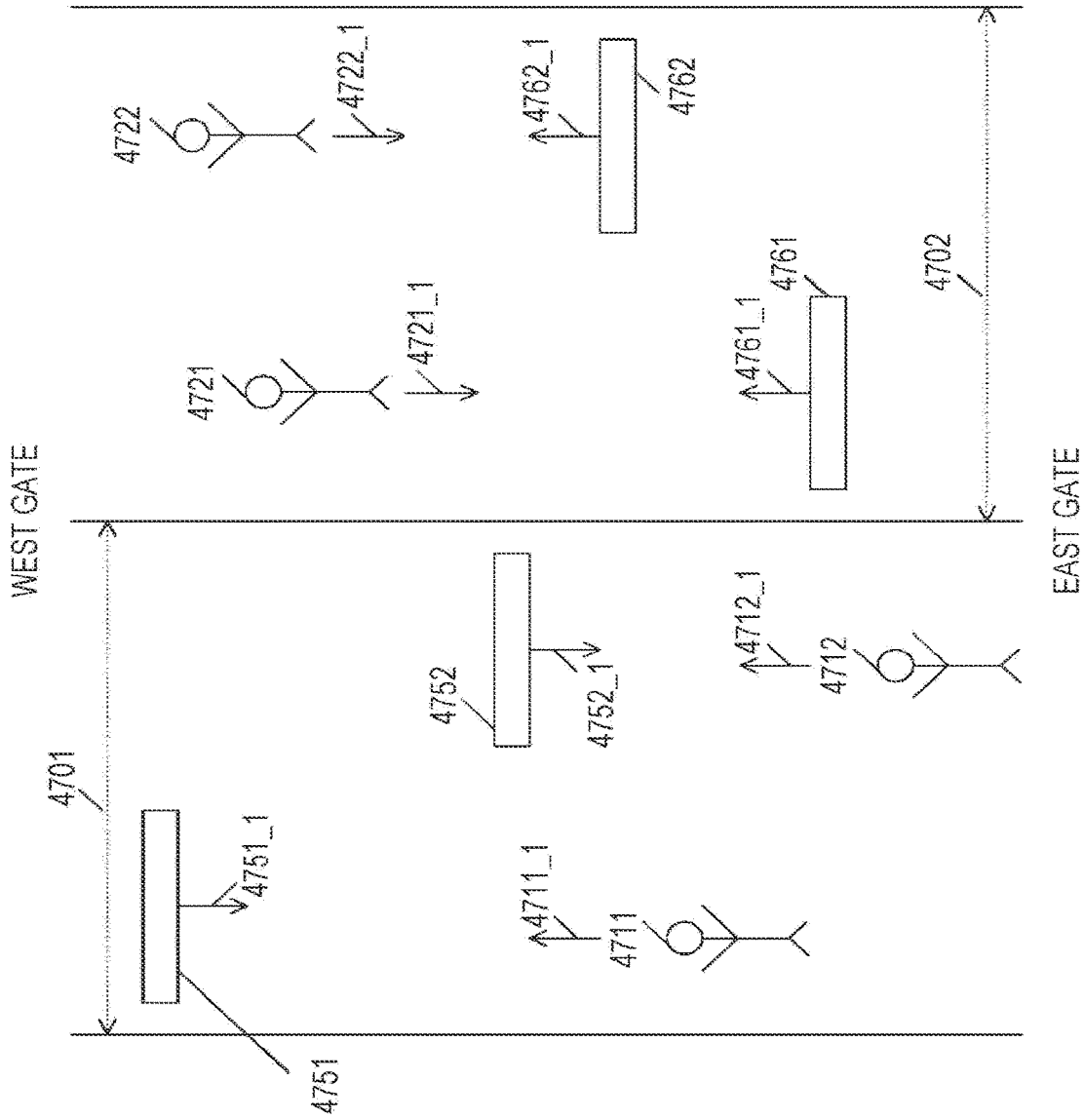
FIG. 47 is a diagram illustrating an example of a positional situation of monitors and persons each having a communication apparatus according to Embodiment 12.

FIG. 47 illustrates an example of a state of "person having a communication apparatus" and "monitor configured to display at least an image/moving image" according to the present embodiment. The "monitor" may include a speaker configured to output an audio signal (a sound).

In FIG. 47, it is assumed that the "west gate" of the station is located on the upper side of FIG. 47 while the "east gate" of the station is located on the lower side of FIG. 47. It is assumed that a "person 4711 having a communication apparatus" is moving in a direction indicated by an arrow 4711_1, that is, he/she moving toward the west gate. It is also assumed that a "person 4712 having a communication apparatus" is moving in a direction indicated by an arrow 4712_1, that is, he/she is moving toward the west gate. It is assumed that a monitor 4751 faces in a direction indicated by an arrow 4751_1 and displays an "image/moving image". Furthermore, the monitor 4751 may transmit a modulated light signal. Note that the modulated light signal may be emitted from a screen of the monitor displaying the image/moving image, or the monitor may include a light emitting unit for transmitting the modulated light signal.

Similarly, it is assumed that a monitor 4752 faces in a direction indicated by an arrow 4752_1 and displays an "image/moving image". Furthermore, the monitor 4752 may transmit a modulated light signal. Note that the modulated light signal may be emitted from a screen of the monitor displaying the image/moving image, or the monitor may include a light emitting unit for transmitting the modulated light signal.

In this situation, the monitors 4751 and 4752 are monitors to be viewed by the "person 4711 having the communication apparatus" and the "person 4712 having the communication apparatus", respectively. In this case, the "person 4711 having his/her own communication apparatus" and the "person 4712 having his/her own communication apparatus" are moving toward the west gate, and thus it is desirable that information or an advertisement displayed by these "monitors 4751 and 4752" is useful for the persons.

Therefore, the "monitors 4751 and 4752" may display an image/moving image of "useful information or an advertisement related to something in the direction to the west gate. Furthermore, the "monitors 4751 and 4752" may transmit modulated light signal including an image/moving image of "useful information or an advertisement related to something in the direction to the west gate. This makes it possible to provide effective information to "persons (users) having a communication apparatus".

It is assumed that a "person 4721 having a communication apparatus" is moving in a direction indicated by an arrow 4721_1, that is, he/she is moving toward the east gate. Similarly, it is assumed that a "person 4722 having a communication apparatus" is moving in a direction indicated by an arrow 4722_1, that is, he/she is moving toward the east gate.

It is assumed that a monitor 4761 faces in a direction indicated by an arrow 4761_1 and displays an "image/moving image". Furthermore, the monitor 4761 may transmit a modulated light signal. Note that the modulated light signal may be emitted from a screen of the monitor displaying the image/moving image, or the monitor may include a light emitting unit for transmitting the modulated light signal.

Similarly, it is assumed that a monitor 4762 faces in a direction indicated by an arrow 4762_1 and displays an "image/moving image". Furthermore, the monitor 4762 may transmit a modulated light signal. Note that the modulated light signal may be emitted from a screen of the monitor displaying the image/moving image, or the monitor may include a light emitting unit for transmitting the modulated light signal.

In this situation, the monitors 4761 and 4762 are monitors to be viewed by the "person 4721 having the communication apparatus" and the "person 4722 having the communication apparatus", respectively. In this case, the "person 4721 having the communication apparatus" and the "person 4722 having the communication apparatus" are moving toward the east gate, and thus it is desirable that information or an advertisement displayed by these "monitors 4761 and 4762" is useful for these persons.

Therefore, the "monitors 4761 and 4762" may display an image/moving image of "useful information or an advertisement related to something in the direction to the east gate. Furthermore, the "monitors 4761 and 4762" may transmit modulated light signal including an image/moving image of "useful information or an advertisement related to something in the direction to the east gate. This makes it possible to provide effective information to "persons (users) having a communication apparatus".

As described above, by providing information by monitors such that the provided information is different depending on the moving direction, it is possible to provide information useful for users.

A "moving walkway" 4701 capable of moving in a direction indicated by an arrow 4711_1 or 4712_1 may be provided. A "moving walkway" 4702 capable of moving in a direction indicated by an arrow 4721_1 or 4722_1 may be provided. Also, in this case, useful information may be provided to a "person (user) having a communication apparatus.

In FIG. 47, the directivity of the light of the modulated light signal emitted by each of the "monitors 4751 and 4752" is opposite to the directivity of the light of the modulated light signal emitted by each of the "monitors 4761 and 4762". This results in a reduction in a possibility that interfering light rays are received by a reception apparatus that receives a modulated light signal, which results in an improvement in data reception quality.

Figure 48:
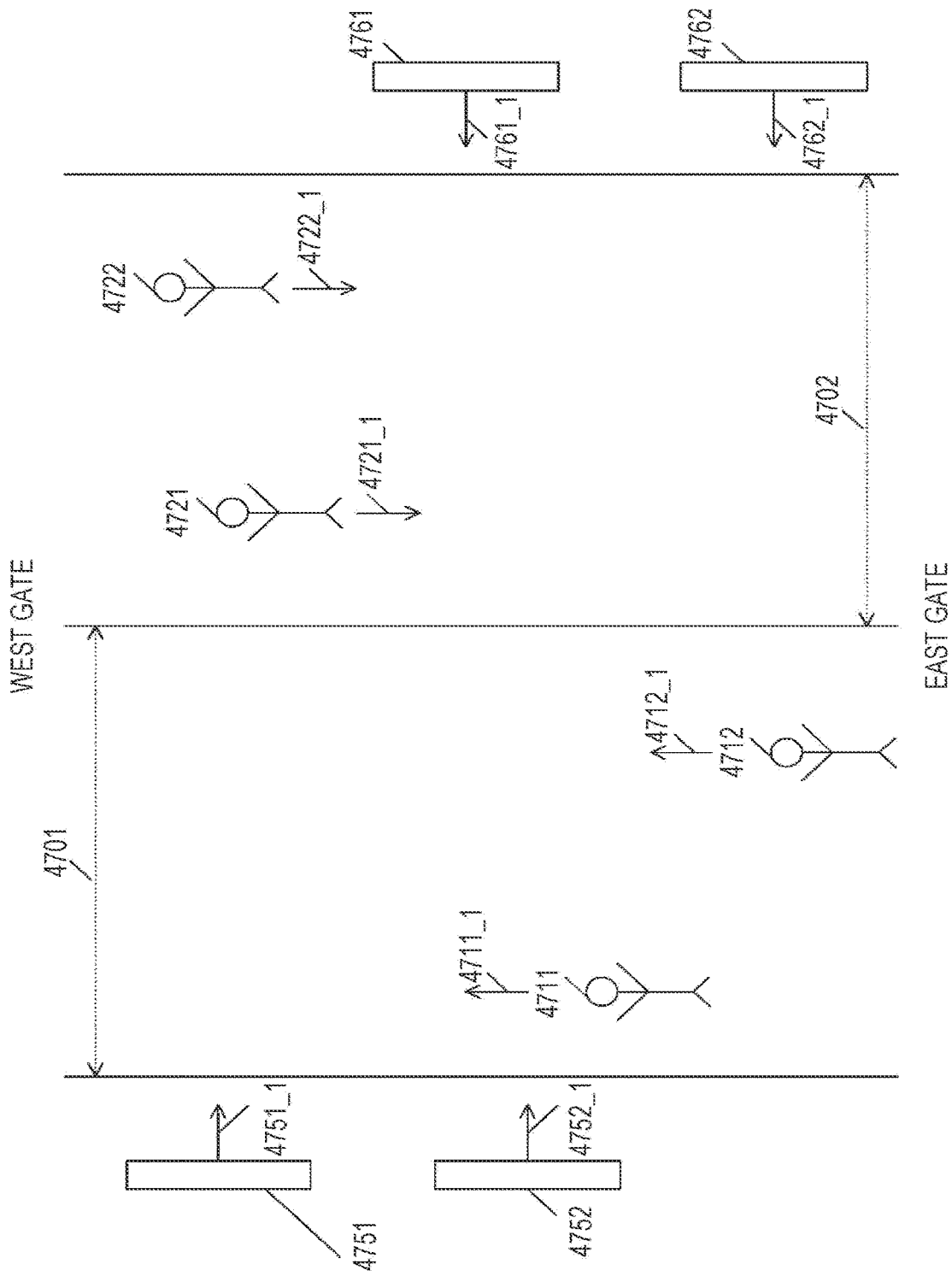
FIG. 48 is a diagram illustrating another example of a positional situation of monitors and persons each having a communication apparatus according to Embodiment 12.

FIG. 48 illustrates an example, different from the example in FIG. 47, of a state of "person having a communication apparatus" and "monitor configured to display at least an image/moving image" according to the present embodiment. The "monitor" may include a speaker configured to output an audio signal (a sound). In the following description, it is assumed that the "monitor" includes a speaker configured to output an audio signal (a sound), and elements similar in operation to those shown in FIG. 47 are denoted by similar reference numerals.

In FIG. 48, it is assumed that the "west gate" of the station is located on the upper side of FIG. 48 while the "east gate" of the station is located on the lower side of FIG. 48. It is assumed that a "person 4711 having a communication apparatus" is moving in a direction indicated by an arrow 4711_1, that is, he/she is moving toward the west gate. It is also assumed that a "person 4712 having a communication apparatus" is moving in a direction indicated by an arrow 4712_1, that is, he/she is moving toward the west gate.

It is assumed that a monitor 4751 faces in a direction indicated by an arrow 4751_1 and displays an "image/moving image". Furthermore, the monitor 4751 may transmit a modulated light signal. Note that the modulated light signal may be emitted from a screen of the monitor displaying the image/moving image, or the monitor may include a light emitting unit for transmitting the modulated light signal.

Similarly, it is assumed that a monitor 4752 faces in a direction indicated by an arrow 4752_1 and displays an "image/moving image". Furthermore, the monitor 4752 may transmit a modulated light signal. Note that the modulated light signal may be emitted from a screen of the monitor displaying the image/moving image, or the monitor may include a light emitting unit for transmitting the modulated light signal.

In this situation, the monitors 4751 and 4752 are monitors to be viewed by the "person 4711 having the communication apparatus" and the "person 4712 having the communication apparatus", respectively. In this case, the "person 4711 having the communication apparatus" and the "person 4712 having the communication apparatus" are moving toward the west gate, and thus it is desirable that information or an advertisement displayed by these "monitors 4751 and 4752" is useful for the persons.

Therefore, the "monitors 4751 and 4752" may display an image/moving image of "useful information or an advertisement related to something in the direction to the west gate. Furthermore, the "monitors 4751 and 4752" may transmit modulated light signal including an image/moving image of "useful information or an advertisement related to something in the direction to the west gate. This makes it possible to provide effective information to "persons (users) having a communication apparatus".

It is assumed that a "person 4721 having a communication apparatus" is moving in a direction indicated by an arrow 4721_1, that is, he/she is moving toward the east gate.

Similarly, it is assumed that a "person 4722 having a communication apparatus" is moving in a direction indicated by an arrow 4722_1, that is, he/she is moving toward the east gate.

It is assumed that a monitor 4761 faces in a direction indicated by an arrow 4761_1 and displays an "image/moving image". Furthermore, the monitor 4761 may transmit a modulated light signal. Note that the modulated light signal may be emitted from a screen of the monitor displaying the image/moving image, or the monitor may include a light emitting unit for transmitting the modulated light signal.

Similarly, it is assumed that a monitor 4762 faces in a direction indicated by an arrow 4762_1 and displays an "image/moving image". Furthermore, the monitor 4762 may transmit a modulated light signal. Note that the modulated light signal may be emitted from a screen of the monitor displaying the image/moving image, or the monitor may include a light emitting unit for transmitting the modulated light signal.

In this situation, the monitors 4761 and 4762 are monitors to be viewed by the "person 4721 having the communication apparatus" and the "person 4722 having the communication apparatus", respectively. In this case, the "person 4721 having the communication apparatus" and the "person 4722 having the communication apparatus" are moving toward the east gate, and thus it is desirable that information or an advertisement displayed by these "monitors 4761 and 4762" is useful for these persons.

Therefore, the "monitors 4761 and 4762" may display an image/moving image of "useful information or an advertisement related to something in the direction to the east gate. Furthermore, the "monitors 4761 and 4762" may transmit modulated light signal including an image/moving image of "useful information or an advertisement related to something in the direction to the east gate.

This makes it possible to provide effective information to "persons (users) having a communication apparatus".

As described above, by providing information by monitors such that the provided information is different depending on the moving direction, it is possible to provide useful information useful.

A "moving walkway" 4701 capable of moving in a direction indicated by an arrow 4711_1 or 4712_1 may be provided. A "moving walkway" 4702 capable of moving in a direction indicated by an arrow 4721_1 or 4722_1 may be provided. This has a feature that a monitor that provides a moving image/image related to information/advertisement and/or information is located adjacent to the moving walkway. This provides a more appropriate manner of providing effective information to "persons (users) having a communication apparatus".

In FIG. 48, the directivity of the light of the modulated light signal emitted by each of the "monitors 4751 and 4752" is opposite to the directivity of the light of the modulated light signal emitted by each of the "monitors 4761 and 4762". This results in a reduction in a possibility that interfering light rays are received by a reception apparatus that receives a modulated light signal, which results in an improvement in data reception quality.

Present embodiment has been described above using names "west gate" and "east gate". But the terms "west gate" and "east gate" are merely examples, but the terms are not limited to these examples. The embodiment may be similarly implemented also for a case where two or more different areas are respectively denoted as, for example, "area A" and "area B" instead of "west gate" and "east gate". In another example of an implementation of the embodiment, a plurality of areas including "area #1, area #2, . . . area #N (where N is an integer greater than or equal to 2)" may be treated instead of "west gate", and a plurality of areas including "area $1, area $2, . . . area $M (where M is an integer greater than or equal to 2)" may be treated instead of "east gate", This holds in Embodiment 10 and other Embodiments.

Note that the "monitors 4751 and 4752" in FIGS. 47 and 48 may treat information related to the east gate and an advertisement expressed in an image or a moving image. Similarly, the "monitors 4761 and 4762" in FIGS. 47 and 48 may treat information related to the west gate and an advertisement expressed in an image or a moving image.

Furthermore, alternative examples of methods may be possible. For example, let it be assumed by way of example that another railway station exists at the east gate. In this case, information and/or an advertisement related to an east gate area such as information and/or an advertisement related to a railway destination area may be treated according to the present embodiment.

In FIG. 47 and FIG. 48, in an alternative implementation of the present embodiment, "persons 4711, 4712, 4721, and 4722 having a communication apparatus" may be replaced by "vehicles equipped with a communication apparatus", or "car equipped with a communication apparatus".

Embodiment 13

Figure 49:
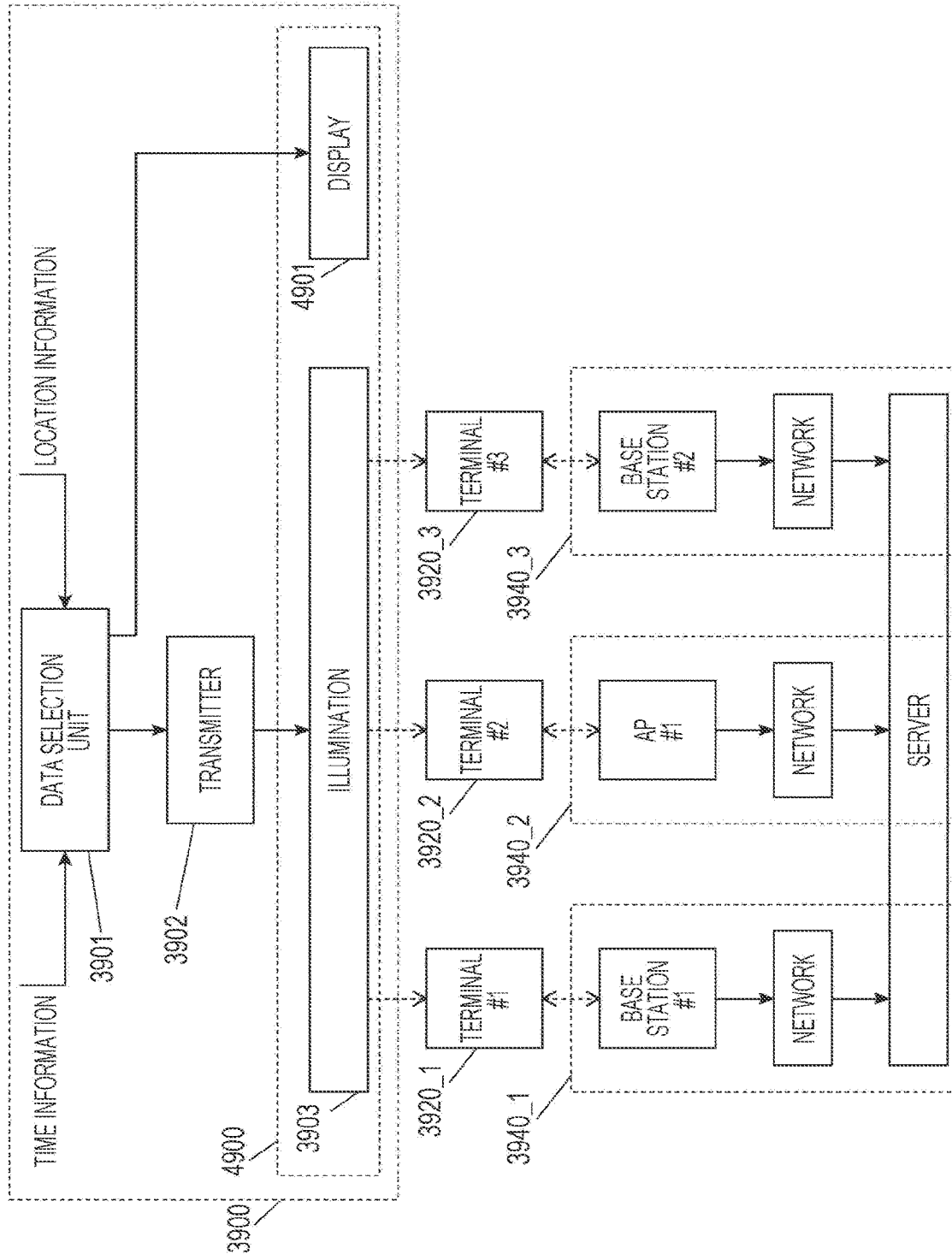
FIG. 49 is a diagram illustrating an example of a configuration of a communication system according to Embodiment 13.

Embodiment 13 discloses a method of updating data of the data selection unit 3901 in the communication apparatus 3900 shown in FIG. 49.

FIG. 49 shows an example of a configuration, different from that shown in FIG. 36, of a communication system. In FIG. 49, elements similar in operation to those shown in FIG. 36 are denoted by similar reference numerals. As for elements which have been already described above, a further description thereof is omitted. The communication system shown in FIG. 49 is a communication system for implementing Embodiment 12.

The communication apparatus 3900 in FIG. 49 corresponds to the monitor 4751, 4752, 4761, or 4762 in FIG. 47 or 48. Although only one communication apparatus 3900 is shown in FIG. 49, there may be a plurality of communication apparatuses.

In FIG. 49, a device including an apparatus 4900 including the "illumination 3903 and the display 4901 configured to display an image/moving image" may be used as a monitor, or an apparatus, such as the communication apparatus 3900, including a modem in addition to the apparatus 4900 may be used.

FIG. 44 illustrates an example of a manner of connecting apparatuses in the data update method. The communication apparatus 3900 communicates with a data generation apparatus 5100, which allows the data selection unit 3901 disposed in the communication apparatus 3900 to acquire data generated by the data generation apparatus 5100 thereby updating information and/or an advertisement to be delivered to terminals via the modulated light signal and updating a content of information, advertisement, an image, and/or a moving images to be displayed on the display 4901.

The data generation apparatus 5100 also communicates with an apparatus #k (5101_k) in addition to the communication apparatus 3900 where k is an integer in a range from 1 to N (inclusive). Herein H is an integer greater than or equal to 2. (or H may be equal to 1). In this situation, the apparatus #k (5101_k) transmits, to the data generation apparatus 5100, an advertisement (a still image, a moving image, audio signal) or a specific content of information, information related to a place/section whether the content is to be delivered, information indicating such as a specific content of the advertisement, information on a place/section where the advertisement is delivered, a bid price, or the like.

Figure 50:
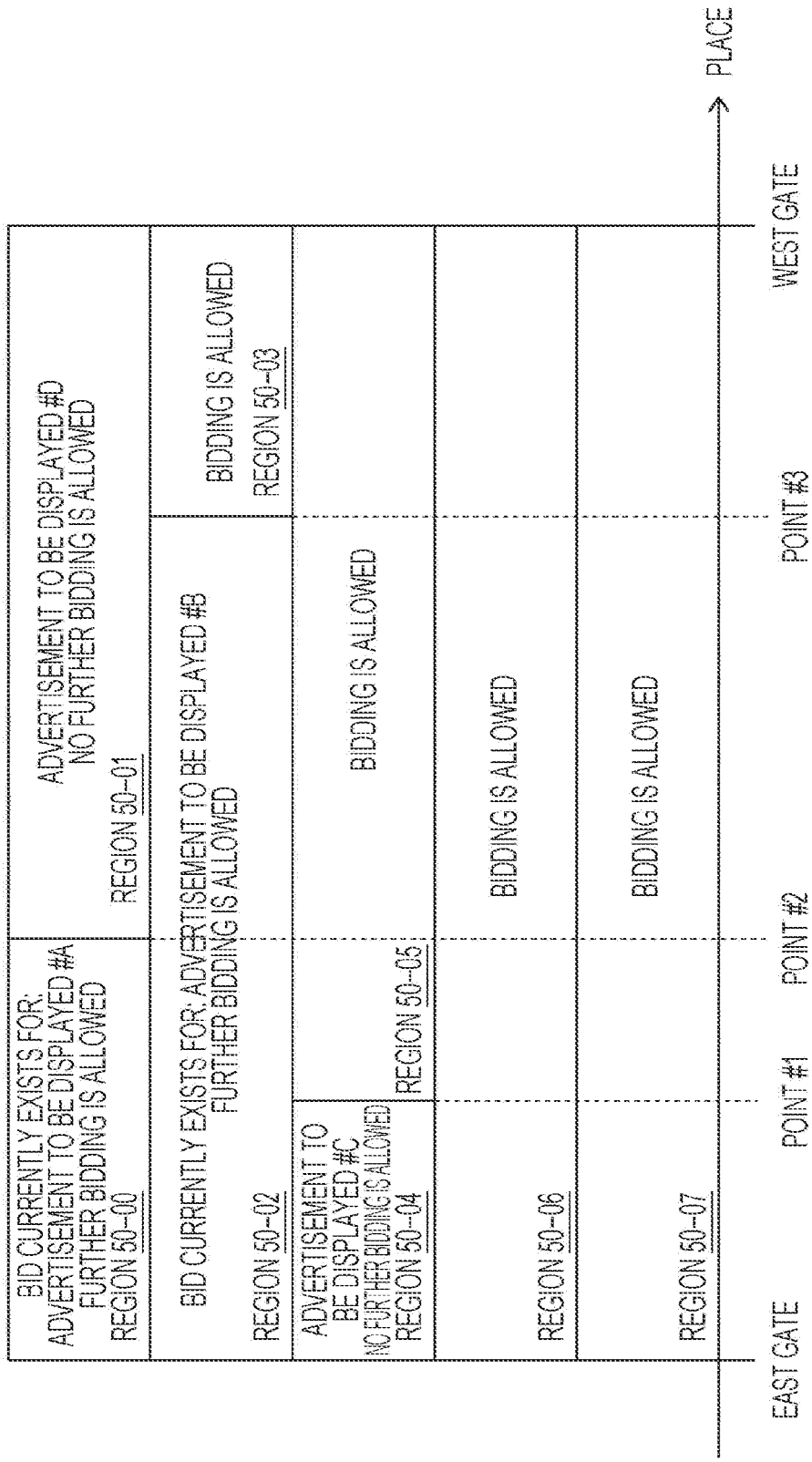
FIG. 50 is a diagram illustrating an example of an advertisement bid situation according to Embodiment 13.

FIG. 50 illustrates an example of a bid status of an advertisement generated by the data generation apparatus 5100 shown in FIG. 44. For example, the apparatus #k (5101_k) in FIG. 44 obtains the information such as that described in FIG. 50, and displays the acquired information on a display of the apparatus #k (5101_k) such that a user (who is a candidate of an advertiser) of the apparatus #k (5101_k) can get to know the information.

FIG. 50 illustrates an example of a bid status of an advertisement transmitted in the section from the east gate to the west gate as shown in FIG. 47 or 48. The bid status of the advertisement in FIG. 50 is a bid status in terms of an advertisement to be displayed on a display (4901 in FIG. 49) such as "monitor 4751 or 4752" in FIG. 47 or 48. Note that the "advertisement" may be information other than advertisements.

For example, in a region 50-00 in FIG. 50, a request for distributing an "advertisement #A for being displayed" on a monitor or the like in a section from the east gate to a point #2 is offered from a certain apparatus (a certain user). In this region, it has not yet been decided to distribute the advertisement #A, and thus another apparatus (user) is allowed to further bid on another advertisement. Note that the region 50-00 is a region for indicating information related to an advertisement to be delivered in the section from the east gate to the point #2. In this regard, a description has already been given in other embodiments, and thus a further detailed explanation is omitted.

In a region 50-01 in FIG. 50, a request for distributing an "advertisement #D for being displayed" on a monitor or the like in the section from the point #2 to the west gate is offered from a certain apparatus (a certain user), and it has already been decided to distribute the advertisement #D. Note that the region 50-01 is a region for indicating information related to an advertisement to be delivered in the section from the point #2 to the west gate. In this regard, a description has already been given in other embodiments, and thus a further detailed explanation is omitted.

In a region 50-02 in FIG. 50, a request for distributing an "advertisement #B for being displayed" on a monitor or the like in a section from the east gate to a point #3 is offered from a certain apparatus (a certain user). In this region, it has not yet been decided to distribute the advertisement #B, and thus another apparatus (user) is allowed to further bid on another advertisement. Note that the region 50-02 is a region for indicating information related to an advertisement to be delivered in the section from the east gate to the point #3. In this regard, a description has already been given in other embodiments, and thus a further detailed explanation is omitted.

In a region 50-03 in FIG. 50, no request for distributing an advertisement is offered from any apparatus (any user), and thus it is allowed to bid on an advertisement distribution. Note that the region 50-03 is a region for indicating information related to an advertisement to be delivered in the section from the point #3 to the west gate. In this regard, a description has already been given in other embodiments, and thus a further detailed explanation is omitted.

In a region 50-04 in FIG. 50, a request for distributing an "advertisement #C for being displayed" on a monitor or the like in a section from the east gate to a point #1 is offered from a certain apparatus (a certain user). In this region, it has already been decided to distribute an advertisement #C, and thus a further bid on an advertisement by any apparatus (any user) is not allowed. Note that the region 50-04 is a region for indicating information related to an advertisement to be delivered in the section from the east gate to the point #1. In this regard, a description has already been given in other embodiments, and thus a further detailed explanation is omitted.

In a region 50-05 in FIG. 50, no request for distributing an advertisement is offered from any apparatus (any user), and thus it is allowed to bid on an advertisement distribution. Note that the region 50-05 is a region for indicating information related to an advertisement to be delivered in the section from the point #1 to the west gate. In this regard, a description has already been given in other embodiments, and thus a further detailed explanation is omitted.

In a region 50-06 in FIG. 50, no request for distributing an advertisement is offered from any apparatus (any user), and thus it is allowed to bid on an advertisement distribution. Note that the region 50-06 is a region for indicating information related to an advertisement to be delivered in the section from the east gate to the west gate. In this regard, a description has already been given in other embodiments, and thus a further detailed explanation is omitted.

In a region 50-07 in FIG. 50, no request for distributing an advertisement is offered from any apparatus (any user), and thus it is allowed to bid on an advertisement distribution. Note that the region 50-07 is a region for indicating information related to an advertisement to be delivered in a section from the east gate to the west gate. In this regard, a description has already been given in other embodiments, and thus a further detailed explanation is omitted.

An apparatus #k (5101_k) in FIG. 44 acquires information on the status shown in FIG. 50 from the data generation apparatus 5100. Taking into consideration the status, the apparatus #k (5101_k) offers a request for an advertisement distribution and bids on it. When placing the bid, the apparatus #k (5101_k) provides a content of the advertisement to the data generation apparatus 5100.

In response, the data generation apparatus 5100 may have a function of checking appropriateness of the content of the advertisement provided by the apparatus #k (5101_k). For example, in the case of FIG. 50, advertisements related to the east gate and nearby locations are not suitable as advertisements. The data generation apparatus 5100 may have a function of checking whether the advertisement is such an advertisement. When the advertisement is determined to be an inappropriate advertisement, it will not be provided to the communication apparatus 3900.

In the data generation apparatus 5100 of FIG. 44, when bidding for advertisements is completed, the data possessed by the data selection unit 3901 of the communication apparatus 3900 is updated. The bid status of advertisements in FIG. 50 is merely an example. A bid for an advertisement may be made for each time zone or time.

Figure 51:
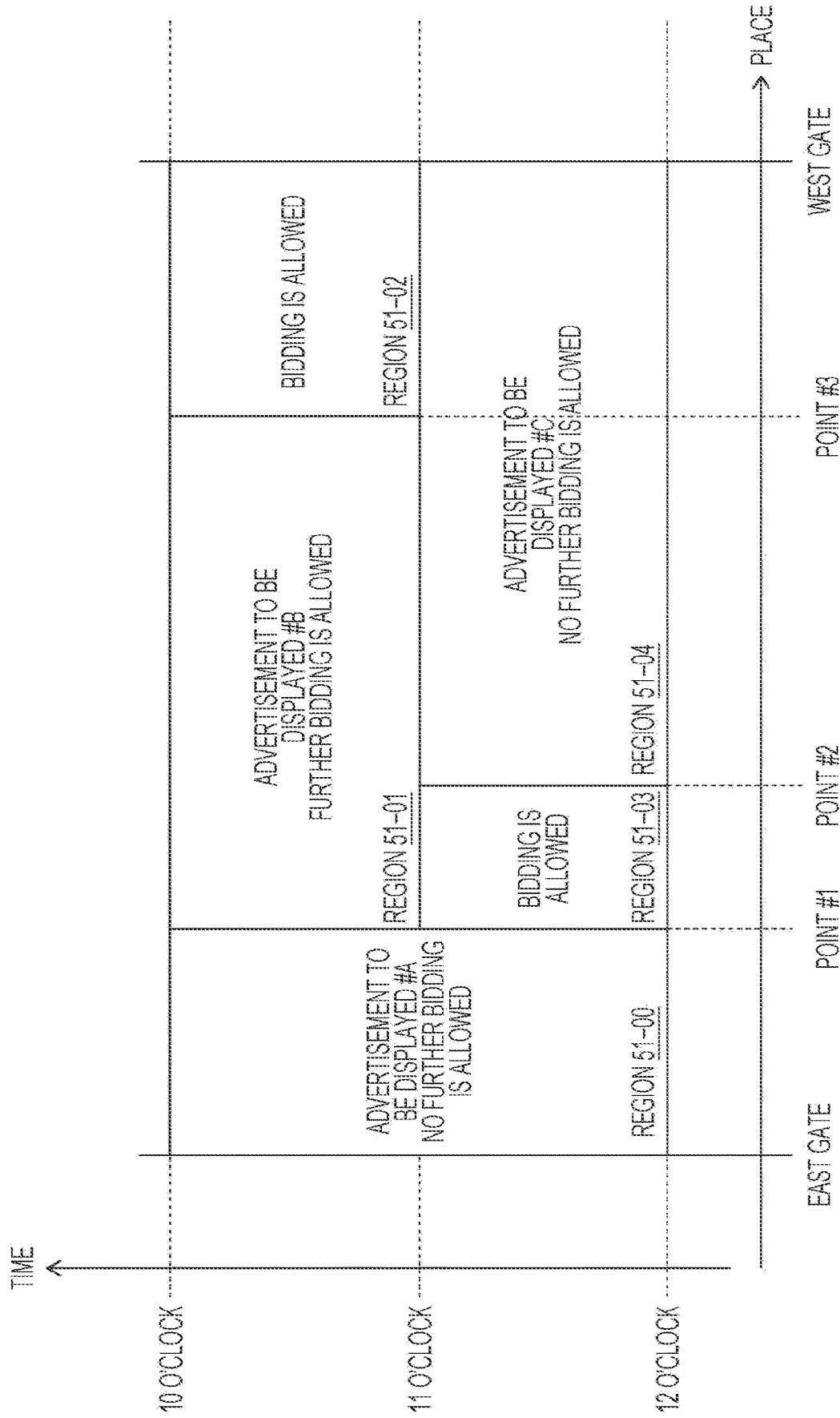
FIG. 51 is a diagram illustrating another example of an advertisement bid situation according to Embodiment 13.

This point will be described below with reference to FIG. 51. FIG. 51 shows an example of a bid status of advertisements generated by the data generation apparatus 5100 shown in FIG. 44. For example, the apparatus #k (5101_k) in FIG. 44 obtains the information such as that described in FIG. 51, and displays the acquired information on a display of the apparatus #k (5101_k) such that a user (who is a candidate of an advertiser) of the apparatus #k (5101_k) can get to know the information.

FIG. 51 illustrates an example of a bid status of an advertisement transmitted in the section from the east gate to the west gate as shown in FIG. 47 or 48. In FIG. 51, a horizontal axis represents places. The bid status of the advertisement in FIG. 51 is a bid status in terms of an advertisement to be displayed on a display (4901 in FIG. 49) such as "monitor 4751 or 4752" in FIG. 47 or 48. Note that the "advertisement" may be information other than advertisements.

For example, in a region 51-00 in FIG. 51, a request for distributing an "advertisement #A for being displaying" on a monitor or the like in the section from the east gate to the point #1 is offered from a certain apparatus (a certain user), and it has already been decided to distribute the advertisement #A. Note that the region 51-00 is a region for indicating information related to an advertisement to be delivered in the section from the east gate to the point #1 and in a time zone from 10 o'clock to 12 o'clock. In this regard, a description has already been given in other embodiments, and thus a further detailed explanation is omitted.

In a region 51-01 in FIG. 51, a request for distributing an "advertisement #B for being displayed" on a monitor or the like in the section from the point #1 to the point #3 is offered from a certain apparatus (a certain user). In this region, it has not yet been decided to distribute the advertisement #B, and thus another apparatus (user) is allowed to further bid on another advertisement. Note that the region 51-01 is a region for indicating information related to an advertisement to be delivered in the section from the point #1 to the point #3 in a time zone from 10 o'clock to 11 o'clock. In this regard, a description has already been given in other embodiments, and thus a further detailed explanation is omitted.

In a region 51-02 in FIG. 51, no request for distributing an advertisement is offered from any apparatus (any user), and thus it is allowed to bid on an advertisement distribution. Note that the region 51-02 is a region for indicating information related to an advertisement to be delivered in a section from the point #3 to the west gate and in a time zone from 10 o'clock to 11 o'clock. In this regard, a description has already been given in other embodiments, and thus a further detailed explanation is omitted.

In a region 51-03 in FIG. 51, no request for distributing an advertisement is offered from any apparatus (any user), and thus it is allowed to bid on an advertisement distribution. Note that the region 51-03 is a region for indicating information related to an advertisement to be delivered in a section from the point #1 to the point #2 and in a time zone from 11 o'clock to 12 o'clock. In this regard, a description has already been given in other embodiments, and thus a further detailed explanation is omitted.

In a region 51-04 in FIG. 51, a request for distributing an "advertisement #C for being displayed" on a monitor or the like in the section from the point #2 to the west gate is offered from a certain apparatus (a certain user), and it has already been decided to distribute the advertisement #C. Note that the region 51-04 is a region for indicating information related to an advertisement to be delivered in the section from the point #2 to the west gate and in the time zone from 11 o'clock to 12 o'clock. In this regard, a description has already been given in other embodiments, and thus a further detailed explanation is omitted.

An apparatus #k (5101_k) in FIG. 44 acquires information on the status shown in FIG. 51 from the data generation apparatus 5100. Taking into consideration the status, the apparatus #k (5101_k) offers a request for an advertisement distribution and bids on it. When placing the bid, the apparatus #k (5101_k) provides a content of the advertisement to the data generation apparatus 5100.

In response, the data generation apparatus 5100 may have a function of checking appropriateness of the content of the advertisement provided by the apparatus #k (5101_k). For example, in the case of FIG. 51, advertisements related to the east gate and nearby locations are not suitable as advertisements. The data generation apparatus 5100 may have a function of checking whether the advertisement is such an advertisement. When the advertisement is determined to be an inappropriate advertisement, it will not be provided to the communication apparatus 3900.

In the data generation apparatus 5100 of FIG. 44, when bidding for advertisements is completed, the data possessed by the data selection unit 3901 of the communication apparatus 3900 is updated.

The bid status of advertisements in FIG. 51 is merely an example. In FIG. 51, each area indicates information related to a bid for one advertisement, bids may be made for a plurality of advertisements by a plurality of apparatuses (that is, a plurality of advertisements may be delivered in the region).

Figure 52:
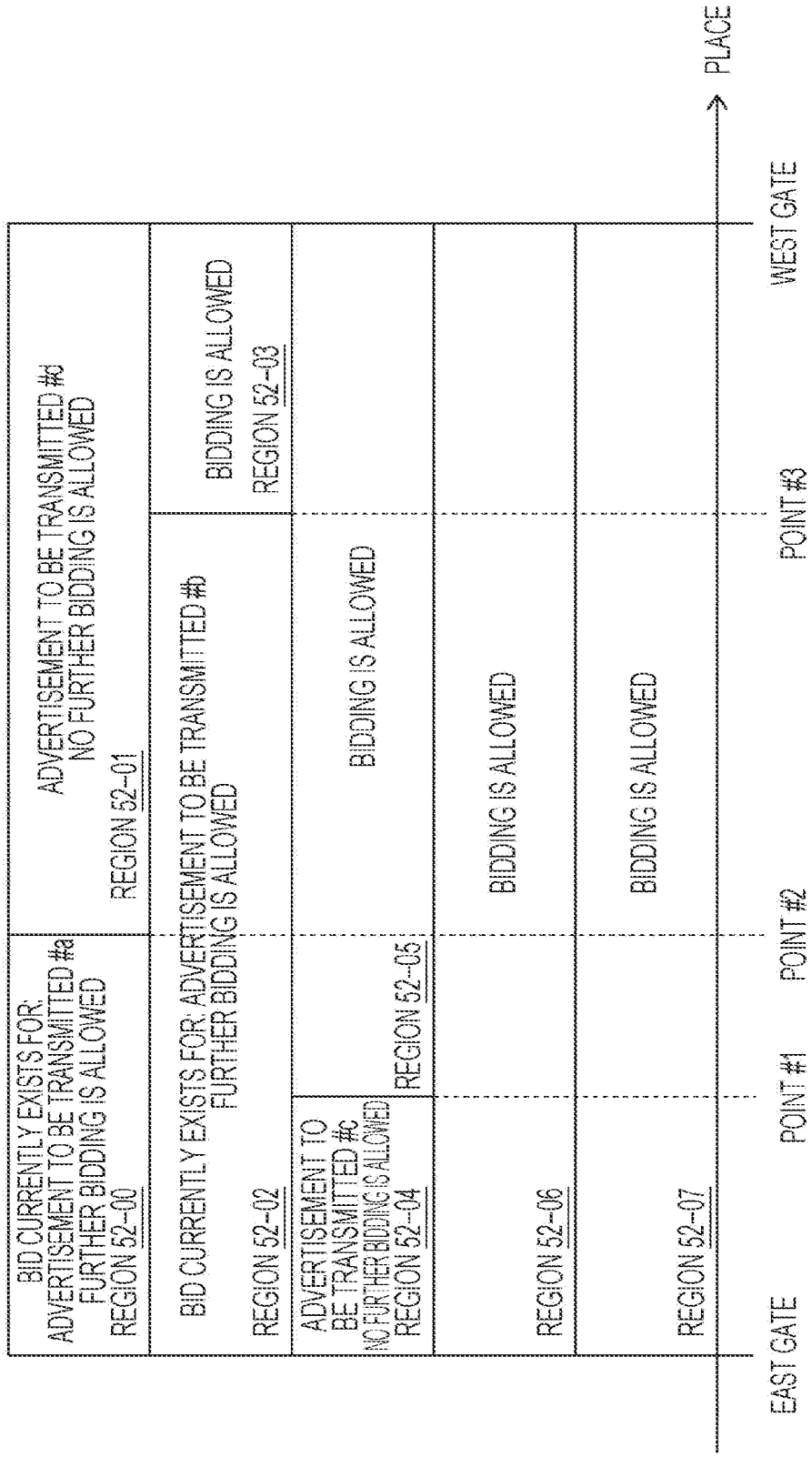
FIG. 52 is a diagram illustrating another example of an advertisement bid situation according to Embodiment 13.

FIG. 52 illustrates a further another example of a bid status of an advertisement generated by the data generation apparatus 5100 shown in FIG. 44. For example, the apparatus #k (5101_k) in FIG. 44 obtains the information such as that described in FIG. 52, and displays the acquired information on a display of the apparatus #k (5101_k) such that a user (who is a candidate of an advertiser) of the apparatus #k (5101_k) can get to know the information.

FIG. 52 illustrates an example of a bid status of an advertisement transmitted in a section from the east gate to the west gate as shown in FIG. 47 or 48. In FIG. 52, a horizontal axis represents places. The bid status of the advertisement in FIG. 52 is a bid status in terms of an advertisement included in a modulated light signal to be transmitted (emitted), for example, by an illumination (3903 in FIG. 49) of such as "monitor 4751 or 4752" in FIG. 47 or 48. Note that the "advertisement" may be information other than advertisements.

For example, in a region 52-00 in FIG. 52, a request for distributing an "advertisement #a for being transmitted" to a monitor or the like in a section from the east gate to a point #2 is offered from a certain apparatus (a certain user). In this region, it has not yet been decided to distribute the advertisement #a, and thus another apparatus (user) is allowed to further bid on another advertisement. Note that the region 52-00 is a region for indicating information related to an advertisement to be delivered in a section from the east gate to the point #2. In this regard, a description has already been given in other embodiments, and thus a further detailed explanation is omitted.

In a region 52-01 in FIG. 52, a request for distributing an "advertisement #d for being transmitted" to a monitor or the like in a section from the point #2 to the west gate is offered from a certain apparatus (a certain user), and it has already been decided to distribute the advertisement #d. Note that the region 52-01 is a region for indicating information related to an advertisement to be delivered in the section from the point #2 to the west gate. In this regard, a description has already been given in other embodiments, and thus a further detailed explanation is omitted.

In a region 52-02 in FIG. 52, a request for distributing an "advertisement #b for being transmitted" to a monitor or the like in a section from the east gate to a point #3 is offered from a certain apparatus (a certain user). In this region, it has not yet been decided to distribute the advertisement #b, and thus another apparatus (user) is allowed to further bid on another advertisement. Note that the region 52-02 is a region for indicating information related to an advertisement to be delivered in the section from the east gate to the point #3. In this regard, a description has already been given in other embodiments, and thus a further detailed explanation is omitted.

In a region 52-03 in FIG. 52, no request for distributing an advertisement is offered from any apparatus (any user), and thus it is allowed to bid on an advertisement distribution. Note that the region 52-03 is a region for indicating information related to an advertisement to be delivered in the section from the point #3 to the west gate. In this regard, a description has already been given in other embodiments, and thus a further detailed explanation is omitted.

In a region 52-04 in FIG. 52, a request for distributing an "advertisement #c for being transmitted" to a monitor or the like in a section from the east gate to a point #1 is offered from a certain apparatus (a certain user). In this region, it has already been decided to distribute an advertisement #c, and thus a further bid on an advertisement by any apparatus (any user) is not allowed. Note that the region 52-04 is a region for indicating information related to an advertisement to be delivered in the section from the east gate to the point #1. In this regard, a description has already been given in other embodiments, and thus a further detailed explanation is omitted.

In a region 52-05 in FIG. 52, no request for distributing an advertisement is offered from any apparatus (any user), and thus it is allowed to bid on an advertisement distribution. Note that the region 52-05 is a region for indicating information related to an advertisement to be delivered in the section from the point #1 to the west gate. In this regard, a description has already been given in other embodiments, and thus a further detailed explanation is omitted.

In a region 52-06 in FIG. 52, no request for distributing an advertisement is offered from any apparatus (any user), and thus it is allowed to bid on an advertisement distribution. Note that the region 52-06 is a region for indicating information related to an advertisement to be delivered in the section from the east gate to the west gate. In this regard, a description has already been given in other embodiments, and thus a further detailed explanation is omitted.

In a region 52-07 in FIG. 52, no request for distributing an advertisement is offered from any apparatus (any user), and thus it is allowed to bid on an advertisement distribution. Note that the region 52-07 is a region for indicating information related to an advertisement to be delivered in the section from the east gate to the west gate. In this regard, a description has already been given in other embodiments, and thus a further detailed explanation is omitted.

An apparatus #k (5101_k) in FIG. 44 acquires information on the status shown in FIG. 52 from the data generation apparatus 5100. Taking into consideration the status, the apparatus #k (5101_k) offers a request for an advertisement distribution and bids on it. When placing the bid, the apparatus #k (5101_k) provides a content of the advertisement to the data generation apparatus 5100.

In response, the data generation apparatus 5100 may have a function of checking appropriateness of the content of the advertisement provided by the apparatus #k (5101_k). For example, in the case of FIG. 52, advertisements related to the east gate and nearby locations are not suitable as advertisements. The data generation apparatus 5100 may have a function of checking whether the advertisement is such an advertisement. When the advertisement is determined to be an inappropriate advertisement, it will not be provided to the communication apparatus 3900.

In the data generation apparatus 5100 of FIG. 44, when bidding for advertisements is completed, the data possessed by the data selection unit 3901 of the communication apparatus 3900 is updated.

The bid status of advertisements in FIG. 52 is merely an example. A bid for an advertisement may be made for each hour or time.

Figure 53:
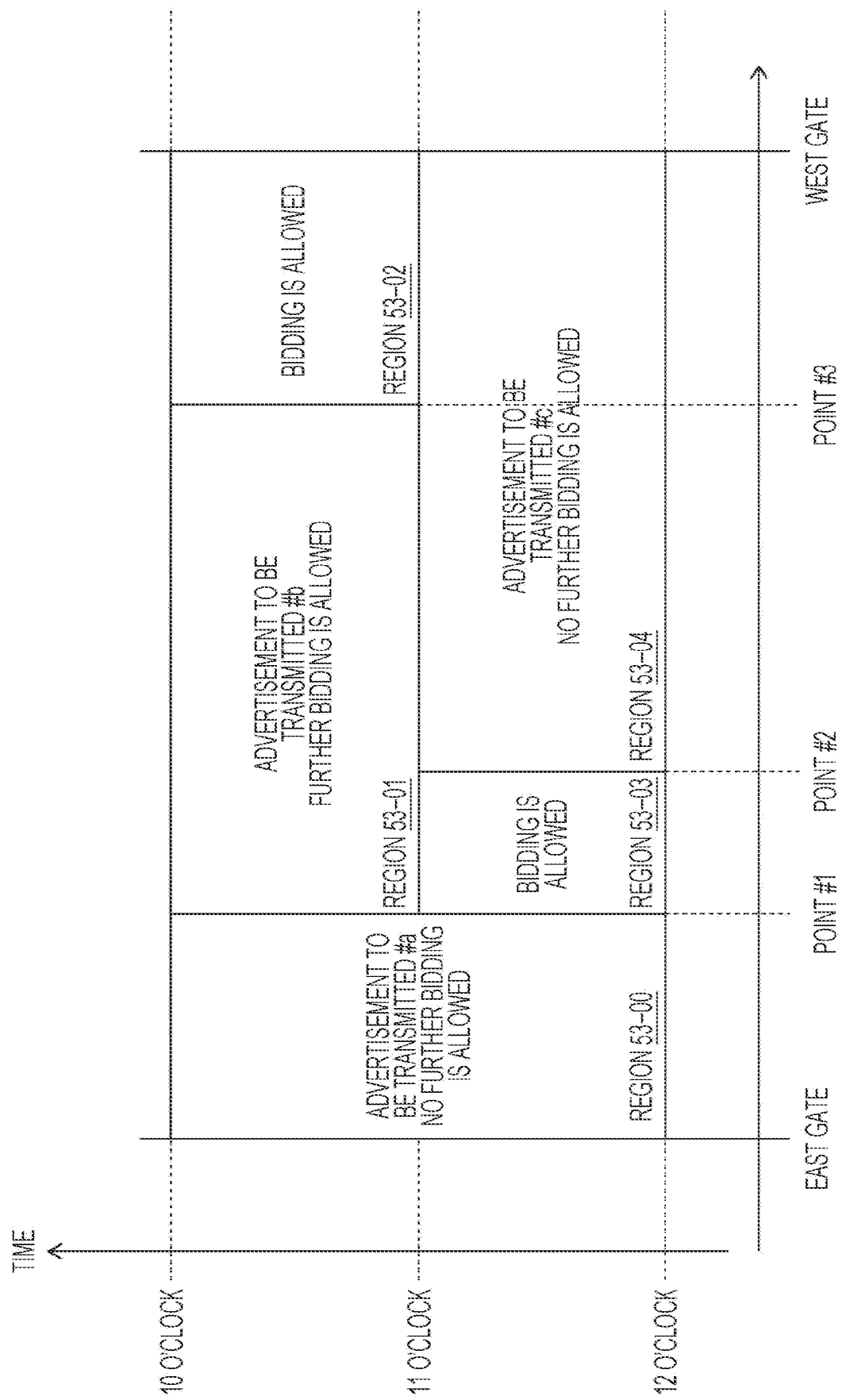
FIG. 53 is a diagram illustrating another example of an advertisement bid situation according to Embodiment 13.

This point will be described below with reference to FIG. 53. FIG. 53 shows an example of a bid status of advertisements generated by the data generation apparatus 5100 shown in FIG. 44. For example, the apparatus #k (5101_k) in FIG. 44 obtains the information such as that described in FIG. 53, and displays the acquired information on a display of the apparatus #k (5101_k) such that a user (who is a candidate of an advertiser) of the apparatus #k (5101_k) can get to know the information.

FIG. 53 illustrates an example of a bid status of an advertisement transmitted in the section from the east gate to the west gate as shown in FIG. 47 or 48. In FIG. 53, a horizontal axis represents places. The bid status of the advertisement in FIG. 53 is a bid status in terms of an advertisement included in a modulated light signal to be transmitted (emitted), for example, by an illumination (3903 in FIG. 49) of such as "monitor 4751 or 4752" in FIG. 47 or 48. Note that the "advertisement" may be information other than advertisements.

For example, in a region 53-00 in FIG. 53, a request for distributing an "advertisement #a for being transmitted" to a monitor or the like in the section from the east gate to the point #1 is offered from a certain apparatus (a certain user), and it has already been decided to distribute the advertisement #a. Note that the region 53-00 is a region for indicating information related to an advertisement to be delivered in the section from the east gate to the point #1 and in a time zone from 10 o'clock to 12 o'clock. In this regard, a description has already been given in other embodiments, and thus a further detailed explanation is omitted.

In a region 53-01 in FIG. 53, a request for distributing an "advertisement #b for being transmitted" to a monitor or the like in the section from the point #1 to the point #3 is offered from a certain apparatus (a certain user). In this region, it has not yet been decided to distribute the advertisement #b, and thus another apparatus (user) is allowed to further bid on another advertisement. Note that the region 53-01 is a region for indicating information related to an advertisement to be delivered in the section from the point #1 to the point #3 in a time zone from 10 o'clock to 11 o'clock. In this regard, a description has already been given in other embodiments, and thus a further detailed explanation is omitted.

In a region 53-02 in FIG. 53, no request for distributing an advertisement is offered from any apparatus (any user), and thus it is allowed to bid on an advertisement distribution. Note that the region 53-02 is a region for indicating information related to an advertisement to be delivered in the section from the point #3 to the west gate and in a time zone from 10 o'clock to 11 o'clock. In this regard, a description has already been given in other embodiments, and thus a further detailed explanation is omitted.

In a region 53-03 in FIG. 53, no request for distributing an advertisement is offered from any apparatus (any user), and thus it is allowed to bid on an advertisement distribution. Note that the region 53-03 is a region for indicating information related to an advertisement to be delivered in a section from the point #1 to the point #2 and in a time zone from 11 o'clock to 12 o'clock. In this regard, a description has already been given in other embodiments, and thus a further detailed explanation is omitted.

In a region 53-04 in FIG. 53, a request for distributing an "advertisement #c for being transmitted" to a monitor or the like in the section from the point #2 to the west gate is offered from a certain apparatus (a certain user), and it has already been decided to distribute the advertisement #c. Note that the region 53-04 is a region for indicating information related to an advertisement to be delivered in the section from the point #2 to the west gate and in the time zone from 11 o'clock to 12 o'clock. In this regard, a description has already been given in other embodiments, and thus a further detailed explanation is omitted.

An apparatus #k (5101_k) in FIG. 44 acquires information on the status shown in FIG. 53 from the data generation apparatus 5100. Taking into consideration the status, the apparatus #k (5101_k) offers a request for an advertisement distribution and bids on it. When placing the bid, the apparatus #k (5101_k) provides a content of the advertisement to the data generation apparatus 5100.

In response, the data generation apparatus 5100 may have a function of checking appropriateness of the content of the advertisement provided by the apparatus #k (5101_k). For example, in the case of FIG. 53, advertisements related to the east gate and nearby locations are not suitable as advertisements. The data generation apparatus 5100 may have a function of checking whether the advertisement is such an advertisement. When the advertisement is determined to be an inappropriate advertisement, it will not be provided to the communication apparatus 3900.

In the data generation apparatus 5100 of FIG. 44, when bidding for advertisements is completed, the data possessed by the data selection unit 3901 of the communication apparatus 3900 is updated. The bid status of advertisements in FIG. 53 is merely an example. In FIG. 53, each area indicates information related to a bid for one advertisement, bids may be made for a plurality of advertisements by a plurality of apparatuses (that is, a plurality of advertisements may be delivered in the region).

By generating advertisement data in the above-described manner, it becomes possible for terminals and users to receive more valuable data, information, advertisements, images, an moving images. It also becomes possible for an information provider to provide more valuable data, information, advertisements, images, and moving images.

In the present description, the "illumination" or the "light source" may be a display that is emitting light to display an image, a moving image, an advertisement, and/or the like and a modulated light signal may be included in the light. That is, the "illumination" or the "light source" may have a function in addition to the function of emitting light. The "illumination" or the "light source" may include a plurality of "lightings" or "light sources".

The transmission method used by the communication apparatus in generating a modulated light signal and emits light may be a method other than the transmission method described in the present description. The modulated light signal may include information other than information described in the present description.

Present embodiment has been described above using names "west gate" and "east gate". But the terms "west gate" and "east gate" are merely examples, but the terms are not limited to these examples. The embodiment may be similarly implemented also for a case where two or more different areas are respectively denoted as, for example, "area A" and "area B" instead of "west gate" and "east gate". In another example of an implementation of the embodiment, a plurality of areas including "area #1, area #2, . . . area #N (where N is an integer greater than or equal to 2)" may be treated instead of "west gate", and a plurality of areas including "area $1, area $2, . . . area $M (where M is an integer greater than or equal to 2)" may be treated instead of "east gate".

Note that the "monitors 4751 and 4752" in FIGS. 47 and 48 may treat information related to the east gate and an advertisement expressed in an image or a moving image. Similarly, the "monitors 4761 and 4762" in FIGS. 47 and 48 may treat information related to the west gate and an advertisement expressed in an image or a moving image.

Furthermore, alternative examples of methods may be possible. For example, let it be assumed by way of example that another railway station exists at the east gate. In this case, information and/or an advertisement related to an east gate area such as information and/or an advertisement related to a railway destination area may be treated according to the present embodiment.

In FIG. 47 and FIG. 48, in an alternative implementation of the present embodiment, "persons 4711, 4712, 4721, and 4722 having a communication apparatus" may be replaced by "vehicles equipped with a communication apparatus", or "car equipped with a communication apparatus".

Embodiment 14

Embodiment 14 provides an example of a configuration of the data generation apparatus 5100 in FIG. 44 described above in other embodiments.

FIG. 54 illustrates an example of a configuration of the data generation apparatus 5100 shown in FIG. 44. The data generation apparatus 5100 includes an API (Application Programming Interface) for performing processing. More specifically, for example, as shown in FIG. 54, the data generation apparatus 5100 includes, as APIs, a recognition layer API 54-01_1, analysis layer API 54-01_2, a learning layer API 54-01_3, a communication network layer API 54-01_4, and/or the like, which are connected with an application connection API 54-02. Each API obtains information, performs processing, and outputs processed data.

The application connection API 54-02 has an input/output signal 54-03. It is possible to change an API processing method and a processing algorithm by the input/output signal 54-03. It is also possible to control the order of processing performed by the APIs.

A first communication unit 54-04 is a communication unit for communicating with the apparatus #k (5101_k) shown in FIG. 44 where k is an integer in a range from 1 to H (inclusive). The first communication unit 54-04 transfers information, such as information on a bid, obtained from the apparatus #k (5101_k) to the application connection API 54-02.

The application connection API 54-02 transfers the information, such as information on a bid, obtained from the apparatus #k (5101_k) to each API. On the other hand, the application connection API 54-02 transfers a result obtained from each API to a distribution information determination unit 54-06.

The distribution information determination unit 54-06 holds information on a bid status such as that shown in FIG. 45, FIG. 46, FIG. 50, FIG. 51, FIG. 52, FIG. 53, or FIG. 54.

The distribution information determination unit 54-06 transfers the information on the bid status to an API to which the information is to be transferred, and obtains a result of processing performed by the API. The distribution information determination unit 54-06 then determines a final content of the advertisement to be delivered.

The distribution information determination unit 54-06 transmits the information on the determined advertisement distribution content to the communication apparatus 3900 shown in FIG. 44 via a second communication unit 54-05. Furthermore, based on the information on the determined advertisement distribution, the first communication unit 54-04 feeds back a bidding result to the apparatus #k (5101_k).

By performing the operation as described above, it is possible to achieve the effects described above in the respective embodiments. Note that the configuration of the data generation apparatus 5100 is not limited to that shown in FIG. 54. As a matter of course, a plurality of embodiments disclosed in the present description and/or other technical features disclosed in supplements or the like may be combined in implementation.

Also note that in each embodiment, the place where information such as an advertisement, an image, or a moving image may be an inside of an airplane or an aircraft. Also, in such a situation, any embodiment described above may be implemented. Also, in this case, the effects described in the embodiment can be achieved.

Note that the embodiments are described only to illustrate examples. For example, "modulation schemes, error correction coding schemes (error correction code used, code length, coding rate, etc.), control information and/or the like" may be replaced by other "modulation schemes, error correction coding schemes (error correction code used, code length, coding rate, etc.), control information and/or the like.

As for the modulation scheme, a modulation scheme other than those described above in the present description may be employed in implementations of the embodiments and other features. As for the modulation scheme, a modulation scheme other than those described above in the present description may be employed in implementations of the embodiments and other features. For example, APSK (Amplitude Phase Shift Keying) (for example, 16APSK, 64APSK, 128APSK, 256APSK, 1024APSK, 4096APSK, etc.), PAM (Pulse Amplitude Modulation) (for example, 4PAM, 8PAM, 16PAM, 64PAM, 128PAM, 256PAM, 256PAM, 1024PAM, 4096PAM etc.), PSK (Phase Shift Keying) (for example, BPSK, QPSK, 8PSK, 16PSK, 64PSK, 128PSK, 256PSK, 1024PSK, 4096PSK etc.), QAM (Quadrature Amplitude Modulation) (for example, 4QAM, 8QAM, 16QAM, 64QAM, 128QAM, 256QAM, 1024QAM, 4096QAM, etc.) may be employed, and uniform mapping or non-uniform mapping may be employed in each modulation scheme. Schemes of signal constellation of 2, 4, 8, 16, 16, 64, 128, 256, 1024, etc. signal points in an IQ plane (in modulation schemes respectively having 2, 4, 8, 16, 16, 64, 128, 256, 1024, etc. signal points) are not limited to those of the modulation schemes shown in this specification.

The wireless apparatus described in this specification may be installed, in, for example, a communication/broadcasting device such as a broadcasting station, a base station, an access point, a terminal, a mobile phone, or a communication device such as a television set, a radio set, a terminal, a personal computer, a mobile phones, an access point, a base station, or the like. The wireless apparatus described in this specification may be a device having a communication function and capable of being connected via some interface with an apparatus such as a television set, a radio set, a personal computer, a mobile phone, or the like, configured to execute an application.

The receiver disclosed in the present specification may be installed in, for example, a communication/broadcasting device such as a broadcasting station, a base station, an access point, a terminal, a mobile phone, or a communication device such as a television set, a radio set, a terminal, a personal computer, a mobile phone, an access point, a base station, or the like.

In wireless communication using a radio wave according to the present embodiment, symbols other than data symbols, for example, pilot symbols (a preamble, a unique word, a postamble, a reference symbol, etc.), symbols for control information, etc. may be mapped in a frame in an arbitrary manner. Although naming such as pilot symbols, symbols for control information, or the like is employed, any naming may be used, but the role of each symbol itself is important.

The pilot symbol may be, for example a known symbol PSK-modulated at a transmission/reception apparatus (or a reception apparatus may perform synchronization to get to know a symbol transmitted by a transmission apparatus). Using this symbol, the reception apparatus performs frequency synchronization, time synchronization, channel state estimation (estimation of CSI (Channel State Information) (for each modulated signal), signal detection, and/or the like. Using this symbol, the receiver performs frequency synchronization, time synchronization, channel state estimation (estimation of CSI (Channel State Information) (for each modulated signal), signal detection, and/or the like.

The symbol for control information is a symbol for transmitting information (for example, information indicating a modulation scheme, an error correction coding scheme used in communication, a coding rate of the error correction coding scheme, upper-layer setting information, and/or the like) that needs to be transmitted to a communication partner to achieve transmission information other than data.

Note that the present disclosure is not limited to the embodiments described above, but many modifications or changes are possible. For example, although the above embodiments are implemented, by way of example, as a communication apparatus, the implementation is not limited to the communication apparatus. The communication method may be realized by software, hardware, or software in cooperation with hardware.

For example, a program for executing the communication method may be stored in advance in a ROM (Read Only Memory), and the program may be executed by a CPU (Central Processor Unit).

Furthermore, a program for executing the above communication method may be stored in a computer-readable storage medium, and the program stored in the storage medium may be loaded in a RAM (Random Access Memory) of the computer and the computer may be operated according to the program.

Each functional block used in the description of each embodiment described above can be partly or entirely realized by an LSI (Large Scale Integration) which is one type of integrated circuits, and each process described in each embodiment may be partially or totally controlled by one LSI or a combination of LSIs. One LSI may be realized by one chip. One chip may include part or all of functional blocks. Each LSI may include a data input and a data output. The LSI may also be called an IC (Integrated Circuit), a system LSI, a super LSI, or an ultra LSI depending on the integration density. The method of implementing the integrated circuit is not limited to the LSI, but the integrated circuit may be implemented in the form of a dedicated circuit or a general-purpose processor. The integrated circuit may also be realized using an FPGA (Field Programmable Gate Array) that can be programmed after the LSI is produced or a reconfigurable processor that is allowed to be reconfigured in terms of the connection or the setting of circuit cells in the inside of the LSI. The present disclosure may be implemented by digital or analog processing. As a matter of course, if a progress of a semiconductor technology or another technology derived therefrom provides a new technology for realizing an integrated circuit which can replace the LSI, functional blocks may be integrated using the new technology. Use of biotechnology is potentially possible.

Note that at least one of the FPGA (Field Programmable Gate Array) and the CPU (Centre Processing Unit) may be configured to be capable of downloading all or part of software for realizing the communication method according to the present disclosure via wireless communication or wired communication. Furthermore, all or part of software for updating may be downloaded via wireless communication or wired communication. The downloaded software may be stored in a storage unit and at least one of the FPGA and the CPU may be operated according to the stored software thereby executing the digital signal processing according to the present disclosure.

In this case, a device including at least one of the FPGA and the CPU may be connected to a communication modem wirelessly or by wire, and the communication method according to the present disclosure may be realized by the device and the communication modem.

For example, a communication apparatus such as a base station, an AP, or a terminal described in the present description may include at least one of the FPGA and the CPU, and the communication apparatus may include an interface for acquiring, from the outside, software for operating at least one of the FPGA and the CPU. The communication apparatus may further include a storage unit for storing software acquired from the outside, and the FPGA and/or the CPU may be operated based on the stored software thereby realizing the signal processing described in the present disclosure.

INDUSTRIAL APPLICABILITY

An aspect of the present disclosure is useful for a visible light communication system.

REFERENCE SIGNS LIST

100, 400, 1000, 1400A, 1400B device
102, 1404-1, 1404-2 transmitter
104, 1406-1, 1406-2 light source
150, 450, 1050 terminal
151 light receiver 153 receiver
155 data analysis unit
157 display
453, 2002 wireless apparatus
470, 2000 base station
2001 transmission apparatus
3900 communication apparatus
3901 data selection unit
3902 transmitter
3903 illumination
3920 terminal
5100 data generation apparatus

The invention claimed is:

1. A communication apparatus comprising:
control circuitry which, in operation, acquires location information of a user, and acquires, based on the location information, advertisement data for a plurality of users including the user for each of a plurality of time and location resources defined by a time axis and a location zone, wherein the advertisement data may be different depending on a time and location resource; and
transmission circuitry which, in operation, transmits a modulated light signal that includes the advertisement data, the modulated light signal being to be used by a terminal device to display a corresponding advertisement for the plurality of users during each of the time and location resources.

2. The communication apparatus according to claim 1, wherein the control circuitry, in operation, further acquires time information indicating a current time, and, based on the location information and the time information, acquires the advertisement data to be distributed during one of the plurality of time and location resources available in future time following the current time.

3. The communication apparatus according to claim 1, wherein the control circuitry, in operation, acquires the advertisement data by further using a location of the transmission circuitry.

4. The communication apparatus according to claim 1, wherein the transmission circuitry, in operation, transmits the modulated light signal including ID information for identifying a radio base station associated with the communication apparatus.

5. The communication apparatus according to claim 1, wherein the advertisement data is data for causing an advertisement to be displayed on a display of the terminal device that receives the modulated light signal.

6. A communication method for a communication apparatus, the communication method comprising:
acquiring location information of a user;
acquiring, based on the location information, advertisement data for a plurality of users including the user for each of a plurality of time and location resources defined by a time axis and a location zone, wherein the advertisement data may be different depending on a time and location resource; and
transmitting a modulated light signal that includes the advertisement data, the modulated light signal being to be used by a terminal device to display a corresponding advertisement for the plurality of users during each of the time and location resources.

7. The communication method according to claim 6, comprising:
acquiring time information indicating a current time; and
based on the location information and the time information, acquiring the advertisement data to be distributed during one of the plurality of time and location resources available in future time following the current time.

8. The communication method according to claim 6, comprising:
acquiring the advertisement data by further using a location of the communication apparatus.

9. The communication method according to claim 6, comprising:
incorporating, in the advertisement data, ID information for identifying a radio base station associated with the communication apparatus.

10. The communication method according to claim 6, wherein the advertisement data is data for causing an advertisement to be displayed on a display of the terminal device that receives the modulated light signal.

* * * * *